(12) United States Patent
Kassatly

(10) Patent No.: US 6,847,391 B1
(45) Date of Patent: Jan. 25, 2005

(54) MULTI-POINT VIDEO CONFERENCE SYSTEM

(76) Inventor: Lord Samuel Anthony Kassatly, 6819 Trinidad Dr., San Jose, CA (US) 95120

(*) Notice: Subject to any disclaimer, the term of this patent is extended or adjusted under 35 U.S.C. 154(b) by 0 days.

(21) Appl. No.: 09/546,901

(22) Filed: Apr. 10, 2000

Related U.S. Application Data

(63) Continuation of application No. 08/703,480, filed on Aug. 27, 1996, now Pat. No. 6,049,694, which is a continuation of application No. 07/826,372, filed on Jan. 27, 1992, now Pat. No. 5,691,777, which is a continuation-in-part of application No. 07/573,539, filed on Aug. 27, 1990, now Pat. No. 5,157,491, which is a continuation-in-part of application No. 07/457,403, filed on Dec. 18, 1989, now Pat. No. 4,975,771, which is a continuation-in-part of application No. 07/308,826, filed on Feb. 10, 1989, now Pat. No. 4,903,126, and a continuation-in-part of application No. 07/258,722, filed on Oct. 17, 1988, now abandoned.

(51) Int. Cl.$^7$ ............................................. H04W 7/14
(52) U.S. Cl. ........................ 348/14.01; 348/14.12; 348/14.13; 370/240.4
(58) Field of Search ..................... 348/14.01, 14.08, 348/14.13, 14.09, 14.12, 714, 385.1, 387.1, 388.1, 240.11, 398.1; 709/204; 370/260–266; 345/753; 375/240.11, 240.1, 240.26; 725/95, 126

(56) References Cited

U.S. PATENT DOCUMENTS

| | | | | |
|---|---|---|---|---|
| 4,710,917 A | * | 12/1987 | Tompkins et al. | .......... 709/204 |
| 4,961,211 A | * | 10/1990 | Tsugane et al. | .......... 348/14.08 |
| 5,061,992 A | * | 10/1991 | Ueno | ..................... 348/14.01 |
| 5,164,980 A | * | 11/1992 | Bush et al. | .............. 348/14.13 |
| 5,195,086 A | * | 3/1993 | Baumgartner et al. | ...... 370/264 |

* cited by examiner

*Primary Examiner*—Chris Grant
*Assistant Examiner*—Matthew Demicco
(74) *Attorney, Agent, or Firm*—Samuel A. Kassatly

(57) ABSTRACT

A program delivery system using a compression apparatus capable of compressing incoming video and non-video signals, such as audio and data signals. The system includes a frequency modulator which modulates the incoming audio, data or other non-video signals, unto selected video frequencies. A Fourier transformer generates a set of sinusoidal transform components corresponding to the incoming video, audio, data or other non-video signals, and a selector chooses the most desirable Fourier sinusoidal transforms. A multiplexer multiplexes only the selected Fourier transform components for further processing.

19 Claims, 31 Drawing Sheets

| | CARRIER FREQ | V | A | D | SUB-BAND |
|---|---|---|---|---|---|
| $V_1$ | R | 1,2 | 3 | 4,5 | 901 |
| | G | 1 | 2,3,4 | 5 | 902 |
| | B | 1,2,3 | 4 | 5 | 903 |
| $V_2$ | R | 1,2,3 | 4 | - | 904 |
| | G | 1,2 | 3 | 4 | 905 |
| | B | 1 | 2,5 | - | 906 |

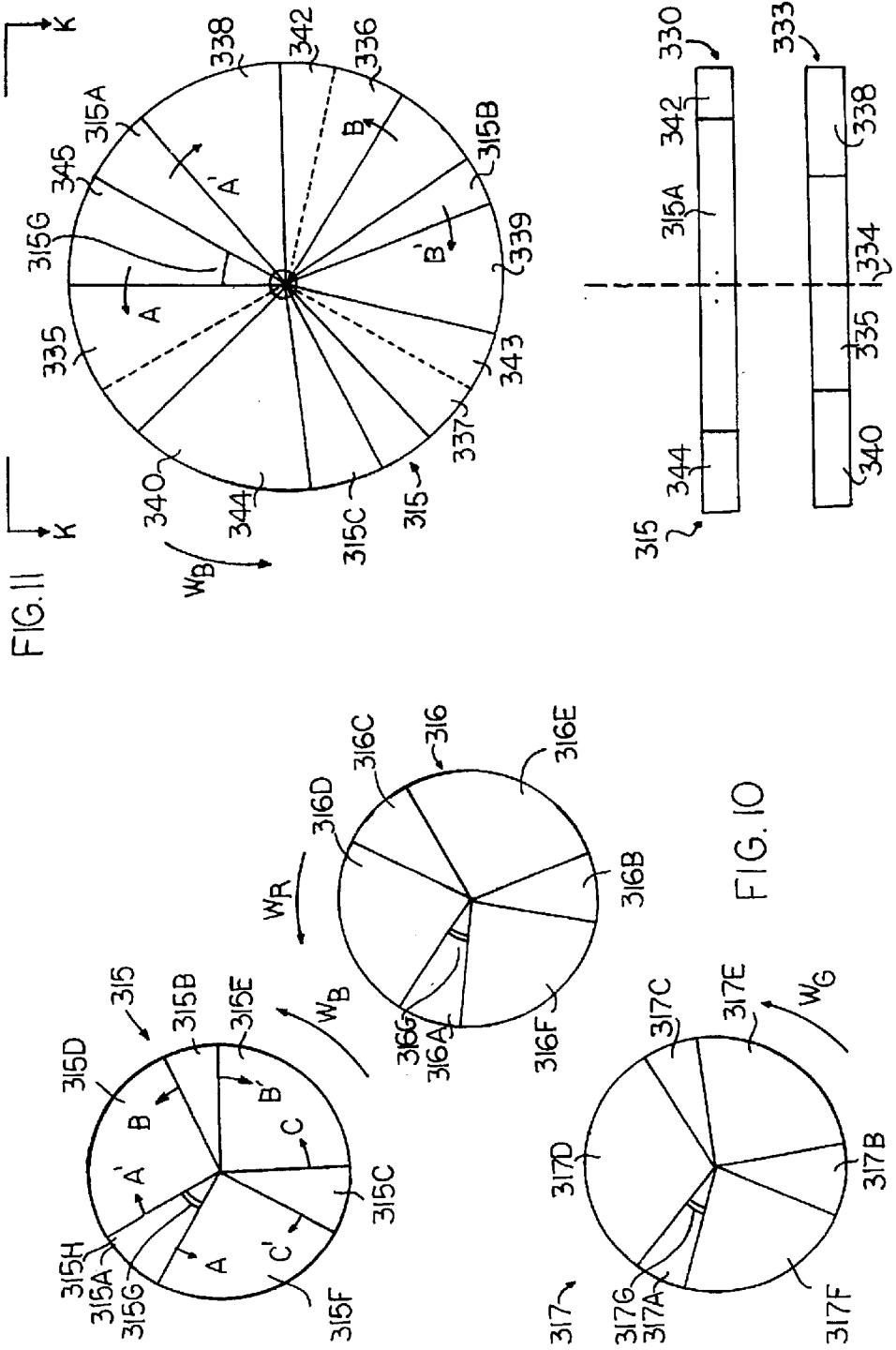

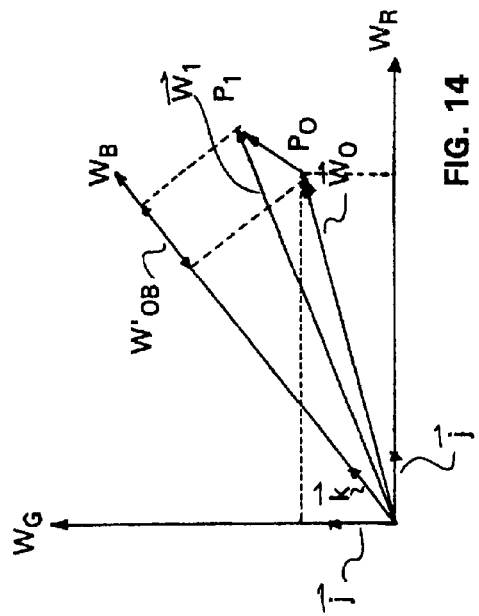
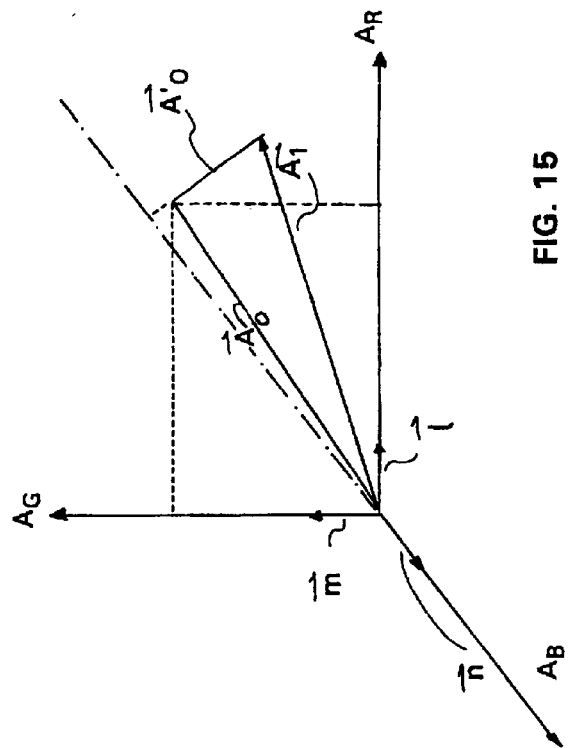
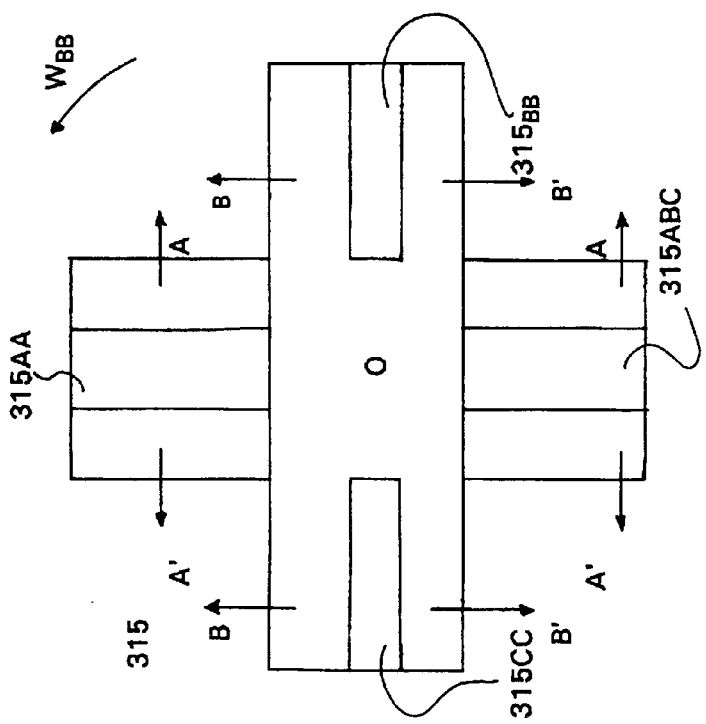
FIG. 14
FIG. 15
FIG. 13

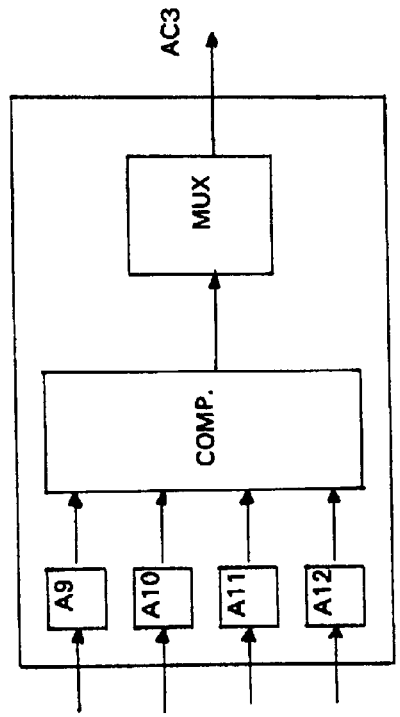
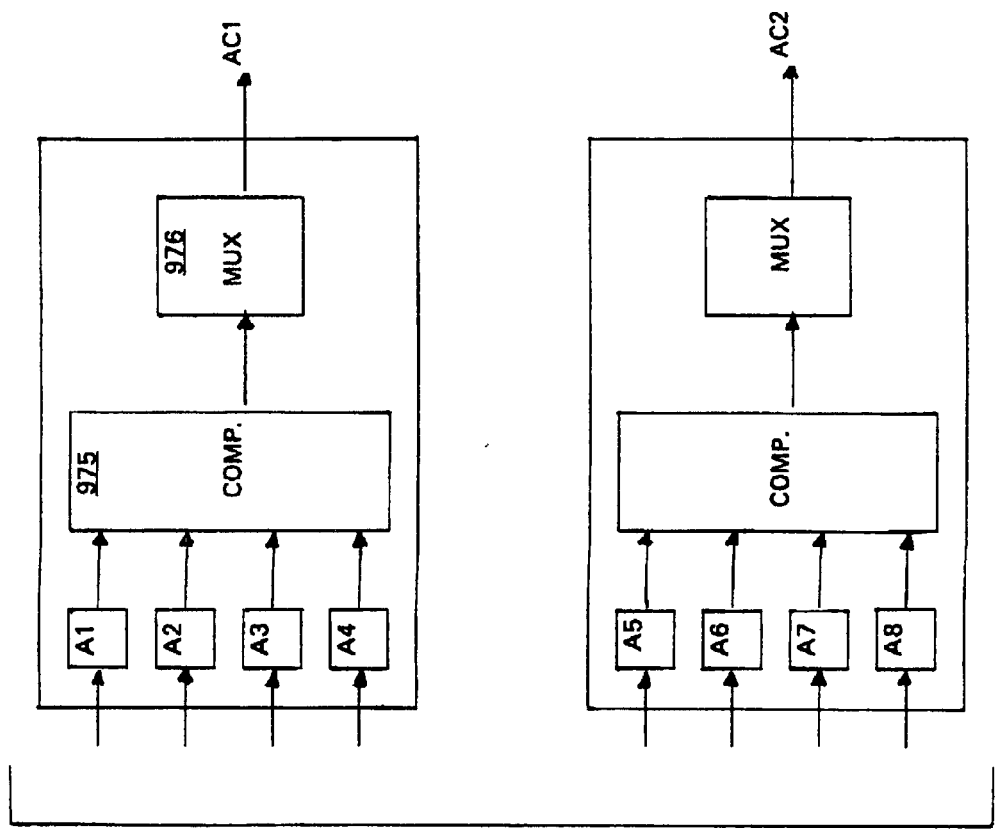
FIG. 26

FIG.30

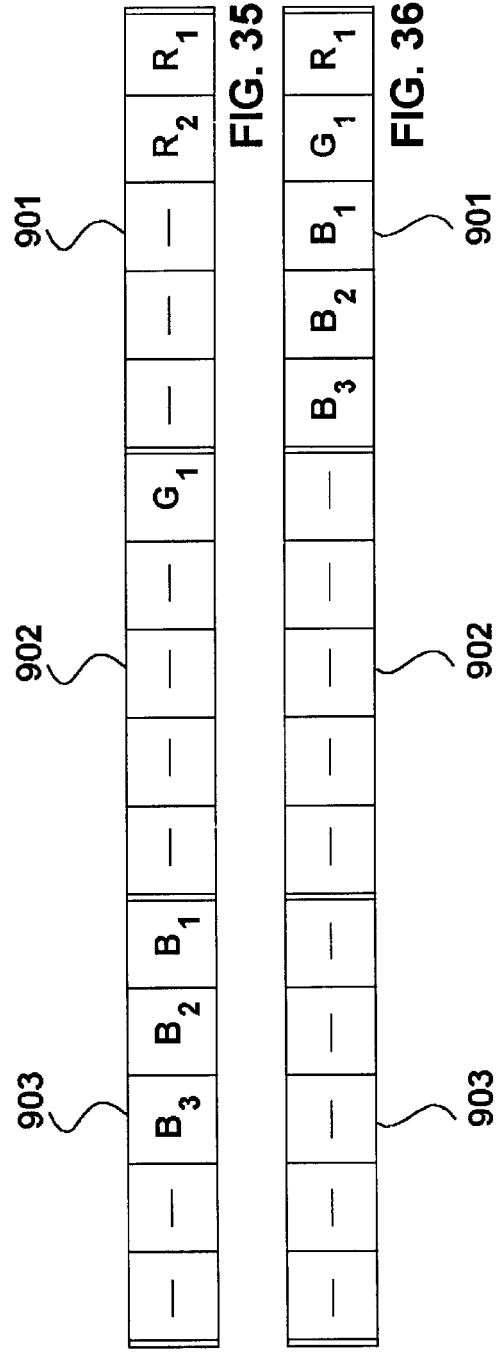
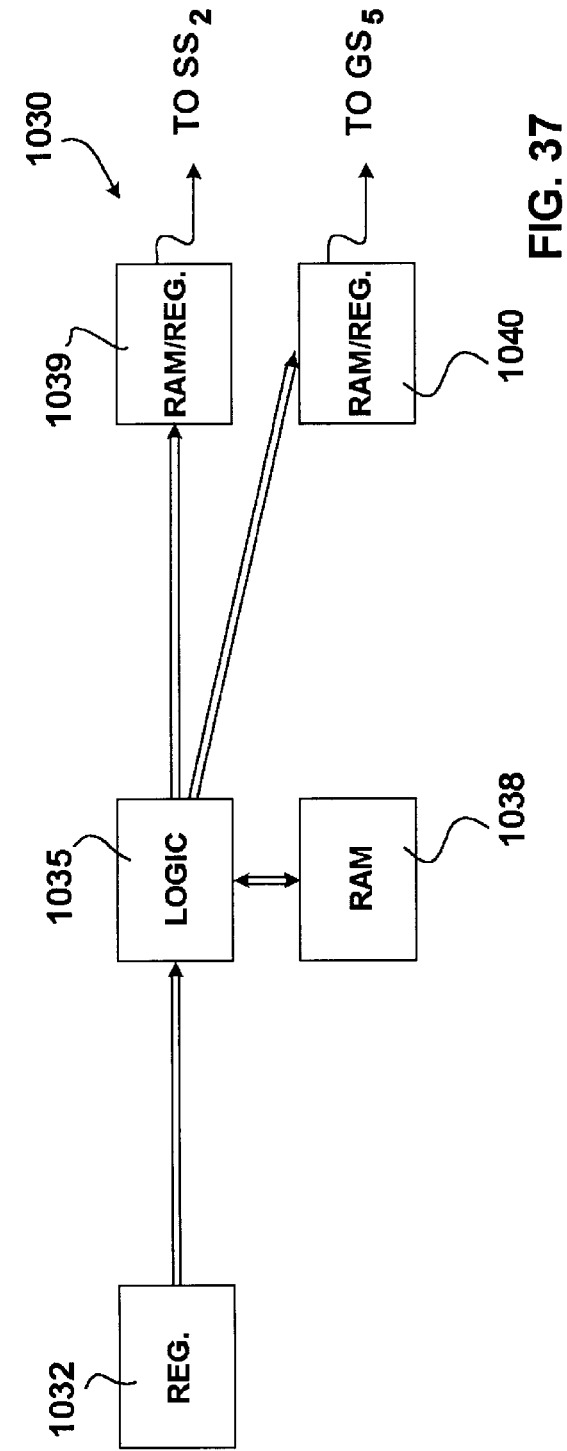
FIG. 35
FIG. 36
FIG. 37

| CARRIER FREQ | V | A | D | SUB-BAND |
|---|---|---|---|---|
| R | 1,2 | 3 | 4,5 | 901 |
| G | 1 | 2,3,4 | 5 | 902 |
| B | 1,2,3 | 4 | 5 | 903 |
| R | 1,2,3 | 4 | - | 904 |
| G | 1,2 | 3 | 4 | 905 |
| B | 1 | 2,5 | - | 906 |

Rows 901–903: $V_1$; Rows 904–906: $V_2$

FIG. 38

MULTI-POINT VIDEO CONFERENCE SYSTEM

CROSS REFERENCE TO RELATED APPLICATIONS

This application is a continuation of U.S. patent application Ser. No. 08/703,480, filed Aug. 27, 1996 now U.S. Pat. No. 6,049,644, which is a continuation of Ser. No. 07/826,372 filed on Jan. 27, 1992, now U.S. Pat. No. 5,691,777 issued Nov. 25, 1997, which is a continuation-in-part of U.S. application Ser. No. 07/573,539 filed on Aug. 27, 1990 now U.S. Pat. No. 5,157,491, which is a continuation-in-part of: Ser. No. 07/457,403 filed on Dec. 18, 1989, now U.S. Pat. No. 4,975,771 issued on Dec. 4, 1990, which in turn is a continuation-in-part of Ser. No. 07/308,826 filed on Feb. 10, 1989 now U.S. Pat. No. 4,903,126 issued on Feb. 20, 1990; and U.S. patent application Ser. No. 07/258,722 filed Oct. 17, 1988, now abandoned; all of which are incorporated herein by reference.

The present application also relates to the following foreign applications: (1) Canadian Patent No. 2,007,964, issued on Mar. 7, 1995; (2) Canadian Patent No. 2,070,529; (3) Japanese patent application No. 5-12038, filed on Jan. 27, 1993, and laid open under Provisional Publication No. 6-046029 on Feb. 18, 1994, now abandoned; and (4) Patent Cooperation Treaty application Ser. No. PCT/US89/05713, filed Dec. 19, 1989, now abandoned.

TECHNICAL FIELD

The present invention relates in general to telecommunications systems, such as cable, television, video and satellite broadcasting; printers; scanners (such as those used in photocopiers, facsimile machines and the like); recording and storage media; and like devices capable of producing a raster scan. The invention more particularly relates to efficient methods and systems for simultaneous digital compression of video, audio and/or data (VAD) signals to preselected degrees of compression, for use in military intelligence and civilian applications.

BACKGROUND OF THE INVENTION

I. Teleconferencing

Conventional Television and TV cable broadcasting is generally carried out on a real-time basis. For instance, it takes the same length of time to broadcast or transmit a TV program than it does to receive and display the program. Such broadcasting method has proven to be less than completely desirable due to limited TV bandwidth and channels allocation therein.

Channel availability has been a crucial limitation in the broadcasting industry. Channel allocation has been very valuable and expensive. It has precluded several interested persons, small businesses, consumers and local community chapters from accessing the TV broadcasting networks.

TV broadcasting has become the single most important and popular means for accessing and educating large numbers of citizens. Therefore, TV broadcasting has a direct effect on the right to free speech and expression as guaranteed by several constitutions around the world, including that of the United States of America.

Research and development has been carried out in the TV and video broadcasting field. The United States Department of Defense has sponsored several projects relating to the field of the present invention. The following Defense Technical Information Center (DTIC) technical reports exemplify some of these projects:

1. AD-A210 974, entitled "Robot Vehicle Video Image Compression."
2. AD-A191 577, entitled Narrative Compression Coding for a Channel with Errors."
3. AD-A194 681, entitled "SNAP/DDN Interface for Information Exchange."
4. AD-A174 316, entitled "A Packet Communication Network Synthesis and Analysis System."
5. AD-A206 999, entitled "Geometric Methods with Application to Robust Detection and Estimation."
6. AD-A207 814, entitled "Random Transform Analysis of a Probabilistic Method for Image Generation."
7. AD-A188 293, entitled "A Video-Rate CCD Two-Dimensional Cosine Transform Processor."
8. AD-A198 390, entitled "Navy Satellite Communications in the Hellenic Environment."
9. AD-A206 140, entitled "Investigation of Optional Compression Techniques for Dither Coding."

The following patents are incorporated by reference and teach various video broadcasting and teleconferencing techniques:

1. U.S. Pat. No. 3,693,090 to Gabriel, entitled "Wired Broadcasting Systems", and assigned to Communications Patents Limited.
2. U.S. Pat. No. 3,733,430 to Thompson et al., entitled "Channel Monitoring System", and assigned to RCA Corporation.
3. U.S. Pat. No. 4,215,369 to Ijima, entitled "Digital Transmission", and assigned to Nippon Electric of Japan.
4. U.S. Pat. No. 4,300,161 to Haskell, entitled "Time Compression Multiplexing of Video Signals", and assigned to Bell Telephone Laboratories.
5. U.S. Pat. No. 4,650,929 to Boerger et al., entitled "Communication System For Videoconferencing", and assigned to Heinrich Hertz Institute of Germany.
6. U.S. Pat. No. 4,903,126 to Kassatly, entitled "Method and Apparatus for TV Broadcasting".
7. U.S. Pat. No. 4,975,771 to Kassatly, also entitled "Method and Apparatus for TV Broadcasting".
8. U.S. Pat. No. 4,410,980 by Takasaki, entitled "Time Division Multiplexing System", and assigned to Hitachi Limited of Japan.
9. U.S. Pat. No. 4,533,936 by Tiemann, entitled "System for Encoding and Decoding Video Signals", and assigned to General Electric Co.
10. U.S. Pat. No. 4,593,318 by Eng, entitled "Technique for the Time Compression Multiplexing of Three Television Signals", and assigned to AT&T Bell Laboratories.
11. U.S. Pat. No. 4,646,135 by Eichelberger, entitled "System for Allowing Two Television Programs Simultaneously to Use the Normal Bandwidth for One Program by Chrominance Time Compression and Luminance Bandwidth Reduction", and assigned to General Electric Co.
12. U.S. Pat. No. 4,442,452 by Powell, entitled "Image Processing Method Using a Block Overlap Transformation Procedure", and assigned to Eastman Kodak.

The Boerger 4,650,929 patent is a representative publication of the state of the relevant art in the video teleconferencing field, and will now be described in more detail. The Boerger patent generally relates to a video-conferencing system which basically includes a central station 1 and a significantly limited number of subscribers stations 25. Boerger acknowledges the limitation of the patented system in column 3, lines 41–43, and column 7, lines 51–52, and states that it only accommodates a maximum of 12 subscribers. Furthermore, the main purpose of the central station appears to be that of "an intermediary or exchange between sources and sinks, i.e. transmitting and receiving signal points". Column 3, lines 10–13.

Therefore, the Boerger system, in general, seems to connect only a very limited number of specific subscribers; collects the video and audio signals from these subscribers in the central station; and sends the collected signals back to the subscribers. These signals are sent back to the subscribers in a non-compressed format, on a real time basis.

FIG. 4, and the corresponding description of the system in the specification, column 7, lines 15–18, lines 29–33 and lines 54–62; and column 9, lines 53–58, indicate that the incoming video source signals 41 are passed through an analog-to-digital converter 9 to a large picture storage 5, and to a small picture storage 6. The video signals from the large and small picture storages 5 and 6 are then fed to multiplexers 17, 18, and therefrom, through a digital-to-analog converter 19 to the respective connecting line 36. Therefore, the video signals are converted back to analog signals prior to transmission to the participant subscribers, and as such the signals are said to be transmitted on a real-time basis, and are not compressed. Consequently, there is no need to decompress the video signals at the participant subscribers' locations 25. Please refer to column 3, lines 24–27, which confirm that "[if] picture storage units and multiplexers are employed for video signals in digital form, conventional networks can be used, as before, equipped for transmitting analog signals."

The gist of the Boerger system therefore seems to be the use of conventional cameras and monitors at the participant locations, as well as "control means which can be manipulated to initiate communication with other participants and to control the images displayed." Column 2, lines 37–39. The signals 42 which are transmitted to the participant locations 25 already contain the composite mixture of large and small pictures as selected by the location 25, and consequently, the location 25 does not include means for demultiplexing and decompressing the signals.

Furthermore, while Boerger mentions the use of multiplexers, he did not teach any discipline for conducting the multiplexing of the video signals. It appears that Boerger is simply equating multiplexing with mixing of signals from the large and small picture storages 5 and 6.

Additionally, the limited capability of the Boerger system renders it similar to a closed loop system, and if the maximum number of subscribers (12 subscribers) are using the system, other participants will be locked out, and will not be able to join in or to establish their own videoconferencing session. This is a significant limitation, as it renders the Boerger system generally inefficient as a public video tele-conferencing system.

As a quasi-closed loop, private video conferencing system, Boerger is not concerned with and does not address the issue of video channel availability. For all practical purposes, each one of the large and small picture signals can be assigned its own transmission bandwidth (column 3, lines 30–40), without regard to the compression requirements. This holds particularly true if the connecting lines 36 and return channels 37 are actual cable lines as opposed to television or satellite telecommunications channels.

Therefore, it would be highly desirable to have a new and improved method and apparatus for video teleconferencing and for increasing video channel availability and for rendering the video channel allocation process more efficient. The new method and apparatus should be relatively simple and inexpensive to implement and to place into effect. The new method and apparatus should also be capable of being implemented with new as well as existing television or receiver sets.

II. Video Cameras

The first generation of color studio cameras used three image orthicon tubes, which were essentially three identical monochrome camera channels with provisions for superposing the three output-signal rasters mechanically and electrically. The optical system consisted of a taking lens which was part of a four-lens assembly. The scene was imaged in the plane of a field lens using a 1.6-inch diagonal image format. The real image in the field lens was viewed by a back-to-back relay lens assembly of approximately 9 inch focal length. At the rear conjugate distance of the optical relay was placed a dichromic-prism beam splitter with color-trim filters.

In this manner, the red, blue, and green components of the screen lens were imaged on the photo-cathodes of the three image orthicon tubes. A remotely controlled iris located between the two relay-lens elements was used to adjust the exposure of the image orticons. This iris was the only control required in studio operation. These cameras are no longer in use because of their size, cost, and operating and setup requirements, compared to photoconductive cameras.

Four-tube (luminance-channel) cameras were then introduced when color receivers served a small fraction of the audience. The viewer of color program in monochrome became aware of lack of sharpness. Using a high-resolution luminance channel to provide the brightness component in conjunction with three chrominance channels for the Red (R), Green (G) and Blue (B) components produced images that were sharp and independent of registry errors.

Improvements in scanning components and circuits have eliminated the need for use of a separate luminance channel in order to obtain adequate resolution. However, for a period of time, the four-tube approach continued to be used for telelcine applications where the inclusion of an additional vidicon channel was not an appreciable cost consideration or of mechanical complexity. Nevertheless, the four-tube cameras were supplanted by the three-tube photoconductive cameras and by non-storage flying-spot and charge coupled device scanning systems.

A color television camera must produce R, G and B video signals which complement the characteristics of the NTSC three-gun three-phosphor standard additive display tube. For both live and film cameras it is now common to use a camera with three photoconductive pickup tubes with a high-efficiency dichromic light splitter to divide the optical image from a zoom lens into three images of red, blue and green, with different spectral characteristics.

Light splitting is accomplished by a prism or by a relay lens and dichromic system. The prism has the advantage of small size and high optical efficiency but a disadvantage in that the three tubes are not parallel to each other and are thus more susceptible to misregistration produced by external magnetic fields. A more serious problem is that of obtaining a uniform bias light on the face of the tubes. Bias light producing 2 to 10 percent of the signal is used in most modern cameras to reduce lag effects. Nonuniformity of the bias light can produce color shading in dark areas of the picture. Most new designs now use the prism splitter.

Therefore, it would be highly desirable to have a new video camera that does not use multiple color optical splitters, and which improves the sharpness and resolution of the image.

One of the most important criteria for determining the picture quality of a color television camera is the signal-to-noise ratio, which is measured in decibels according to the following formula:

$$dB=20.\log[\text{peak-to-peak video voltage/rms noise voltage}].$$

Noise also plays an important role in the quality of the video signals transmitted. Several types of radio noise must be considered in any design, though, in general, one type will be the dominant factor. In broad categories, the noise can be divided into two types: noise internal to the receiving system, and noise external to the receiving antenna.

The noise of the receiving system is often the controlling noise in systems operating above 100 MHz. This type of noise is due to antenna losses, transmission-line losses, and the circuit noise of the receiver itself.

Several costly designs, using elaborate mathematical equations, have been devised to reduce the noise factor and to improve the signal-to-noise ratio. However, low-cost circuit designs still include a relatively low signal-to-noise ratio, for cost effectiveness.

Therefore, it would be desirable to have a new circuit design and method for improving signal-to-noise ratio in video broadcasting systems, and particularly in low cost video cameras and broadcasting systems.

III. LCD Monitors

Liquid crystal display (LCD) monitors have become increasingly popular in the television and computer industries. In general, a conventional LCD monitor includes a single rigid screen which permits the display of either video signals or computer generated signals. The following patents illustrates some exemplary conventional liquid crystal display devices and methods of manufacturing the same:

1. U.S. Pat. No. 4,874,227 issued to Matsukawa et al. describes a large-size crystal display which is used as a large picture display for a sign or advertisement at railway stations, airports or for projection at halls or theaters. Matsukawa teaches the use of a single unitary rigid large size display of fixed dimensions and size.
2. U.S. Pat. No. 4,806,922 issued to McLaughlin et al. generally describes a large size LCD having several nematic curvilinearly aligned phases (NCAP) liquid crystal material. The modules are positioned adjacent to one another to effect a single display having a relatively large area. The McLaughlin patent is incorporated herein by reference.
3. U.S. Pat. No. 4,597,058 issued to Joseph et al. discloses a large liquid crystal display electronic sign which employs several modules that are juxtaposed adjacent to one another on a transparent diffuser plate and a conducive liquid crystal coating layer between the plates.
4. U.S. Pat. No. 4,832,457 to Saitoh et al., assigned to Hitashi Limited of Japan, and entitled Multipanel Liquid Crystal Display Device", relates to a method of manufacturing the LCD, by combining two or four LCD panels to increase the displayable area.

Liquid crystals are also defined in several publications, among which is the "Electronics Engineers' Handbook", Third Edition, McGraw Hill Publications, page 6–36, where a general brief explanation of the use of liquid crystal displays in television, is given at page 20–120.

However, conventional liquid crystal monitors still include a single screen which does not enable the user to select the desired sizes and shapes of the screen. The size and weight of a LCD monitor are important features for the LCD to compete with other displays, and printed publications such as newspapers. For this purpose, the monitor should be small in size and light in weight. Additionally, conventional displays, including lap top computers, are generally inconvenient to transport, since the screen is a single rigid screen which commonly folds over the keyboard.

Furthermore, conventional displays do not generally address the growing elderly and disabled populace, who would be very inconvenienced by the fixed size of the conventional display monitors. At present, these monitors do not enable this group of people to accommodate the displayed material to their own personal needs. In some instances, an elderly person might wish to read a newspaper, but is prevented from doing so because of that person's inability to read small print characters, and to hold and flip through the relatively heavy paper.

Therefore, it would be desirable to have a display monitor which uses liquid crystal material, and which could be sized and dimensioned by the user according to the user's particular needs.

IV. Paperless Network

At present, information is widely spread and distributed by means of publications such as newspapers, books and magazines. Generally, publications are distributed individually to subscribers in a relatively cumbersome, costly and inefficient way. Furthermore, the reader or subscriber usually finds it bulky, cumbersome and inconvenient to carry or transport the printer publication for reading or reviewing it at a later time.

Printed publications can be relatively heavy, and can contain information that is not of particular interest to the reader. Additionally, there is a private and public concern with respect to the manner of disposing of the printed publications once they have been read, and are no longer of use. This constitutes substantial waste of resources, which has instigated attempts to recycle and reuse the paper. Nonetheless, the recycling process does not solve all the foregoing problems.

Some methods have been designed to substitute for the paper dissemination of information, among which are computers, audio and video cassettes, floppy disks and like devices. However, there has been no paperless device or method which substitutes entirely for the paper dissemination of information.

Therefore, there is a substantial need for a new and improved paperless network and method of using the same for disseminating information. The new network and method of using it should substantially reduce or substitute for the use of paper, thus reducing the cost of distribution and waste. The new network should render the transfer, transport, storage and review of published information convenient, and should permit a wasteless disposition thereof.

U.S. Pat. No. 4,597,058, issued to Izumi et al., and U.S. Pat. No. 4,654,799, issued to Ogaki et al. describe software vending machines, it being understood that "software" includes machine readable codes to the exclusion of "human readable" or printed publications.

Software vending machines address distinctly different problems than printed publications. The Izumi vending machine is provides for a cartridge programming system and method for storing a library of programs and for loading a selected program or set of programs onto reprogrammable cartridge memories.

Other objects of the Izumi vending machine are to provide a method of maintaining a program library without requiring a large inventory of memory cartridges; and to provide a system for programming a cartridge memory without removing the semiconductor memory chip from the cartridge.

However, conventional software and other publications vending machines do not yet present an acceptable alternative to printed publications, which deal with different problems, among which are: (1) Inefficient and wasteful distribution of printed publications; (2) Indirect restraint on the United States constitutional freedom of speech; (3) Waste of natural resources; and (4) Environmental concerns.

With the foreseeable depletion of natural resources, such as timber, paper publications will become increasingly expensive to produce. This will eventually force the conventional printing industry to select alternate less expensive routes. After printing, the conventional paper publications are conventionally transported, stored, and distributed at an enormous and wasteful overhead, cost and labor.

Nowadays, small businesses and individuals find it quite prohibitive to advertise and/or to express their views in conventional publications, such as newspapers. As the cost of printed publications rises with the continuing decrease of natural resources, it will become even more forbidding for individuals and small businesses to retain, even the limited access to printed publications, they now enjoy. This problem will become a major concern in the near future, as it will very subtly become an indirect restraint on the constitutional freedom of speech.

Enormous waste of natural resources are presently generated by the use of conventional paper publications. For instance, it is highly unlikely that the subscribers read each and every line or page of their daily newspapers or weekly journals. Despite the huge waste of natural resources, conventional publications methods are still being used to publish newspapers which are not even read in their entirety.

Consider also the environmental issues relating to the waste generated by the conventional paper publications. Recycling is becoming increasingly popular in industrialized countries such as the United States, and other countries are following suit. Recycling bins dedicated to paper are sprouting nationwide, and dumping sites are filling up and becoming harder to locate due to increasing social and environmental pressures.

Therefore, it would be highly desirable to have a new system which will ultimately substitute for the conventional printed publications, and which will render the distribution and dissemination of information efficient and economical, and as such, more accessible to the members of the general public. The new system should eliminate or substantially reduce the current impermissible waste of natural resources which are depleted by the conventional publication industry.

V. Program Delivery System With Digital Compression and Encoding/Decoding Scheme Methods for digitizing and compressing video signals are well known. The following patents, are incorporated by reference and teach various conventional video digitization and compressing techniques:

1. U.S. Pat. No. 3,740,466 to Marshall et al., entitled "Surveillance System", relates to a system for maintaining surveillance for detecting changes of interest in the surveilled domain and ignoring other changes. The system employs an analog to digital converter 50 for converting the analog television input signals into a digital format which is stored in the computer memory.

2. U.S. Pat. No. 3,883,685 to Yumde et al., entitled "Picture Signal Conversion System", and assigned to Hitachi Limited of Japan, relates to a system for converting an analog signal of a wide band into a pulse train signal of a narrow band. The input picture signal is converted into a digital signal and is successively written in the digital memory. When the picture signal of one frame is written in to fill up the digital memory, a write-in end pulse signal is generated by a clock pulse signal generator.

3. U.S. Pat. No. 3,883,686 to Jacobacus et al., entitled "Method to Reduce the Effect of a Loss of Information during the Transmission Compressed Band Width and Device for Carrying out the Method", and assigned to T. L. M. Ericsson of Sweden, generally relates to a technique for reducing the effect of loss of information during transmission at compressed bandwidth of a PCM-signal. A PCM coder converts the analog video signal to a PCM signal such that the picture elements in the video signal will be the equivalent to PCM words having binary values which are equivalent to respective light intensities of the picture elements.

4. U.S. Pat. No. 4,075,658 to de Cosnac et al,. entitled "Method and Device for Isolating Figures in an image", and assigned to Commissariat a L'Energie Atomique of France, relates to a method for converting the graphic information in the image to a video signal constituted by a succession of lines, each being sampled sequentially to obtain an ordered series of points which is stored in memory.

5. U.S. Pat. No. 4,079,417 to Scudder, entitled "Digital Video Window Control", and assigned to General Electric Company, relates to a digital signal processor which is connected between a refresh memory at the output of a digital computer in an x-ray tomography, and the digital to analog converter of a CRT display to provide a limited resolution gray scale display of a selected portion from an image signal having wide dynamic range.

6. U.S. Pat. No. 4,095,259 to Sawagata, entitled "Video Signal Converting System Having Quantization Noise Reduction", and assigned to Sony Corporation of Japan, relates to a system for converting a video signal into a digitized signal, and for clamping the levels at every horizontal synchronizing interval. The levels are randomly shifted before conversion, whereby quantization noise can be scattered on a displayed image by reclamping after a reconversion of the signal.

7. U.S. Pat. No. 4,124,871 to Morrin, entitled "Image Data Resolution Change and Apparatus and Process Utilizing Boundary Compression Coding of Objects", and assigned to IBM Corporation, relates to a method for using the information obtained in the boundary following exterior and interior borders of objects, to accomplish resolution or size changing of scanned objects.

8. U.S. Pat. No. 4,127,873 to Katagi, entitled "Image Resolution Enhancement and Apparatus", and assigned to RCA Corporation, generally relates to the display of a frame of information in the form of a row and column matrix of display elements. The matrix is created from a corresponding group of data cells stored functionally in the form of a row and column, where the number of rows and columns in the stored matrix is less than the number of rows and columns in the displayed matrix.

9. U.S. Pat. No. 4,143,401 to Coviello, entitled "System For Generating Line Drawing of a Scanned Image", and assigned to Westinghouse Electric, generally relates to scanners for detecting changes in the gray scale of a scanned image to generate line drawing corresponding to changes in the gray scale image. Each line of video information produced by scanning the image is digitized. Each digitized sample is compared to digital samples delayed a predetermined amount to generate a difference signal which is indicative of a change in the gray scale having a component perpendicular to the direction of the scan.

10. U.S. Pat. No. 4,148,070 to Taylor, entitled "Video Processing System", and assigned to Micro Consultants of England, generally relates to the manipulation of pictures by digital methods in diverse fields. A digital frame store receives and stores digital video signals. A digital to analog converter converts the data back into analog form, and accessing means provides random access to the frame store locations during the video blanking time to allow processing of the data.

11. U.S. Pat. No. 4,183,058 to Taylor, entitled "Video Store", and assigned to 0.20 Micro Consultants of England, generally relates to video digital storage systems. The store may be operated in an asynchronous manner.

12. U.S. Pat. No. 4,189,744 to Stern, entitled "Apparatus for Generating Signals Representing Operator selected Portions of a Scene", and assigned to New York Institute of Technology, generally relates to an apparatus for generating video-representable signals which represent one or more operator-selected portions of a scene. The apparatus includes means for displaying the tabulation of the pixel values, and an operator can select desired portions of an existing scene and automatically obtain stored contour outlines of those portions.

13. U.S. Pat. No. 4,193,096 to Stoffel, entitled "Half Tone Encoder/Decoder", and assigned to Xerox Corporation, generally relates to a system for compressing scanned image data. The system subdivides the image data pixel pattern into quadrants encodes pictorial data, by predicting form the established image values of adjoining quadrants, an image value for each quadrant.

14. U.S. Pat. No. 4,242,707 to Budai, entitled "Digital Scene Store", generally relates to a method for raster scanning a scene. During each scan, an analog signal derived from a binary number and representing a given light intensity is compared against other analog signals representing the light intensity of each of the pixels. When the light intensity of a pixel is greater than the given light intensity, the binary number associated with that given light intensity is stored in registers assigned to the respective pixels. After each scan, the given light intensity is increased.

15. U.S. Pat. No. 4,282,546 to Reitmeier, entitled "Television Image Size Altering Apparatus", and assigned to RCA Corporation, generally relates to a method for separating composite pixel information into original pixels relating to each basic component of the video signal. Interpolated pixel values are then derived from the original pixel values at an effective rate less than the synchronous rate when compressing the image size, and at an effective rate greater than the synchronous rate when expanding the image size.

16. U.S. Pat. No. 4,302,776 to Taylor et al., entitled "Digital Still Picture Storage System with Size Change Facility", and assigned to Micro Consultants of England, generally relates to a method for digital picture processing suitable for use in a digital picture library. The system includes real time frame storage and a non-real time store. The size change mechanism has access to the data in the non-real time domain to allow size change techniques to be used.

17. U.S. Pat. No. 4,365,273 to Yamada et al., entitled "Picture Data Compression Method", and assigned to Dainippon Screen Seiko Kabushiki Kaisha of Japan, generally relates to a method for compressing picture data where an original picture is scanned photoelectrically to obtain analog picture signals which are converted into picture data to be transmitted. Each matrix of picture data is compared with an adjacent picture data in horizontal, vertical, right upper diagonal and left upper diagonal directions to obtain comparisons results.

18. U.S. Pat. No. 4,369,463 to Anastassiou, entitled "Gray Scale Image Data Compression with Code Words a Function of Image History", and assigned to IBM Corporation, generally relates to a method for generating a minimum length code word stream for efficient transmission or storage of two dimensional gray scale image data utilizing the concepts of adaptive differential pulse code modulation (PCM).

19. U.S. Pat. No. 4,417,276 to Bennett et al., entitled "Video to Digital Converter", generally relates to a method for converting video signals to digital values and for storing these values in memory. Successive images are continuously digitized and adjacent picture elements are compressed to produce a spacially compressed image which takes up less memory space.

While the video digitization and compression techniques disclosed in the foregoing patents have proven to be adequate for their intended purposes, there is no teaching of a Program Delivery System (PDS) which is capable of simultaneously delivering multiple signals from different origins or sources, such as video, audio and/or data. The PDS should also allow program suppliers to provide multiple programs per transponder channel, such as a satellite transponder channel, to cable, television or other systems headends or end users. One application for the PDS should be to provide multiple video outputs with multiple audio channels and VBI text signals for each video output. Another application of the PDS should be to provide various degrees of compression for different combinations of video, audio and/or data signals.

Therefore, it would be desirable to have a new Program Delivery System which will be compatible with digital or analog compression distribution requirements of cable, television and satellite systems.

SUMMARY OF THE INVENTION

Therefore, it is an object of the present invention to address the above concerns, and to provide adequate solutions thereto.

It is another object of the present invention to provide efficient methods and systems for simultaneous digital compression of video, audio and data signals to preselected degrees of compression, for use in telecommunications systems and networks, such as cable, television, video and satellite broadcasting, as well as for use in printers, scanners, recording and storage media, and like devices capable of producing a raster scan.

Briefly, the above and further objects and features of the present invention are realized by providing a new and improved program delivery system using a compression apparatus capable of compressing incoming video and non-video signals, such as audio and data signals. The system includes a frequency modulator which modulates the incoming audio, data or other non-video signals, unto selected video frequencies.

A Fourier transformer generates a set of sinusoidal transform components corresponding to the incoming video, audio, data or other non-video signals, and a selector chooses the most desirable Fourier sinusoidal transforms. A multiplexer multiplexes only the selected Fourier transform components for further processing.

The foregoing compression technique used in the program delivery system could also be used in various other applications, such as recording and storage media, for instance optical discs, floppy discs, compact discs; cassettes of different sizes like micro or mini cassettes, as well as in the ultrasound technology for use in medical applications.

BRIEF DESCRIPTION OF THE DRAWINGS

The above and other features of the present invention and the manner of attaining them, will become apparent, and the invention itself will be best understood, by reference to the following description and the accompanying drawings, wherein:

FIG. 10 is a top plan view of three lens systems R, G and B used in the optical system of FIG. 9;

FIG. 11 is a more detailed top plan view of one lens system of FIG. 10;

FIG. 12 is an enlarged side view of the lens system of FIG. 11, along the line K-K;

FIG. 13 illustrates another embodiment of the lens system of FIG. 11;

FIG. 14 is a three-dimensional coordinates system and a vectorial representation of a three dimensional frequency color spectrum according to the present invention, for use in the video optical system of FIG. 9;

FIG. 15 is another three-dimensional coordinates system and a vectorial representation of a three amplitude dimensional color spectrum according to the present invention, for use in the video optical system of FIG. 9;

FIG. 26 provides details, in a block diagram form, three audio channels $AC_1$, $AC_2$ and $AC_3$ in the ground station $GS_1$ of FIG. 25;

FIG. 30 represents marker channels for the video, audio and data (VAD) channels in the ground station $GS_1$, showing the audio and data signals being modulated at selected video frequencies;

FIG. 35 represents a portion of the marker channel of FIGS. 30 and 34;

FIG. 36 represents a portion of the marker channel of FIG. 35 with the VAD signals further compressed according to the teachings of the present invention;

FIG. 37 is block diagram architecture of a video, audio and data (VAD) mapping system for processing video, audio and data signals according to the present invention; and FIG. 38 is a tabular representation of the record provided by the VAD mapping system of FIG. 37.

DESCRIPTION OF THE PREFERRED EMBODIMENT

Figure 1:
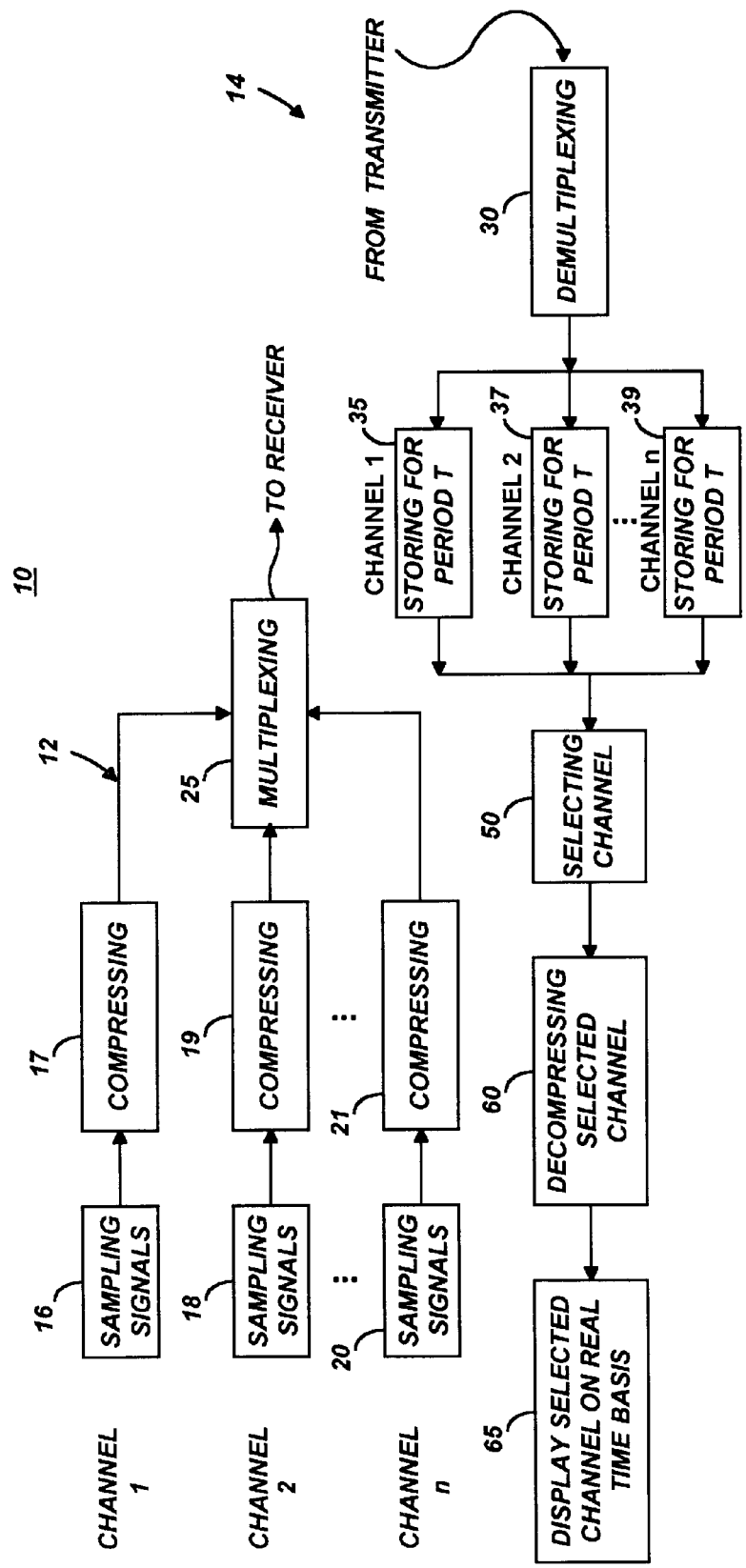
FIG. 1 is a block diagram of a method for broadcasting and receiving TV signals according to the present invention.

Referring now to the drawings, and more particularly to FIG. 1 thereof, there is illustrated a flow chart of a method 10 for broadcasting and receiving TV or video signals according to the present invention. The method 10 generally comprises a process 12 for processing signals to be transmitted, and a process 14 for processing the received signals.

In conventional television or video broadcasting systems the channels 1 through n are received and then displayed on a real time basis as corresponding channels 1 through n. These channels generally occupy the entire bandwidth at the receiver end. Thus, the channel availability in conventional broadcasting systems is severely limited by the allocated TV bandwidth. In most instances, this bandwidth is fixed or limited, and thus not expandable. Since each one of the received channels also generally have fixed bandwidths, the number of channels cannot be increased.

Therefore, the present broadcasting method 10 (FIG. 1) and apparatus 200 (FIG. 3) offer a valuable advantage over the conventional methods and apparatus, in that the present method and apparatus enable the accommodation of a substantially larger number of channels in the limited TV bandwidth of the receiver.

The transmission process 12 generally includes multiplexing signals from a plurality of channels 1, 2, through n, prior to transmission. The multiplexed signals are then transmitted over a single base frequency. The channels 1 through n generally occupy the entire allocated television or video bandwidth.

The reception process 14 generally includes demultiplexing the transmitted signals, storing the received signals for a predetermined period of time T, and then displaying only the selected channel, on a screen.

Figure 4:
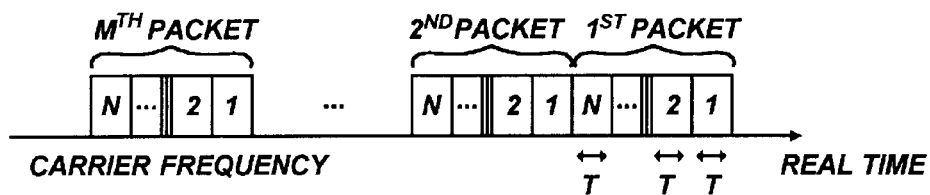
FIG. 4 is diagrammatic representation of the real-time signal processing at the output of a transmitter circuit which forms a part of the apparatus of FIG. 3.

Considering now the transmission process 12 in greater in detail, with respect to FIGS. 1 and 4, it includes sampling the signals of a first channel 1 as indicated at 16, for a predetermined period of time T1. The sampled signals are then compressed at 17.

The signals of each one of the remaining channels 2 through n are processed similarly to channel 1, as indicated at 18, 19, 20 and 21. The multiplexing of the signals from all the channels 1 through n are then multiplexed at 25 in the form of successive packets. FIG. 4 illustrates the real-time multiplexing of the signals from all the channels 1 through n.

Figure 5:
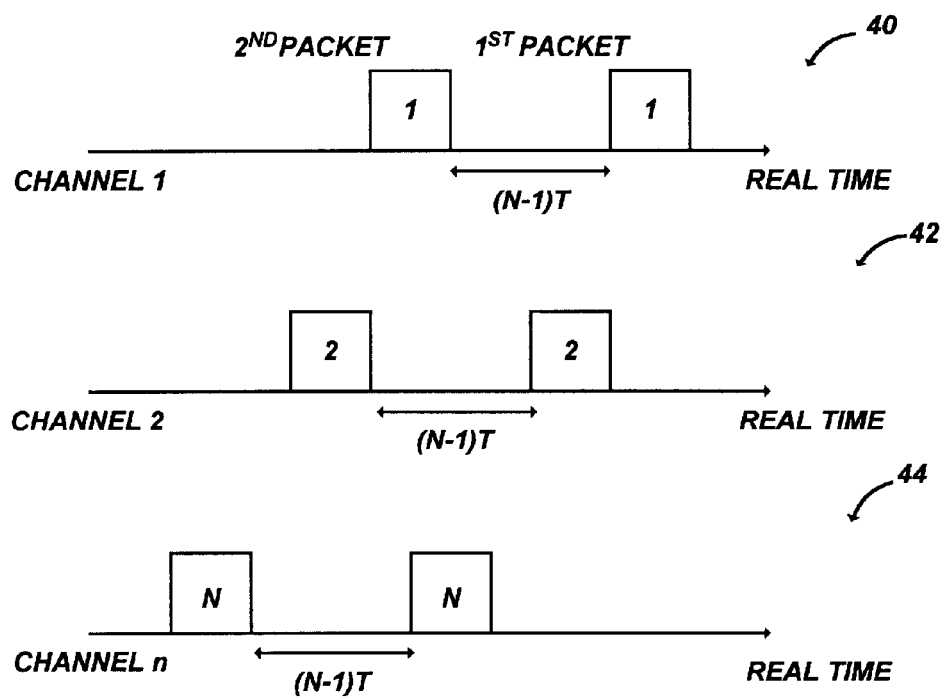
FIG. 5 is a diagrammatic representation of the real-time signal processing at the input of a receiver circuit which forms a part of the apparatus of FIG. 3.

Returning now to FIG. 1, the reception process 14 includes receiving the multiplexed signals and then demultiplexing the same at 30 into the same number of separate channels 1 through n. The signals are then independently stored as indicated at 35, 37 and 39 in FIG. 1, and at 40, 42 and 44 in FIG. 5.

Once a particular channel, such as channel 2 is selected at 50 (FIG. 1) only the signals of that particular channel are displayed on a real-time basis. However, since the last compressed signals in a packet, such as the first packet, for each channel, such as channel 2, are separated from the beginning of the compressed signals in the next packet, by (n−1)T1, it is important to serially display the information contained in successive packets to avoid a non-continuous display of signals.

For this purpose, a processor or computer (not shown) at the receiving end decompresses the signals of the selected channel at 60, and reconstructs the initial real-time signals. Simultaneously, the processor expands the real-time spread of the restored signals over a period T1, thus bridging the (n−1)T1 time between two successive packets. The restored signals are then displayed at 65. While the sampling period T' could be equal to the storage period T, these two values are not necessarily always equal.

At present, a major limitation to the period T is the limitation on the storage memory. However it should be understood that with the increased availability of expanded memory capacity, the period T will, in the future, be capable of being increased as required by the particular applications such as for several hours or longer.

Figure 2:
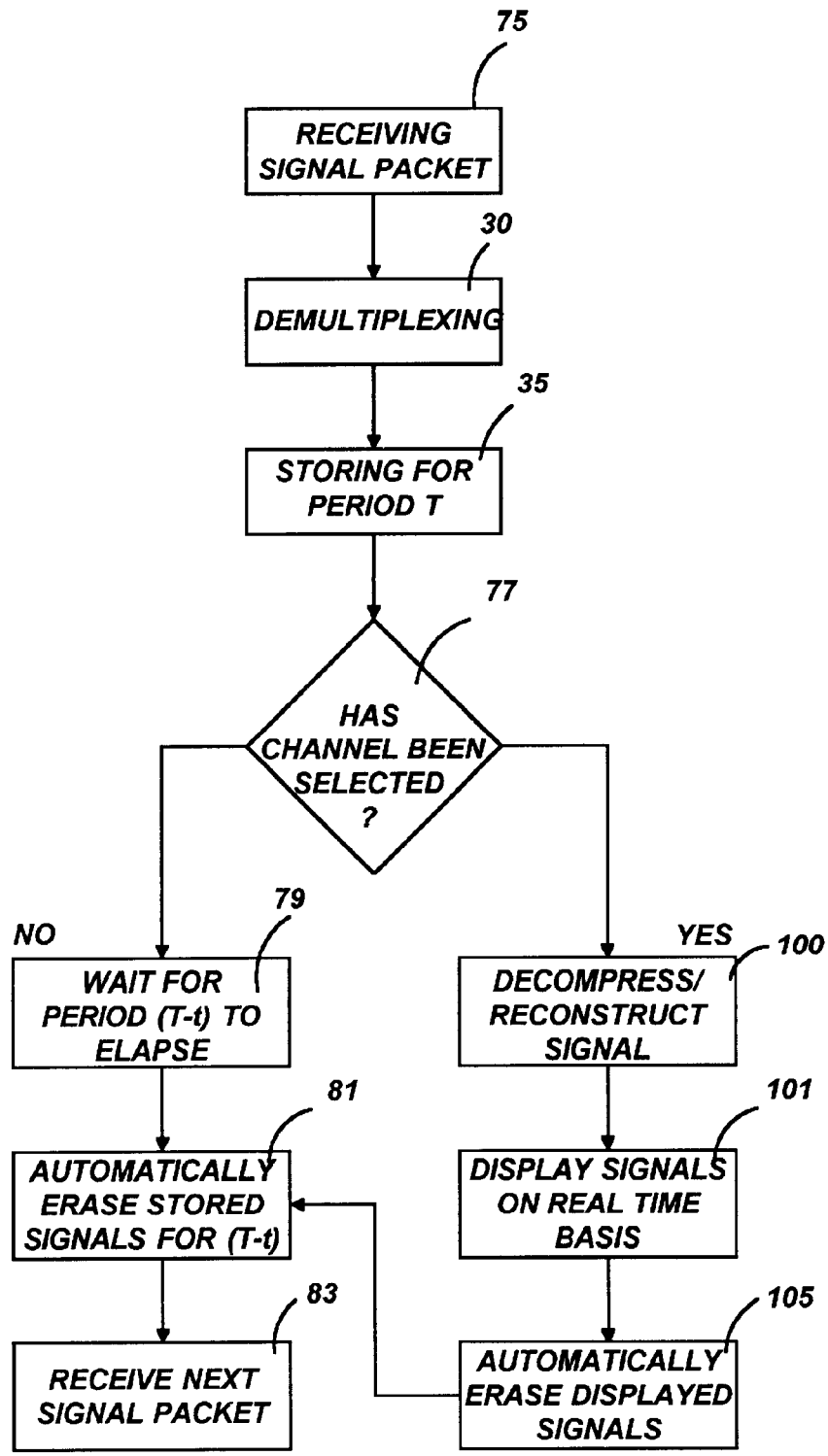
FIG. 2 is a flow chart further detailing the method for broadcasting of FIG. 1.

Considering now FIG. 2 in greater detail, it generally illustrates a flow chart further detailing the reception process of the signals for each individual channel such as channel 1. Such process is carried out by a software program at the receiving end or TV set.

The compressed signals are first received at 75, at the input of a demultiplexer 105 (FIG. 3) in the form of a packet of signals from various channels. The received signals are then demultiplexed at 30, and the demultiplexed signals are then stored for a predetermined period of time T, and for each channel separately from the others, as indicated at 35, 37 and 39 in FIG. 1.

The software then determines at 77 whether that particular channel has been selected. If it has not been selected, then the software waits at 79 for a period (T-t) to elapse; where "t" is defined as a relatively small incremental period compared to the period T.

At the end of the time period (T-t), the software automatically erases the signals stored of the elapsed period (T-t), at 81. The time period t allows the signals from the next packet to replace the erased signals which are received by the demultiplexer 105. Thus, the period t can be substantially smaller than T, and for certain applications, the period t can be so negligible that it can be ignored totally.

The signals from the next packet are then received at 83, and the cycle of multiplexing and storing the signals is then repeated.

If the software determines that the particular channel has been selected by the user or TV viewer, then the stored signals for that particular channel are decompressed and restored at 100, in the manner described above.

The reconstructed signals are then displayed on a real-time basis at 101. Thus, instead of using real-time transmission of the signals, the signals can now be transmitted in a compressed form, thereby clearing precious channel space and increasing channel availability, and the real-time signal reconstruction is carried out at the user's level without excessive cost.

The signals which have been displayed are automatically erased from the storage memory at 105. Once the signals are reconstructed at 100 the previously stored compressed signals are automatically erased at 81, after a period (T-t) as shown in FIG. 2. And the cycle of demultiplexing, and storing the signals is then duplicated.

Figure 3:
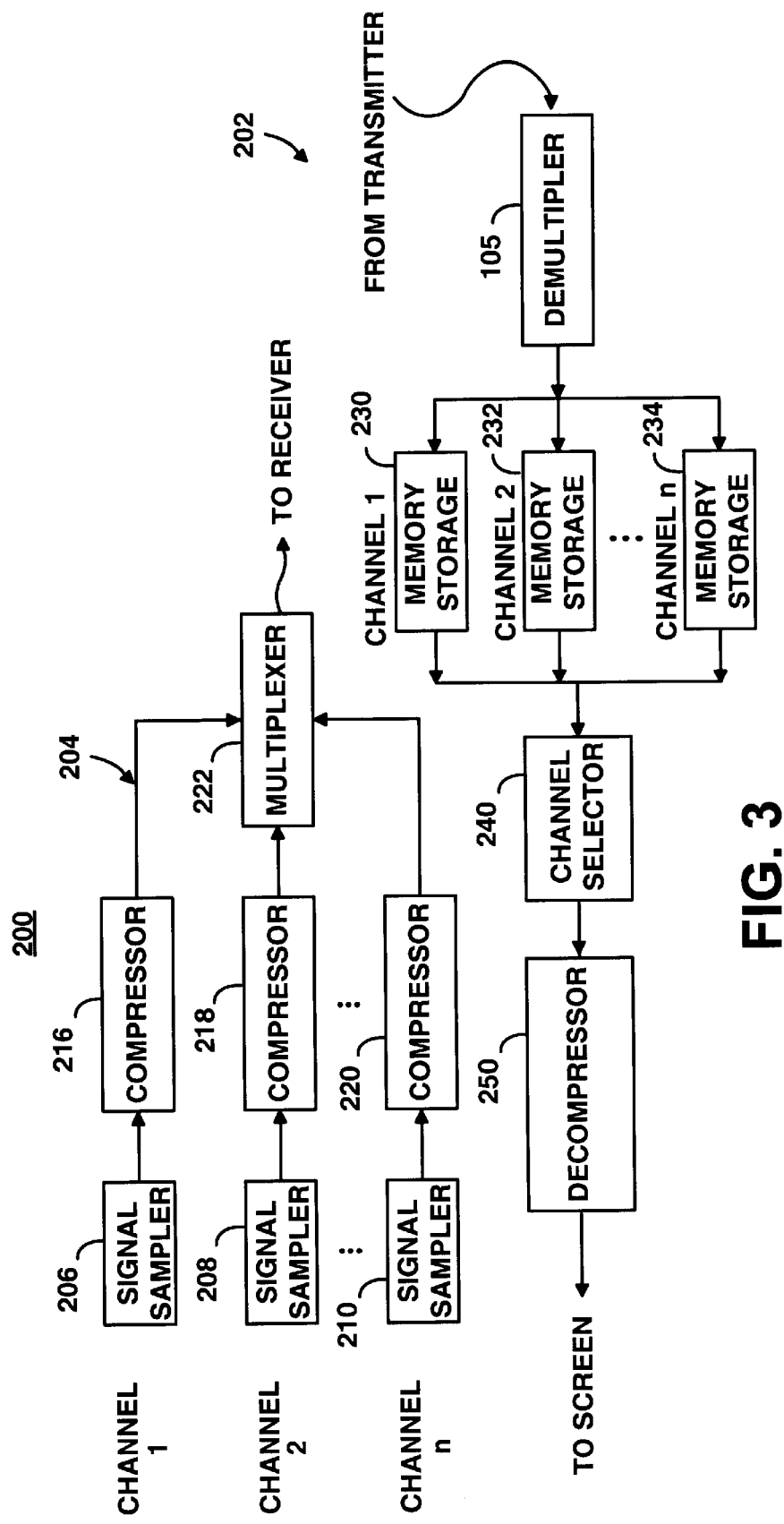
FIG. 3 is a block diagram of a TV broadcasting and reception apparatus which is constructed in accordance with the present invention, for implementing the broadcasting process of FIG. 1.

Referring now to FIG. 3, there is illustrated a block diagram of a TV broadcasting and reception apparatus 200 which is constructed in accordance with the present invention and which performs the steps of the process 10, as illustrated in FIG's. 1 and 2.

In operation, the user simply connects the reception circuit 202 of the apparatus 200 between his or her antenna or cable outlet and the conventional TV set, and operates his or her TV set as usual.

The apparatus 200 also serves another important function, namely to prevent copying or taping of the TV programs. This is accomplished by incorporating the reception circuit 202 inside the TV set, invisibly from the user, thereby preventing access to the reconstructed signals.

The apparatus 200 generally includes a transmission circuit 204 and the reception circuit 202. While the components used in the apparatus 200 are conventional parts, generally known and available in the electronics industry, it should be understood that the general architecture of the apparatus 200, including the combination of its components for producing the desired results, features and advantages is new.

The transmission circuit 204 generally includes a signal sampler 206, 208 and 210 for each one of the channels 1 through n respectively. It further includes a separate compression circuit 216, 218 and 220 for each one of the channels 1 through n. The compressed signals are then fed to a multiplexer 222, and are transmitted to the reception circuit 202.

The reception circuit 202 generally includes a demultiplexer 105 which separates the incoming signals into their respective separate channels. The demultiplexed signals are then stored in a separate memory storage 230, 232 or 234, for each one of the channels 1 through n.

A conventional channel selector 240 enables the user to select the channel he or she wishes to view. A decompressor 250 decompresses and reconstructs only those signals on the selected channel, which signals are then displayed on a screen or monitor (not shown).

An alternative embodiment of the present invention will now be described in conjunction with FIGS. 6, 7 and 8. The numeral references in FIGS. 6, 7 and 8 connote the same or substantially similar elements or processes to those in FIGS. 1, 2 and 3.

The alternative embodiment has several military and commercial applications. For instance, the inventive alternative broadcasting method 12 (FIGS. 6, 7) and apparatus 200 (FIG. 8) will provide substantial practical improvements to the United States Navy Telecommunications Systems (NTS), satellite communications, and sub-marine imaging.

In addition to the military applications, the inventive alternative broadcasting method and apparatus have versatile commercial applications, such as regular television, high definition TV (HDTV), as well as interactive television and educational video systems.

Figure 6:
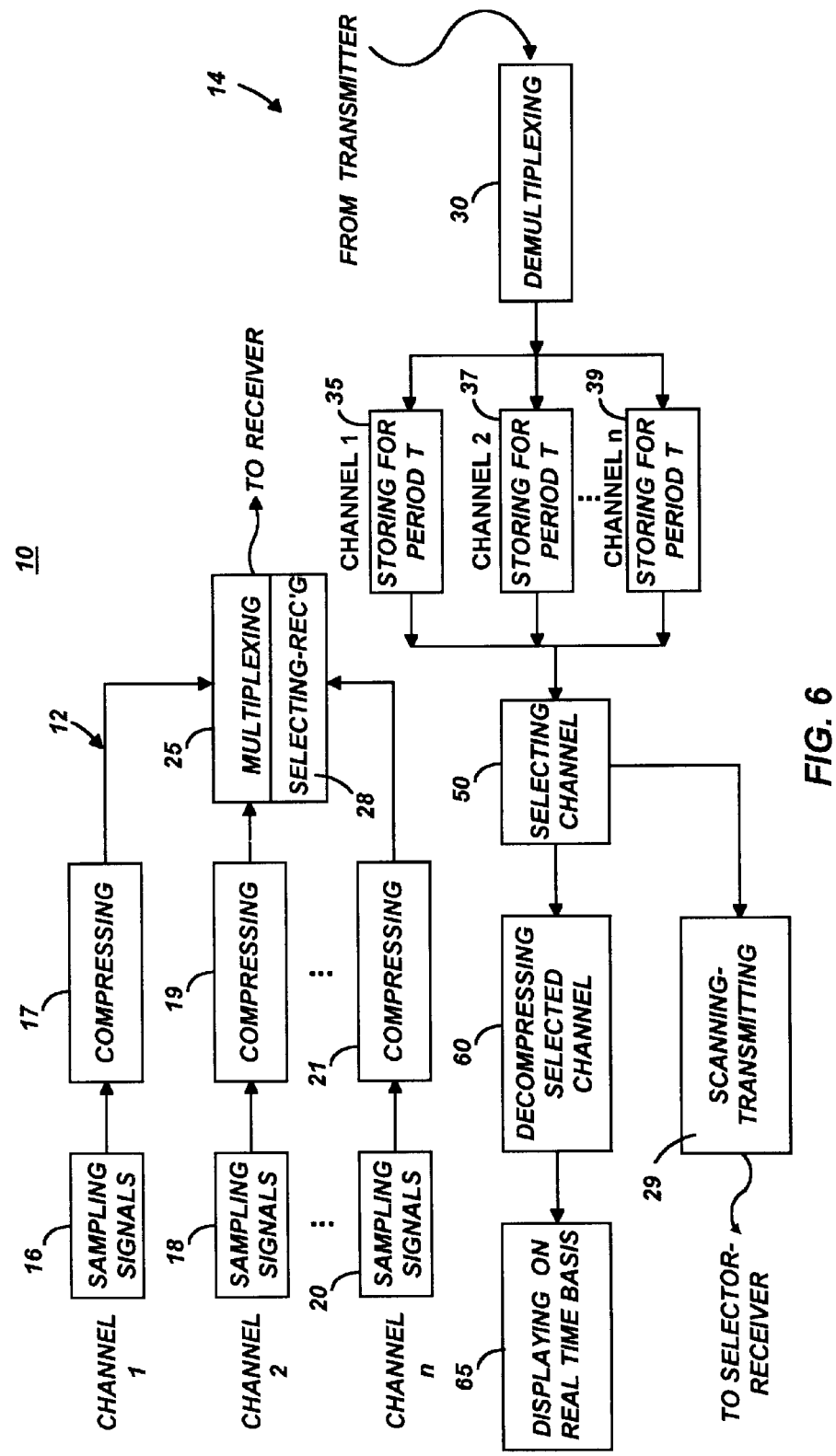
FIG. 6 is a block diagram of another method for broadcasting and receiving TV signals according to the present invention.
Figure 7:
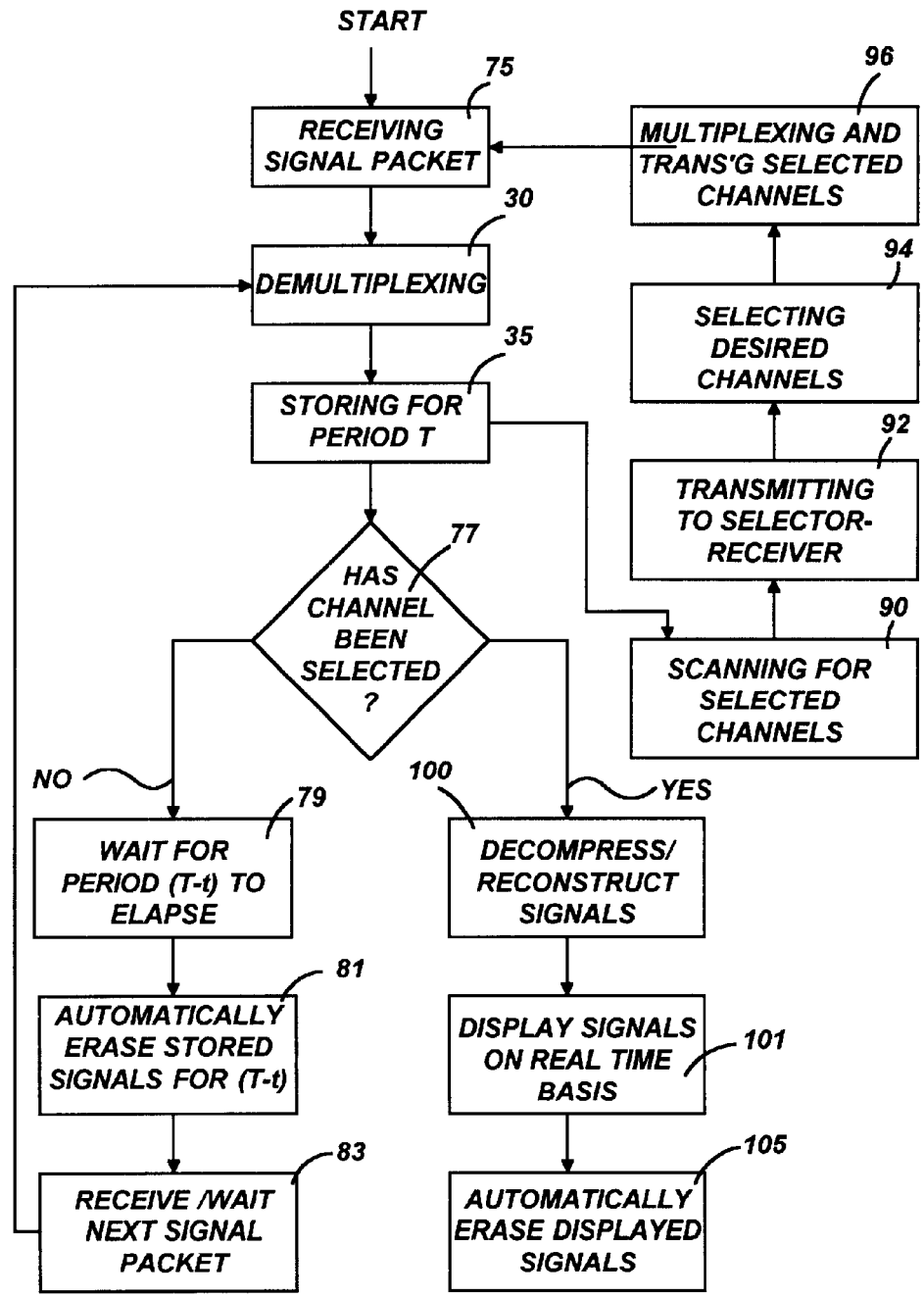
FIG. 7 is a flow chart further detailing the method for broadcasting of FIG. 6.
Figure 8:
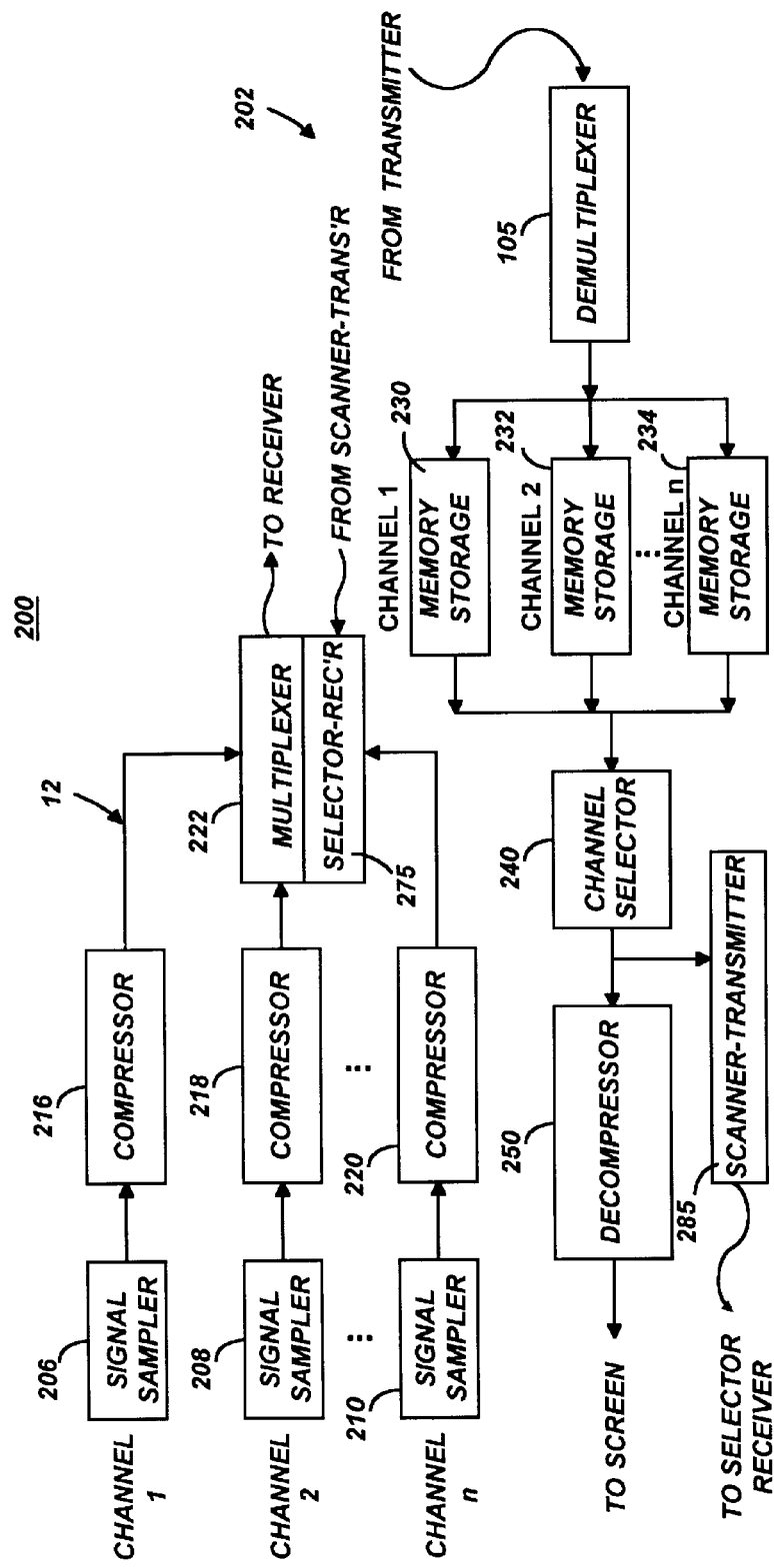
FIG. 8 is a block diagram of another TV broadcasting and reception apparatus which is constructed in accordance with the present invention, for implementing the broadcasting process of FIG. 6.

The alternate broadcasting method 12 of FIG. 6 includes identifying the channels that have been selected by the user at the receiver level 202, and then feeding this information back to the transmitter 204 (FIG. 8). This selection information is valuable in further enhancing the broadcasting process, in that the selection information is used to select which of the channels 1 through n will be transmitted.

Hence, instead of transmitting all the channels 1 through n, only those channels which the user wishes to view are selected and then transmitted. In this manner, the efficiency of the preferred broadcasting method illustrated in FIG. 1 is substantially improved.

Let us take a hypothetical example to illustrate the improvements presented by the alternate embodiment. If for instance 50 channels can be transmitted over a conventional television bandwidth, the preferred embodiment will allow the transmission of at least 100 channels, while the alternate embodiment will permit the selective transmission of over 200 channels.

It is preferable to use the alternate broadcasting method and apparatus in special applications such as satellite communications and interactive video, where the number of selected channels is limited. In case of public broadcasting, such as in regular televisions, where all or most of the channels are simultaneously selected by the viewers, the preferred embodiment of the broadcasting apparatus could be used instead.

In specialized applications however, the alternate broadcasting method and apparatus offer substantial additional advantages. Let us consider for instance satellite communications where the selection process is done periodically, automatically or selectively, the delay time t can be designed to correspond to the time it takes the feedback signal to be transmitted to, and reach the satellite so that the processor or computer on board the satellite can select the channels to be transmitted, and then transmit these channels to the exclusion of the channels that have not been selected.

In such application, video cameras can be installed in a matrix format at almost any angle around the satellite, thus capturing a three dimensional view of the surrounding space. If it is therefore desired to view selected space sectors within certain desired angles, the viewer at the receive end simply programs the channel selector 240 to select only those video cameras or channels within the matrix of the desired viewing angles. In this manner, only the space sectors within the desired angles will be viewed.

Similarly, if the alternate broadcasting apparatus and method are used in interactive or educational video, where the viewer has to option to select from a broad range of options, then the viewer can make a selection of his or her choices, these choices are then forwarded to the transmitter and the selected choices are then displayed, while the non-selected choices would not be transmitted or displayed.

Yet another application of the alternate apparatus and method is in video recorders or VCR's, for recording multiple channels. In which case both the transmitter level. When it is desired to record more than one channel, the user simply stores his or her channel selection using the channel selector 240. A scanner-transmitter 285 identifies the selected channels and transmits them via an electrical or light (i.e. infra-red) connection to a selector-receiver 275. The selector-receiver 275 then issues a command to the signal samplers (i.e. 206, 208 and 210) for the selected channels. The signal samplers are connected to a UHF-VHF antenna (not shown) for receiving the transmitted television signals. The signals from the selected signal samplers are then compressed by the compressors (i.e. 216, 218 and 220) and then multiplexed by the multiplexer 222. The multiplexed signals could then be recorded on regular video tapes in a compressed form, or for a better performance, these signals could be digitized and stored on tapes or in a computer memory for later retrieval. To this end, the samplers 206, 208 and 210 which are well known in the field, and could be used to digitize, or to simply provide analogue samples of incoming signals. When the user wishes to view the recorded programs, he or she selects the particular channel to be viewed with the channel selector 240.

The scanner-transmitter 285 then issues a command to the selector-receiver 275 for transmitting only the selected channel to be viewed on a real-time-basis. The demultiplexer 105 then demultiplexes only that particular selected channel and transmits its signals to the corresponding memory storage (i.e. 230). The memory storage stores the signal for a period of $[n.(T'-1)]$, if the compressed signals of the selected channels have substantially similar sampling periods T', and for a period substantially equal to $$\sum_{i=2}^{n} T'i$$

if the compressed signals of the selected channels do not have substantially similar sampling periods T', wherein n represents the number of channels that have been originally recorded or stored on tape or memory.

As illustrated in FIG. 4, the intermittent storage of the signals from the same channel is important for providing a continuous uninterrupted viewing of the signals. For instance, if the viewer wishes to record three channels, and the sampled signals from the first channel occupy a time slot T' (FIG. 4), the memory storage delays the transmission of the first packet signals by a period of "3.T'", until the signals from the second packet are processed. In which case, the signals from each one of the packets restored on a real-time-basis, thus achieving a continuous, uninterrupted flow of signals. The above application can also be used in collecting data, voice, light and video signals from individual transmitter units and channel or "network" them to a single or multiple outputs. One such applications could be used in fast food restaurants or other similar restaurants, where multiple customers can place or select their orders. These orders are then distributed to various food preparers for service.

In this application, the users of the system are the patrons or customers of the restaurant, and the viewers are the food preparers who are located at a remote location from the users, and the system 200 would include a transmitter unit 204 and a plurality of substantially similar reception units or receptors 202. Some of these receptors 202 are allocated to the users and others are allocated to the viewers. In this manner, the users or customers use the channel selector 240 to make their food selection, while the viewers or food preparers use the channel selectors 240 to view the orders. The users can then make multiple food selections while the food preparers view only their own specialized orders and identify these orders with particular customers who placed the orders. Thus, communication between the customers and the food preparers is substantially enhanced. The alternate method 12 is illustrated in more detail in FIGS. 6 and 7. It is substantially similar to the method of the preferred embodiment, with the exception that the alternate method 12 includes the step of scanning 29 the selection process of the channels after they have been selected at 50 at the receiver level 202 (FIG. 8). Information on the selected channel, such as which channel has or has not been selected by the user, is then fed back to the transmitter 204 (FIG. 8).

The feedback process can be done in any conventional transmission method, such as over a radio or light frequencies. Lasers and infra-red transmissions can also be used. The frequency of transmission should however be selected in such a way as not to interfere with the simultaneous video transmission.

I. Teleconferencing System

Figure 16:
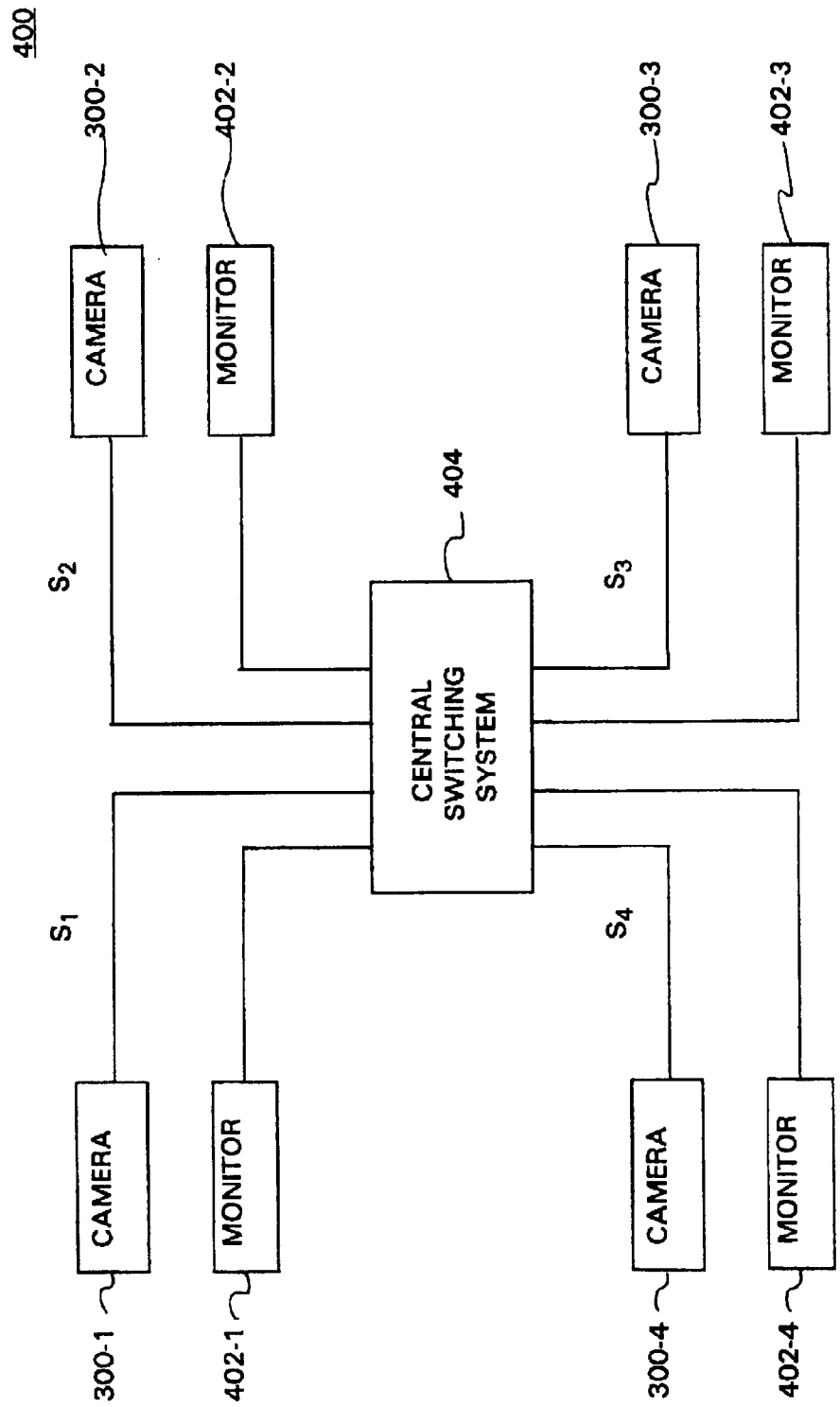
FIG. 16 illustrates a video teleconferencing system according to the following invention.

Turning now to FIG. 16, there is illustrated a video teleconferencing system 400 which permits video interaction among several remote sites. While there is illustrated only 4 conferring sites, it will be understood from the following description that other locations could also be connected to the teleconferencing system 400, and that more than a single camera could be placed at each remote location.

The teleconferencing system 400 generally includes four remotely located video cameras 300-1, 300-2, 300-3 and 3004; four video monitors 402-1, 402-2, 402-3 and 4024; and a central switching system 404. The cameras transmit the signals to the central switching system 404 via-conventional transmission means. The central processing system 404 processes the incoming signals from the cameras and then sends the processed signals to the monitors at the remote locations.

The cameras 300-1, 300-2, 300-3 and 3004 at the remote locations could be conventional cameras, or, in the alternative, they could be similar to the video optical system or camera 300 which will be described hereafter, in connection with FIG. 9, could be used instead. The monitors 300-1, 300-2, 300-3, and 300-4 could be conventional video monitors, or in the alternative, they could be specially designed modular monitors, as will be described below with respect to the modular liquid crystal display (LCD) monitor 700.

The central switching system 404 will now be described in greater detail in connection with the comparator system 450 shown in FIG. 17, and the broadcasting system 200 shown in FIG. 8. It will be understood to those skilled in the art, after reviewing the present description that the comparator system 450 could be either located at the remote site, as part of the camera 300, or as part of the central switching system 404.

Figure 17:
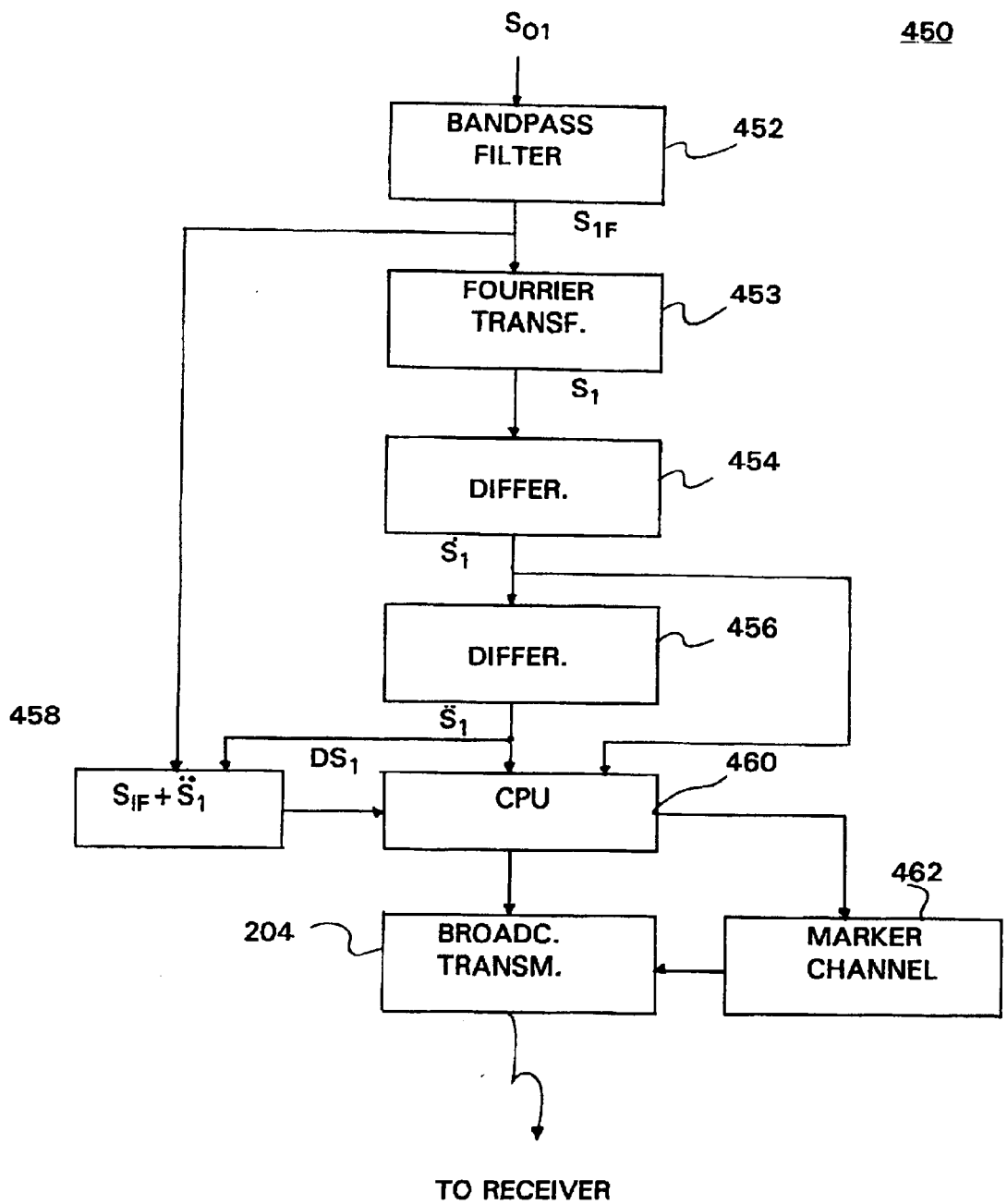
FIG. 17 is a block diagram of a comparator system constructed according to the present invention for use with the video teleconferencing system of FIG. 16 and the video optical system of FIG. 9.

In the preferred embodiment, the comparator system 450 is part of the central switching system 404, and the initial signal So1 in FIG. 17 is the signal Voc (FIG. 9) at the output of the camera 300. It should however be understood that the signal So1 could be any one of the signals Vb, Vr or Vg, or the modulated signals thereof, as illustrated in FIG. 9.

"The signal So1 is filtered by the band-pass filter 452, in a first attempt to filter out noise and undesirable signals. The filtered signal S1$f$ is then passed through a Fourier transformer 453, for generating Fourier transforms sinusoidal signals, which are then limited to the most desirable transform signals S1."

The signal S1 is then passed through a series of differentiators 454 and 456, for generating a first and a second differential signals $dS1/dt$ and $d^2S1/d^2t$ respectively. An adder 458 then adds the filtered signal S1$f$ and the second differential signal $d^2S1/d^2t$ to generate the signal DS1, such that DS1=S1$f$+k.ddS1/ddt, where k is a coefficient resulting from the double differentiation of the signal S1$f$. Since the signal S1 is a sinusoidal signal, then the second differential signal $d^2S1/d^2t$ is equal to (−k.S1).

This signal DS1 can be of use in certain circumstances, and it is one object of the present invention to have this DS1 signal processed independently from the sinusoidal signal S1. For this purpose, the signals $d^2S1/d^2t$, DS1 and $dS1/dt$ are sent to a central processing unit (CPU) 460 for processing. The CPU can be programmed to determine whether the DS1 signal is needed, and if it is not, then the signal DS1 is discarded and only the sinusoidal signal S1 is used as the final signal. If the DS1 signal is needed, then both the DS1 and S1 signals will be sampled by the signal sampler 206 (FIG. 8) and processed by the broadcasting system 200, as described above.

If the CPU 460 determines that the differential signal $dS1/dt$ is equal to zero, then it sets a flag, at the marker circuit 462, instructing the transmitter 204 not to set a marker indicator and not to sample the corresponding signal S1, since the signal S1 has not changed from the template signal (i.e. the previous sampled signal S1). In this manner, if the camera 300 is taking a picture of an unchanging background scene, for instance a document, then it would not be necessary to sample the new signal S1. This will allow for a better efficiency and faster processing of the signals.

If on the other hand, the signal dS1/dt is different than zero, then the CPU 460 instructs the transmitter 204 to sample the signal S1, and possibly DS1, and to process the same as described above in connection with the broadcasting system 200.

The above process permits the reduction in noise and other undesirable frequencies by transmitting only the sinusoidal signals. A system similar to the system 450 can be used at the receiving end of the broadcasting system 200 to regenerate the original signal So1.

Returning now to the teleconferencing system 400 of FIG. 16, the video signals S1, S2, S3 and S4 are processed according to the teachings of the broadcasting method 10 of FIGS. 1 and 6 and then sent back to the video monitors 402-1, 400-2, 400-3, and 400-4.

The teleconferencing method and network provide selective video communication capability among a plurality of remote sites and a central video switching exchange (CVSE) 404. The teleconferencing method comprises the steps of initiating a video call to one or more remote sites for participating in a video teleconferencing session. For instance, if remote site 1 (RM1) desires to initiate a video teleconference with remote sites 2, 3 and 4 (RM2, RM3, and RM4 respectively), RM1 dials the designated numbers for RM2, RM3, and RM4.

The CVSE allocates a plurality of different video channels to the participating remote sites, such that each video channel corresponds to one of the participating remote sites. In the present example, the CVSE assigns video channels 1, 2, 3 and 4 (VC1, VC2, VC3 and VC4) to the video channels incoming from RM1, RM2, RM3, and RM4 respectively.

The CVSE then generates signals for identifying these video channels, such that the video identifying signals are transmitted at a different carrier frequency than the video channels. The channel identifying signals are then transmitted to all the participating remote sites. In the present illustration, the CVSE generates video identifying signals IS1, IS2, IS3 and IS4.

If the participant at RM1 wishes to view video signals incoming from RM2 and RM3, then the participant selects video identifying signals IS2 and IS3. If the participant at RM2 wishes to view the video signals incoming from RM1, RM2 and RM4, the participant selects the video identifying signals IS1, IS2 and IS4. The remote sites feed back the selected video identifying signals to the CVSE, which in turn continually scans the video identifying signals being fed back to it, for identifying the video channels selected by each of the remote sites.

In this manner, if one of the remote sites, such as RM1 changes its selection and desires to additionally view the video signals incoming from RM1 or RM4, the CVSE, by continually scanning the fed back video identifying signals can easily accommodate changes in the selection process.

The CVSE compresses and multiplexes only those signals from the selected video channels into separate video signal packets, such that each packet corresponds to the particular selection of the video channels made by one of the remote sites. In our example, RM2 will receive a packet containing only signals from RM1, RM2 and RM4, but will not receive video signals from RM3. This new video compression method will significantly increase the number participants in the teleconferencing, since in a preferred embodiment the CVSE transmits compressed video signals to the remote sites, and furthermore it does not transmit all the video signals from all the participating sites, but it rather selectively transmits only those video signals which were selected by the particular participating remote site.

After the remote sites receive their corresponding compressed and multiplexed video signal packets, these packets are demultiplexed and separated into separate video channels, and the demultiplexed video channels are reconstructed and displayed on a real-time basis.

In order to further enhance the compression of the video signals, the CVSE passes these video signals incoming from each of the remote sites through a Fourier transformer for generating sinusoidal signals, and only the most desirable sinusoidal signals, i.e at the fundamental and first and second harmonics, are selected, and the remaining signals are rejected. Only those selected signals are then compressed and multiplexed.

In yet another alternative way to further enhance the compression of the incoming video signals, the teleconferencing network, differentiates the video signals incoming from the remote sites, and samples only those video signals whose first derivative is different from zero.

In a still another alternative method to compress the incoming video signals (Sn), the teleconferencing network differentiates the video signals (Sn) for generating first derivative signals (dSn/dt), and also differentiates these first derivative signals (dSn/dt) for generating second derivative signals (ddSn/ddt). The signals (Sn) and their corresponding first and second derivative signals (dSn/dt) and (ddSn/ddt) respectively are routed to a central processing unit (CPU) for further processing and quality control, such as for use in parity check.

In some instances it is desirable to add the signals (Sn) and their second derivatives (ddSn/ddt) to generate the signals DSn, as follows: DSn=Sn+k.ddSn/ddt, where k is a coefficient resulting from the double differentiation of the signal Sn. In many instances DSn should be equal to zero, and if it is not, then the CPU will offset the deficiency.

II. Video Cameras

Figure 9:
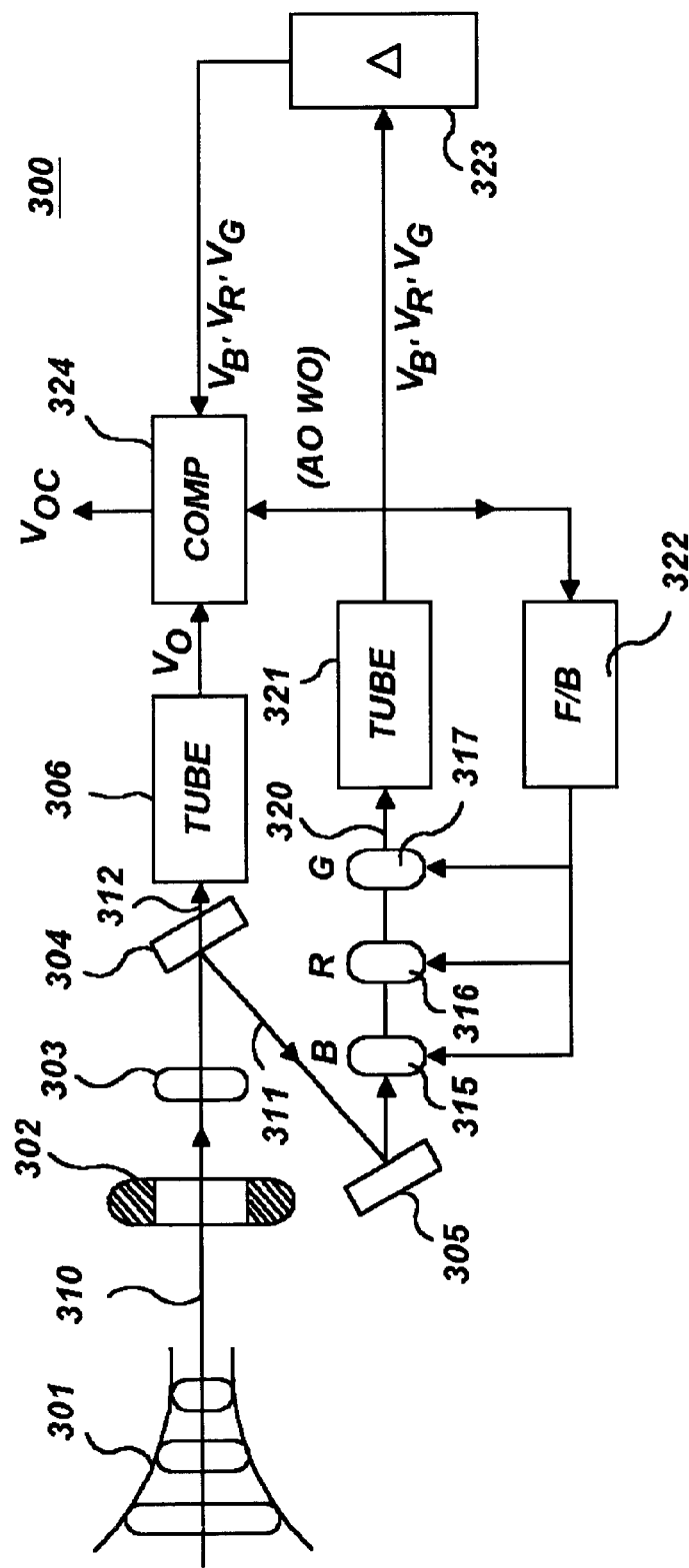
FIG. 9 is a simplified block diagram of an video optical system for use in a video camera, according to the present invention.

Turning now to FIG. 9, there is illustrated an optical system or a video camera 300. A taking zoom lens 301 focuses and conducts the impinging light rays or beam to a field lens with mask 302, along a path 310. The light rays then pass through a relay lens 303, and thereafter to a splitter 304 to be split along two paths 311 and 312. A pickup tube 306 receives the light beam along the path 312, and converts the light signal into an electrical signal Vo.

A mirror 305 reflects the light beam incoming along path 311 through three rotational blue, red and green discs or color lens systems 315, 316 and 317 respectively. Each one of these color lens systems 315, 316 and 316 (FIG. 10) rotates at an angular speed (Wb, Wr, Wg) proportional to the frequency of its corresponding color, for achieving four purposes. The first is to filter and sample the incoming light signal; the second is to obtain three derivatives of the signal with respect to the frequencies of the red, green and blue colors; the third is to mix these derived signals to get the resulting color frequency; and the fourth is to determine the intensity or amplitude of this resulting color frequency.

Each color lens system, such as the blue lens system 315, has a plurality of adjustable shutters 315A, 315B and 315C. As it will be explained later in greater detail, the opening of each shutter reflects the amplitude of the corresponding impinging filtered light signal, i.e. the blue light signal. As a result, the color lens systems 315, 316 and 317 provide information relating to the amplitude of the sampled signals, which are split without the use of conventional color splitters.

The split light beams exit the color lens systems 315, 316 and 317 along a path 320, and emerge onto a pickup tube 321, which receives the split color light beams and converts them into electrical signals Vb, Vr and Vg.

These signals Vb, Vr and Vg are simultaneously transmitted to a feedback system 322, to a differentiator circuit 323 and to a comparator/corrector 324. The feedback system 322 sends the signals Vb, Vr and Vg to the corresponding color lens systems 315, 316 and 317 respectively, to cause the shutters in each one of these lens systems to open up or to close proportionally to the amplitude of the corresponding signal, that is the amplitudes of the signals Vb, Vr and Vg.

The differentiator 323 differentiates the color signals Vb, Vr and Vg with respect to time and transmit the differentiated signals to a comparator/corrector 324, which compares the signal Vo to each of the differentiated color signals dVb/dt, dVr/dt and dVg/dt, according to the following equations:

$$Vo+(b.d^2Vb/d^2t+r.d^2Vr/d^2t)=Vgc; \qquad (1)$$

$$Vo+(b.d^2Vb/d^2t+g.d^2Vg/d^2t)=Vbc; \qquad (2)$$

$$Vo+(r.d^2Vr/d^2t+g.d^2Vg/d^2t)=Vrc; \qquad (3)$$

$$Voc=Vbc+Vrc+Vgc, \qquad (4)$$

where b, r and g are correction constants; Voc is the corrected output of the optical system 300; Vbc is the corrected blue light signal; Vrc is the corrected red light signal; and Vgc is the corrected green light signal.

Thus, since no color splitters have been used to split the incoming light beam, the intensity of the light beam is not diminished, therefore allowing for a better color resolution even in dimly lit places. The light path 310 could be a fiber optic, which allows the placement of the color lens systems 315, 316 and 317.

Considering now the lens systems 315, 316 and 317 in greater detail in connection with FIG. 10. These lens systems are generally similar in structure, and therefore, only the lens system 315 will be described hereinafter in greater detail. The blue lens system 315 includes three adjustable shutters 315A, 315B and 315C, whose adjusting mechanism (not shown) is coupled to the feedback system 322, for controlling and adjusting the opening of these shutters 315A, 315B and 315C.

In the preferred embodiment, the blue lens system 315 has a generally circular periphery, and the shutters, such as the shutter 315A are pie-shaped, and are designed to rotate around the central axis of symmetry of the lens in the direction of the arrows A and A'. In this manner, the rate of change of the shutter opening is proportional to the arc 315H and hence to the central angle 315G. The feedback system 322 correlates the angular velocity of the blue lens system 315 to the shutter's central angle of opening, thus providing an additional degree of freedom for the movement of the lens.

If for instance, the change in amplitude is too large for the feedback system to mechanically control the opening of the shutter 315A which reaches its maximum opening limits, the feedback system 322 can control the angular velocity of the blue lens system 315 to make up for the mechanical limitations of the shutter 315A. In the above example, the angular velocity Wb is decrementally reduced to the next lower angular speed or even to a lower angular speed, such that Wb remains proportional to the frequency of the blue light. The correlation between the angular speed Wb, the central angle 315G and the signal amplitudes is calculated and implemented by the feedback system 322, which uses a central processing unit CPU, not shown.

Each shutter, such as the shutter 315A, can be adjusted independently from the other shutters 315B and 315C. It should however be understood that all three shutters can be synchronized and adjusted by the same angular adjustment, or by an angular adjustment proportional to the respective color frequencies.

Turning now to FIGS. 11 and 12, there is illustrated two enlarged top and side views of the blue lens system 315 along the line K-K. The blue lens system 315 includes a shutter section 330 and a lens section 333 which are generally superposed. Both the lens section 333 and the shutter section 330 rotate about the central axis of symmetry 334.

Considering now the lens section 333, it generally includes a single disc, which accommodates three pie-shaped, generally similarly designed blue filter lenses 335, 336 and 337, which are alternately separated by three transparent sections 338, 339 and 340. Thus, the impinging light is allowed to pass through and be filtered by, the filter lenses 335, 336 and 337, and also to pass, unfiltered, through the transparent sections 338, 339 and 340. Each lens system can have only one lens and one shutter.

The shutter section 330 is superposed atop, or, in the alternative, below, the lens section 333, to block the passage of the impinging light beam along the path 310, and to allow its passage through the transparent sections 338, 339 and 340, and in selected sections of the lenses 335, 336 and 337. Thus, the shutter section 330 includes a disc which accommodates the three opaque shutters 315A, 315B and 315C, which are alternately separated by three transparent sections 340, 343 and 343.

As illustrated in FIG. 11, the shutter section 330 partially covers the lens section 333 to allow for a partial passage and filtering of the light beam through the filter lenses 335, 336 and 337. During the next cycle, when the blue lens system 315 is rotated by 360 degrees, the opaque shutter 315A can be rotated clockwise or counterclockwise, in the direction of the arrow A' or A respectively, to either decrease or increase the amount of light passing through the lens 335.

It should also be understood that a correcting filter section, not shown, could also be added as yet another section, below the lens section 333 to further correct the blue color filtering. This correcting blue filter section is similarly designed to, and is caused to rotate in coordination with, the blue lens section 333. Other correcting red and green filter sections can be similarly added to the respective red and green lens sections.

As described above, the angular rotation Wb of the blue lens system 315 is proportional to the blue light frequency, while the opening of the shutter 315A is a function of, or proportional to, the amplitude of the preceding blue signal. In the preferred embodiment, each sampled signal operates as a template for the next signal. Thus, the opening of the shutter 315B is a function of the amplitude of the signal allowed to pass, i.e. sampled by, the shutter 315A.

In the alternative, the adjustment of the shutter opening is made as a function of, or proportional to, the difference in amplitude between the previous two signals of the same color. For example, the opening of the shutter 315C is made as a function of the difference in signal between the amplitudes of the two blue signals sampled by the shutters 315A and 315B, that is as a function of the difference in the actual openings of the shutters 315A and 315B.

It should be understood that while the shutters 315A, 315B and 315C can be adjusted to have the same openings in any one cycle, the preferred embodiment allows for independent shutter openings, that is the feedback system 322 controls the shutters 315A, 315B and 315C independently.

As it has become clear from the above description, the amplitude of the signal (or shutter opening) is a function of the differential signal of the same color with respect to time. Consequently, the blue lens system 315 simultaneously provides for a differential of the sampled signals, both with respect to time using the shutters 315A, 315B and 315C, and also with respect to the angular velocity of the lens system 315 itself. Each one of these two differential signals serves a different function, as will be described below.

Conventionally, a color picture is produced on the television monitor by juxtaposing the green, red and blue pixels next to one another to produce the desired final color. The light spectrum is treated as a linear spectrum where the colors change frequencies from one end of the spectrum to another.

The present invention describes a novel three dimensional frequency spectrum, with an application relating to the present invention, and with prospective applications relating to laser monochromatic (hologramic) imaging, three dimensional television and single pixel television monitors (as opposed to the conventional three-pixel screen).

FIG. 14 illustrates a three-dimensional coordinates system and a vectorial representation of the new three dimensional color spectrum. The vectorial units i, j and k are not necessarily equal. In the preferred embodiment, these vectorial units are proportional to the color frequencies they are associated with. For instance, the magnitude or value of the vectorial unit i is proportional to the frequency of the red color. In this manner, the three dimensional output vector Wo is equal to the vectorial sum of the blue, red and green vector components as indicated in the following equation, where Wo, i, j and k are vectors:

$$Wo = Wr.i + Wg.j + Wb.k. \quad (5)$$

In this equation, Wr, Wg and Wb represent the angular speeds of the lens systems 316, 317 and 315 respectively. Therefore, the absolute value of the resulting output vector Wo represents the frequency of the final mixed color, such as yellow. The resulting vector is periodically calculated.

The next three dimensional output vector W1 is calculated as follows:

$$W1 = Wo + W'o, \quad (6)$$

where W'o is the is vectorial shifting, along the three dimensional color spectrum. The vector W'o has three B, R and G components W'ob, W'or and W'og respectively. Each one of these components is calculated as follows:

$$Wob = W'b/Fb, \quad (7)$$

$$Wor = W'r/Fr \text{ and} \quad (8)$$

$$Wog = W'g/Fg. \quad (9)$$

In the above equations, Fb, Fr and Fg are the respective selected frequencies of the blue, red and green lights respectively. W'b, W'r and W'g are differential values, with respect to the blue, red and green color frequencies respectively, of the impinging light signal. These differential values W'b, W'r and W'g are reflected by the differences in the angular speed of the blue lens system 315, red lens system 316 and the green lens system 317 respectively. As described above, the feedback system 322 controls the angular rotation of the lens systems 315, 316 and 317, as a result of the signals Vb, Vr and Vg from the pickup tube 321.

Hence, the B, R and G components W'ob, W'or and W'og are measured by calculating the angular speed differences between two sampling events. For example, if the angular speed of the blue lens system 315 has not changed between two sampling events, i.e. the angular speed Wb remains unchanged, then the B component Wob of the vector W'o is equal to zero. If on the other hand, the angular speed Wb changes, it does so in proportion to the frequency of the blue light.

The above description on how to measure the vectorial frequency shift is an important aspect of the present invention in that it enables to locate the frequency of any changing colors in the impinging light ray, within the three dimensional light spectrum.

To better explain the results achieved by this inventive process, it should be explained that the scenes captured by the camera 300 are generally composed of a background and of a moving character, such as a moving train. A scene as defined herein is composed of a series of frames with a generally similar background. If the background changes, the scene is said to have changed.

Let us take for instance an unchanging or fixed background (i.e. a building), and let us consider that a train or some other character (i.e. an animal or a person) is expected to enter the scene after a few frames. While the camera is shooting the fixed background, the pickup tube 306 captures the background scene, and the signals Vbc, Vrc and Vgc as well as the vector Wo are used to enhance the background colors captured by the pickup tube 306. The background colors remain unchanged for several frames until the entering of the character into the scene. The unchanged background colors are reflected by the fact that the components W'b, W'r and W'g are equal to zero. When the moving character enters the scene, the components W'b, W'r and W'g change according to the colors of this character.

Thus, if the original color of the particular location of the background is pink and the character color is blue, the mixture of the components W'b, W'r and W'g changes are reflected by corresponding changes in the angular speeds of the lens systems 315, 316 and 317.

It will be understood to those skilled in the art after reviewing the present description that the angular speeds Wb, Wr and Wg of the lens systems 315, 316 and 317 can be simultaneously synchronized with the speed of the frame processing as well as with the frequencies of the respective light colors.

It will also be understood that the pickup tube 306 can be replaced by a conventional camera, and that the mirror 305, the lens systems 315, 316, 317, the pickup tube 321, the feedback system 322, the differentiator 323, and the comparator/corrector 324 can be added to a conventional camera to enhance its imaging processing capability.

It therefore remains to determine the intensity or brightness of the colors exiting the lens systems 315, 316 and 317. FIG. 15 illustrates a three-dimensional coordinates system and a vectorial representation of the new three dimensional color spectrum. The vectorial units l, m and n are equal unitary vectors. The components of the resulting amplitude vector Ao are represented by the values Ab, Ar and Ag, which coincide with, or are proportional to, the openings of the B, R and G shutters 315A, 316A and 317A respectively, and thus they are proportional to the angles 315G, 316G and 317G through which the impinging light beam passes.

In this manner, the three dimensional output vector Ao is equal to the vectorial sum of the blue, red and green vector components as indicated in the following equation, where Ao, k, l and m are vectors:

$$Ao = Ar.l + Ag.m + Ab.n. \quad (10)$$

Therefore, the absolute value of the resulting output vector Ao represents the intensity of the final mixed color.

As with the resulting vector Wo, the resulting vector Ao is periodically calculated.

The subsequent three dimensional output vector A1 is calculated as follows:

$$A1 = Ao + A'o, \quad (11)$$

where A'o is the vectorial shifting, along the three dimensional coordinates (FIG. 15) of the color spectrum. The vector A'o has three B, R and G components A'ob, A'or, and A'og respectively. Each one of these components is calculated as follows:

$$Aob = A'b, \quad (12)$$

$$Aor = A'r, \text{ and} \quad (13)$$

$$Aog = A'g. \quad (14)$$

In the above equations A'b, A'r and A'g are differential values, reflected by the variations in the shutters openings. Hence, the B, R and G components A'ob, A'or and A'og are measured by calculating the difference between two consecutive opening of the shutters.

The above description on how to measure the vectorial amplitude shift is an important aspect of the present invention in that it enables to locate the amplitude of any changing colors in the impinging light ray, within the three dimensional light spectrum.

Knowing the frequency and intensity of the final resulting signal, this signal could be reconstructed and then transmitted to a single frequency-sensitive pixel, as opposed to the conventional three-pixel system. As a result, the resolution of the television monitor is improved substantially.

Let us consider the three dimensional light spectrum in greater detail. In a conventional linear light spectrum colors have been assigned a particular range of frequencies of for that matter wavelengths, as follows:

Violet: 3,800 to 4,500 Angstroms;

Blue: 4,500 to 5,000 Angstroms;

Green: 5,000 to 5,800 Angstroms;

Yellow: 5,800 to 5,950 Angstroms;

Orange: 5,950 to 6,200 Angstroms; and

Red: 6,200 to 7,675 Angstroms.

In the present three dimensional light spectrum, three color frequencies, such as blue, red and green are selected as the three basic colors from which other colors can be reproduced, similar to conventional mixing methods. In the present invention however, the blue color can be assigned a single reference wavelength such as 4,750 Angstroms=[C/Fb], where C is the speed of light); the red color can be assigned another single reference wavelength such as 7,000 Angstroms=[C/Fr]; and the green color can be assigned yet another single reference wavelength such as 5,500 Angstroms=[C/Fg].

As described above, the unitary vectors i, j and k, would then have an absolute value of 7,000 Angstroms, 5,500 Angstroms and 4,750 Angstroms respectively. The resulting Wo would then be expressed in terms of these unitary vectors as indicated in equation (5).

Consequently, it would not be necessary to mix the colors, since the final or resulting frequency can be express as a function of the three coordinate frequencies, but rather calculate the resulting frequency and then reproduce it.

It will be understood that other color frequencies can be selected to be the reference frequencies in the three dimensional spectrum. It should also be understood that two three dimensional spectra can be used, each having different reference frequencies, and that the second spectrum can be used as a parity check, in order to ascertain that accuracy of the resulting colors using the first spectrum. In case of disparity between the first and second resulting colors, conventional methods can be used to approximate the final color.

In certain instances, such as in cameras used in the photography of celestial bodies, it will be important to also capture the infra-red and ultra-violet rays. The present three dimensional light spectrum can be extended to cover the infra-red and ultra-violet frequency ranges as well.

Returning now to FIG. 9, a single ray of light enters and is processed by the three lens systems 315, 316 and 317. In certain instances, the light ray passes simultaneously through the filter lenses of the lens systems. Two correction possibilities are available. The first is to cause to the CPU in the feedback system 322 to ignore such overlap, since the position of the color lenses is synchronized. The second correction method is to cause the overlapping colors to be filtered out by the corresponding correcting filters.

While the invention is described herein in connection with a rotating lens systems, it should be understood that other non mechanical devices are contemplated by the invention and achieve similar results.

Considering now equations (1), (2) and (3), since the incoming light beam includes a sinusoidal component (i.e. Vr), a double differentiation of these components (i.e. ddVr/ddt) would result in the negative of the original components (i.e. –Vr), and thus the original component nullifies its double differentiated signal when both signals are added together.

Consequently, since the original Vo includes three B, R and G components, Vob, Vor and Vog, equations (1), (2) and (3) can be used to correct the Vo signal. Additionally the vector pair (Wo,Ao) can be used to correct the signal Vo.

FIG. 13 illustrates another embodiment for the lens system 315, which uses a generally rectangular lens 315AA instead of the pie-shaped lens of the lens system 315. The two crossed sections containing the lenses are vibrated in the directions of the arrows AA and BB to open up or close the shutters, instead of using the shutter system of FIG. 11. The entire lens system is still rotated around its axis of symmetry similarly to the lens system 315, at an angular velocity of Wbb.

It should be understood that each filtered colored beam could treated as a separate channel, and the broadcasting and modulating system described above could be used to transmit and to reconstruct the original color signals. A frequency shifter could also be added at the receiving or even the sending ends of the broadcasting system.

III. LCD Monitors

Figure 18:
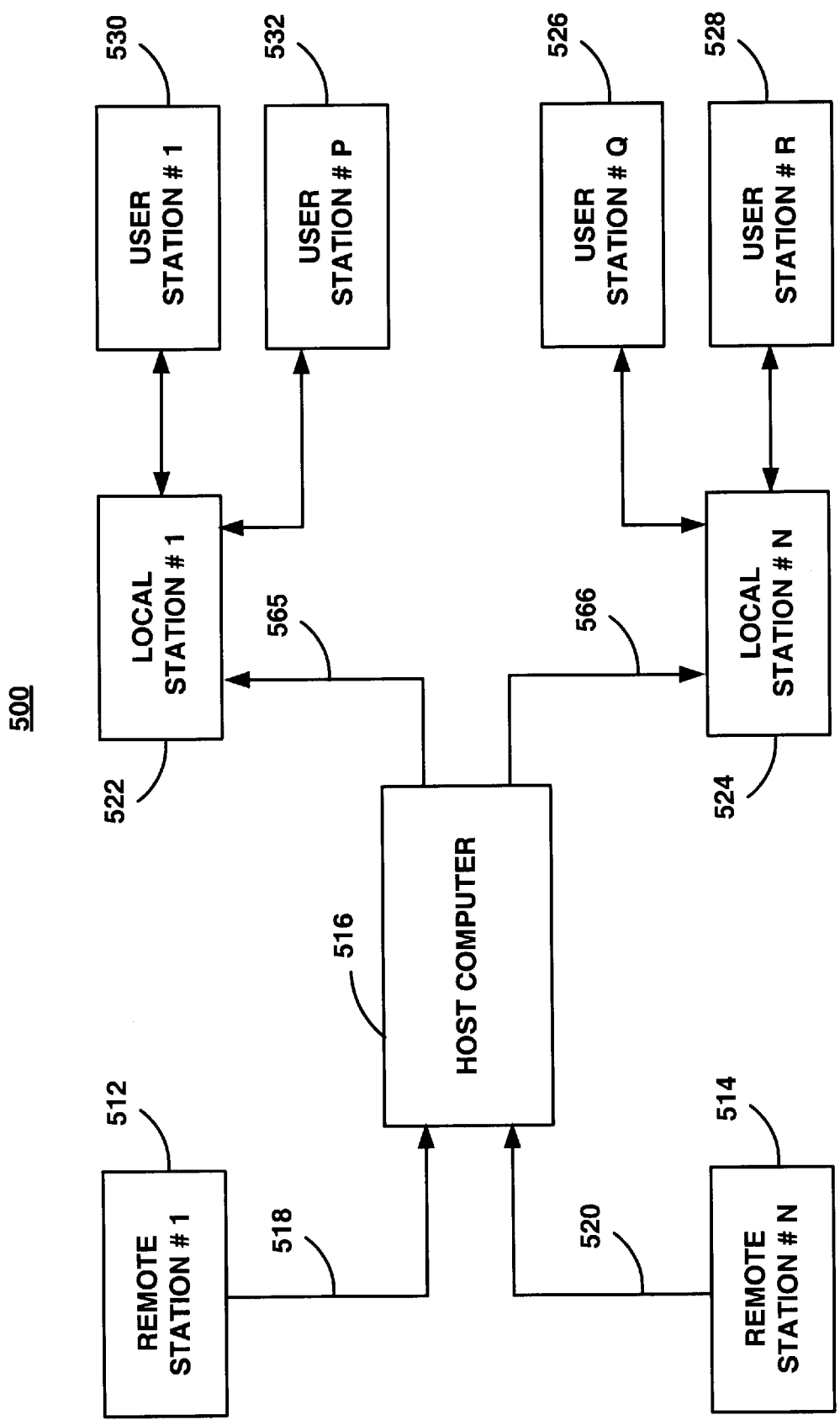
FIG. 18 illustrates a block diagram of a paperless publication network in accordance to the present invention.

Referring now to the drawings and more particularly to FIG. 18 thereof, there is illustrated a block diagram of a paperless network 500 in accordance to the present invention. The network 500 generally includes a plurality of remote stations, such as the remote stations 512 and 514, a plurality of local stations 522 and 524, and a plurality of user stations 526, 528, 530 and 532.

At the local stations 522 and 524, the information is accessed by the users or subscribers through dedicated user stations, such as the user stations 526, 528, 530 and 532. While only the user stations 530 and 532 are illustrated in conjunction with the local station 522, it should be understood that more than two user stations can be used in conjunction with either one of the local stations 522 and 524.

Figure 20:
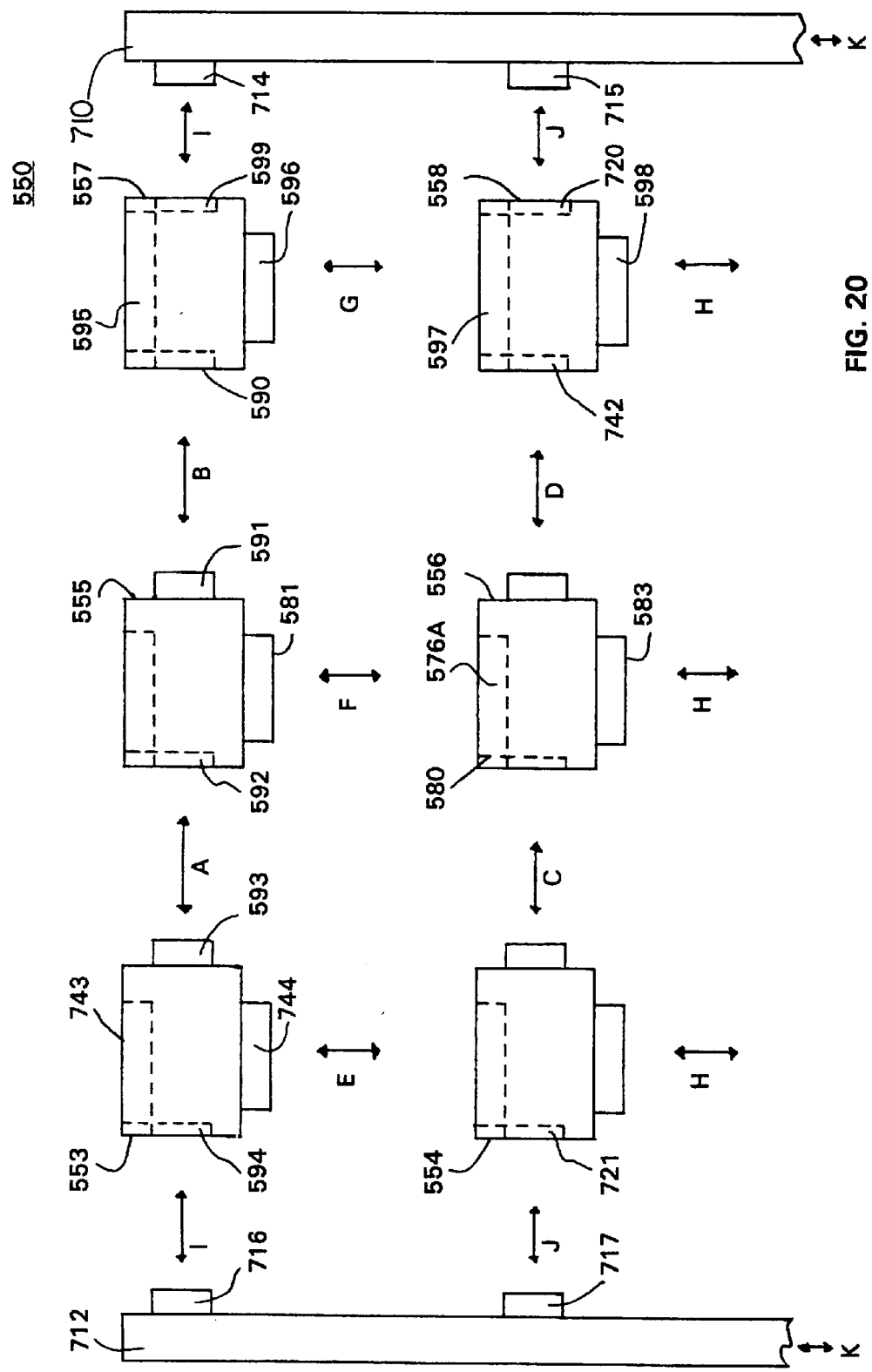
FIG. 20 is a graphical representation of a plurality of screen modules and two lateral buttresses which are inter-engageable and disengageable to form the modular monitor of FIG. 21, and for use in the teleconferencing system of FIG. 16 and the paperless publication network of FIG. 18.
Figure 21:
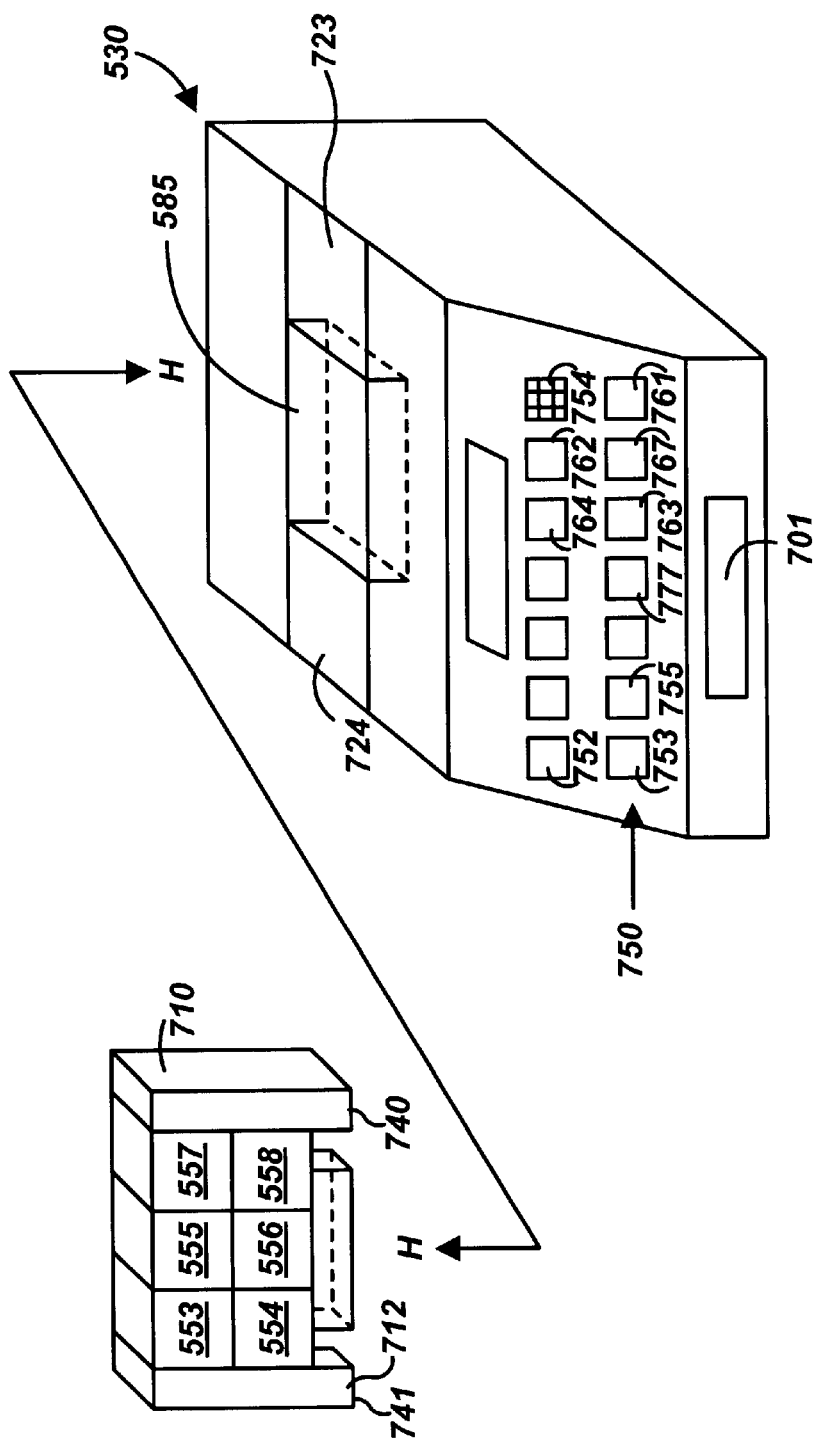
FIG. 21 is a perspective view of the modular monitor referred to, above, in the description of FIGS. 19 and 20.

FIGS. 20 and 21 illustrate a modular screen 550, which is interconnectable to the user station 530 to form a monitor

700. The screen 550 includes a plurality of screen modules such as the modules 553, 554, 555, 556, 557 and 558, which are engageable to one another, in the direction of the arrows A, B, C, D, E, F and G, to form the screen 550. The screen 550 is engageable to the user station 530, along the arrow H, to form the monitor 700.

"In operation, the user selects the number of screen modules, such as modules 553–568, he or she wishes to use, and then interconnects them to form the modular screen 501. The user then engages the screen 501 to the user station 530 to form the monitor 700. The monitor 700 can be used as a video monitor for use in the video teleconferencing network 400, as the monitor 402-1, for video imaging. In the alternative, the monitor 700 can be used with as part of the paperless dissemination network 500, for displaying texts and graphics."

Figure 19:
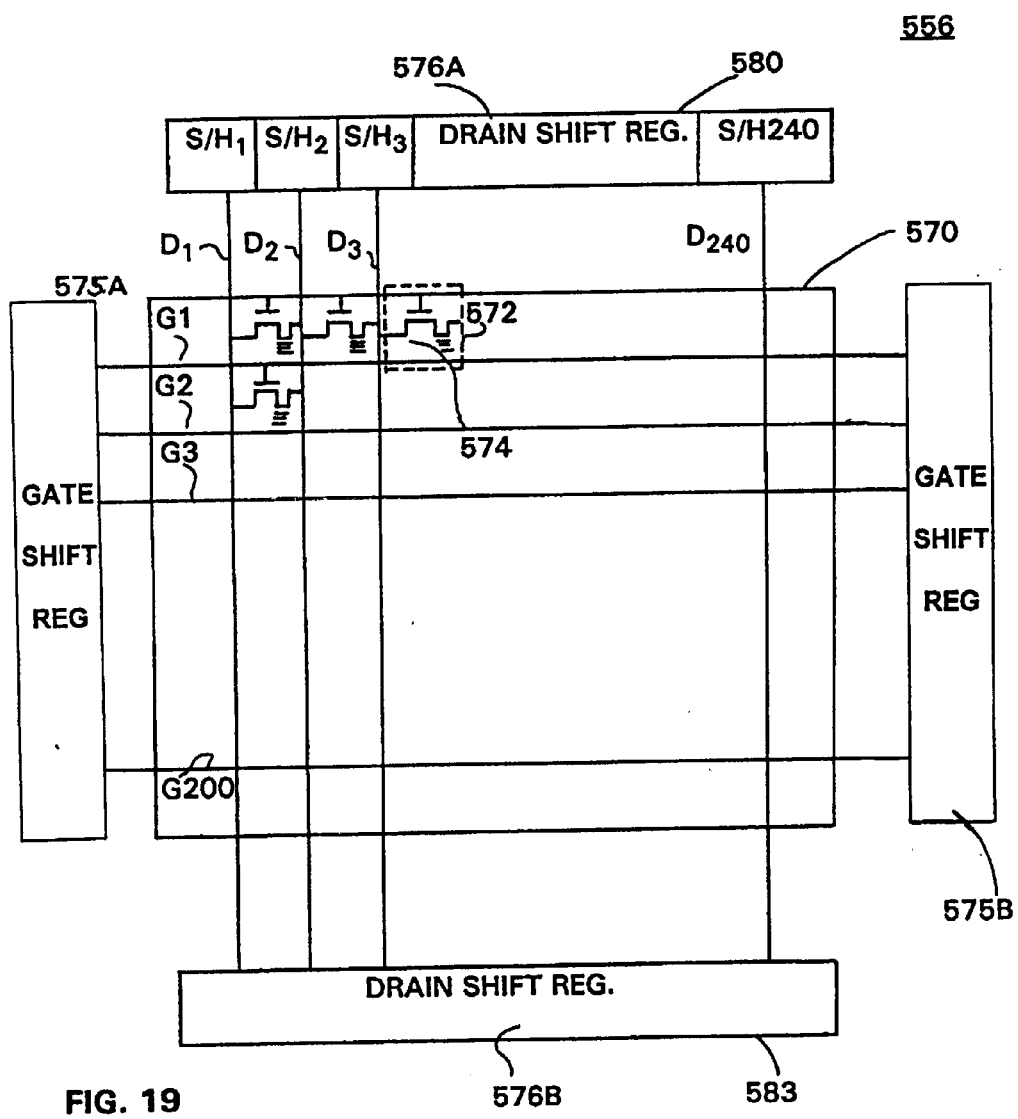
FIG. 19 is an enlarged view of the circuitry of a screen module used in a modular monitor in the paperless publication network of FIG. 18.

Considering now a representative screen module, such as the screen module 556 in greater detail with respect to FIG. 19. The module 556 includes a liquid crystal display (LCD) 570 generally known in the art. Liquid crystals have been used for optical displays. Their optical properties change considerably by application of weak electric fields. Common liquid-crystal displays operate using the twisted nematic mode (TNM). In this mode the device rotates any optical beam by 90 degrees. The application of an electrical field changes the orientation pattern of the nematic liquid and reversibly destroys this optical rotation.

The use of both monochrome and color LCD's has become popular, especially in small personal computers and portable television receivers. The LCD is formed of a plurality of units, such as the unit 572, which is shown bordered in phantom lines in FIG. 19. Each unit includes a thin-film transistor (TFT) 574.

The operation of LCD's is not limited by the high-voltage requirements of conventional CRT's. Instead, the picture raster is constructed of a rectangular MOS switching matrix of from 240 to 600 horizontal elements and from 200 to 400 vertical elements. The gates of all the thin-film transistors (TFT's) in a given horizontal row are connected to two common busses or Gate Shift Registers 575A and 575B. Likewise, the drains of the all the transistors in a vertical column are connected to two common busses or Drain Shift Registers 576A and 576B.

It is to be understood, however, that the various principles of the present invention may be employed with any of the various types of liquid crystal materials (cholesteric, nematic or smectic) or combination thereof, including combinations with dyes.

Mechanical Interconnection: The Drain Shift Register 576A is encapsulated in a protective insulation female housing 580, such as hardened plastic to provide a mechanical socket into which a male housing 581 (FIG. 20) is engaged firmly. The housing 581 is generally similar in design and construction to the male housing 583 of the module 556. The male housing 583 houses the Drain Shift Register 576B for mechanically mating with the central socket 585 of the user station 530 (FIG. 21).

In this manner, when all the selected modules are interconnected together to form the unitary screen 501, they are also interconnected to the user station 530. As result, the screen 501 becomes quite rigid in structure. Additional conventional mechanical locking devices can also be added to ensure that the screen in engageably locked in place with the use station 530.

Two oppositely located lateral connectors or buttresses 710 and 712 also engage the extremity modules 553, 554, 557 and 558, by means of male connectors 714, 715, 716 and 717, which engage the corresponding housings 599, 720, 594 and 721 respectively. Additionally, as indicated in FIG. 21, these lateral buttresses also engage the user station 530 via the lateral sockets 723 and 724. These lateral buttresses 710 and 712 serve as additional locking mechanism.

An additional top buttress, not shown, can also be added to engage the top modules 553, 555 and 557, and to similarly engage the top portions of the lateral buttresses 710 and 712.

The modules can be easily disengaged from the user station 530, from each other, and from the lateral buttresses 710 and 712, when the user wishes to store or to transport the monitor 700.

Electrical Interconnection: When the screen modules are mechanically interconnected, they also become electrically serially interconnected, in that the Gate Shift Register 590 of the module 557 will be interconnected to the Gate Shift Register 591 of the module 555, which in turn is intrinsically connected to the Gate Shift Register 592, which is connected to the Gate Shift Registers 593 and 594 of the module 553. In this manner, when the modules 553, 555 and 557 are engaged to one another, their gates would also become serially interconnected, as if they were a single module.

The Gate Shift Registers are electrically interconnected to the lateral sockets 723 and 724 of the user station 530, and are connected to each other in series, by means of the lateral buttresses 710 and 712. This interconnection can be implemented by electrically interconnecting only one Gate Shift Register, such as 599, in a horizontal row, to the corresponding protruding male connector 714 of the lateral buttress 710. Similarly, the Gate Shift Register 720, in a second horizontal row, is electrically interconnected to the corresponding protruding male connector 720 of the lateral buttress 710.

In the alternative, the male connectors 716 and 717 of the opposite lateral buttress 712 could also be interconnected to the Gate Shift Registers.

Each buttress 710 and 712 includes a bottom portion 740 and 741 respectively, which engages the corresponding lateral socket 723 and 724 respectively. In this manner, when the six modules 553–558 and the two lateral buttresses 710 and 712 are inter-engaged, the screen modules are expanded serially and form the unitary screen 501 which is, not only mechanically rigid, but which electrically operates as a single larger module. It should however be understood that each module can be operated independently from one another as if each module were an independent screen.

The user station 530 is therefore electrically interconnected to all the modules of the modular screen 501. The modules are also identified on a matrix basis, such that the user station can be selectively connected to one or more screens, at the will of the user.

For instance, the user can access and activate the modules 553, 556 and 557, and not activate the remaining modules. This simulated split screen feature has several applications, and enables the software program which controls the monitor 700 to easily select the desired module.

Software Interconnection: The modules 553-558 are also interconnected and controlled by means of a software program 600, illustrated by the flow chart in FIG. 23. The program 600 is stored in the user station 530, or, in the alternative, it could be loaded by means of the disc drive 701.

Figure 22:
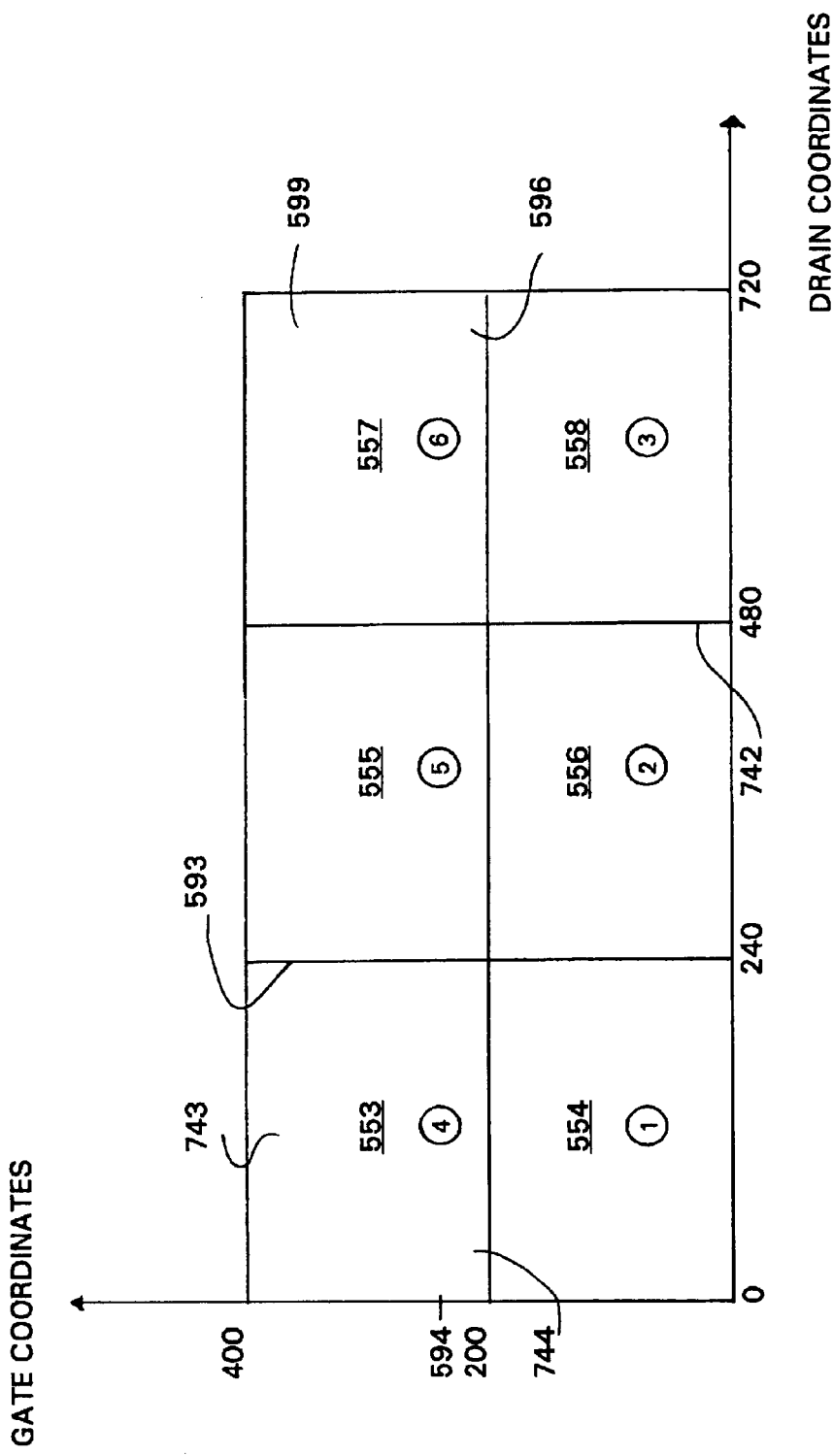
FIG. 22 illustrates a two-dimensional coordinates system on which the screen modules of FIG. 20 are represented as blocks.

Turning now to FIG. 22, there is illustrated a two-dimensional coordinates system on which the screen modules are represented as blocks, in order to show how the screen 501 is controlled by the program 600. The user instructs the user station 530 of the number of modules he or she intends to couple to the user station 530, or in the alternative, the number of modules the user wishes to activate on the screen 501. Upon this instruction, the software program 600 maps the coordinates of the drain elements along the horizontal axis of the coordinate system, and the gate elements along the vertical axis.

In this manner, the software has access to each pixel on the screen 501, and consequently, the user has a very flexible control of the screen 501. Thus, if for instance the user wishes to activate only three of the modules, such as the modules 553, 556 and 557, the user simply enters the number of the modules when instructed to do so by the program 600. In the present example, the user enters the numbers 4, 2 and 6.

The software program 600 then instructs and controls the conventional electronics of the user station 530 to display the image or information only on those selected modules. In this manner, the user can for instance view a text document on module 553, a graph on module 557, and a video display on module 556.

It should be understood that the user has control over the correlation of images to be viewed on the screen 501 and the particular module he or she wishes to view these images on. For instance, the user can ask the monitor 700 to display the text on module 556 instead of on module 553.

In the above example where the user has selected only three out of the already connected six modules, the software treats these three selected modules 553, 556 and 557, as if they were serially connected adjacent to another. In fact, depending on the selection priority or order assigned to the modules by the user, the software has the alternative to interconnect the modules in several ways, such as: (1) 553-556-557; (2) 553-557-556; (3) 556-553-557; (4) 556-557-553; (5) 557-553-556; (6) 557-556-553.

Let us take, for illustrating purposes example (5), where the modules are connected as 557-553-556. The user station 530 will then treat or view the modules as if: (a) the Gate Shift Register 599 of the module 557 is directly coupled to the Gate Shift Register 594 of the module 553; and (b) the Gate Shift Register 593 of the module 553 is directly coupled to the Gate Shift Register 742 of the module 558.

Depending on how the user wishes to view the modules, the user can instruct the software to interconnect the selected modules 553, 556 and 557 either in a horizontal row, or stacked one above the other, or as shown in FIG. 22, or as the user wishes. For illustration purposes let use consider that the user intends to view the modules as if they were stacked. In this case, the software treats the modules as if: (a) the Drain Shift Register 596 of the module 557 is coupled to the Drain Shift Register 743 of the module 553; and (b) the Drain Shift Register 744 of the module 553 is coupled to the Drain Shift Register 576A of the module 556.

This flexibility in selecting and viewing the modules in a pre-selected order has several applications. One such application relates to the use of the monitor 700 in the video telecommunication network 400, shown in FIG. 16. Let us assume for illustration purposes that in this application, there are three sites that wish to confer. The user at the first site, selects the number of modules he or she wishes to activate, and then assigns the modules to each one of the other sites conferring with such first user. The second and third users at the other ends assign their own modules.

Additionally, the signals S1, S2 and S3 from the three sites are transmitted to the central switching system 404, and processed as explained above, and then retransmitted to the monitors 402-1, 402-2 and 402-3 at the conferring sites as separate channels. The receiver monitor then reroutes each channel to the corresponding module, as selected by the particular user.

Therefore, the user at site 1, can view his or her own picture, or text on module 553, the picture from the second site on module 556, and the picture from the third site on module 557. Additionally, there can be two or more cameras in each site, if there are more than just one person at each site, or if it is desired to take pictures of graphs or similar other documents in addition to the pictures of the conferencees.

The conference can also be taped by each user by either taping the signals that are incoming from the central switching system 404, or, if editing is desired, the user can instruct the user station 530 to select the signals on the particular modules which he or she desires to tape and the user station 530 treats the signals from each module as if it were a separate channel and then transmits these signals and records them according to the above teachings.

Figure 23:
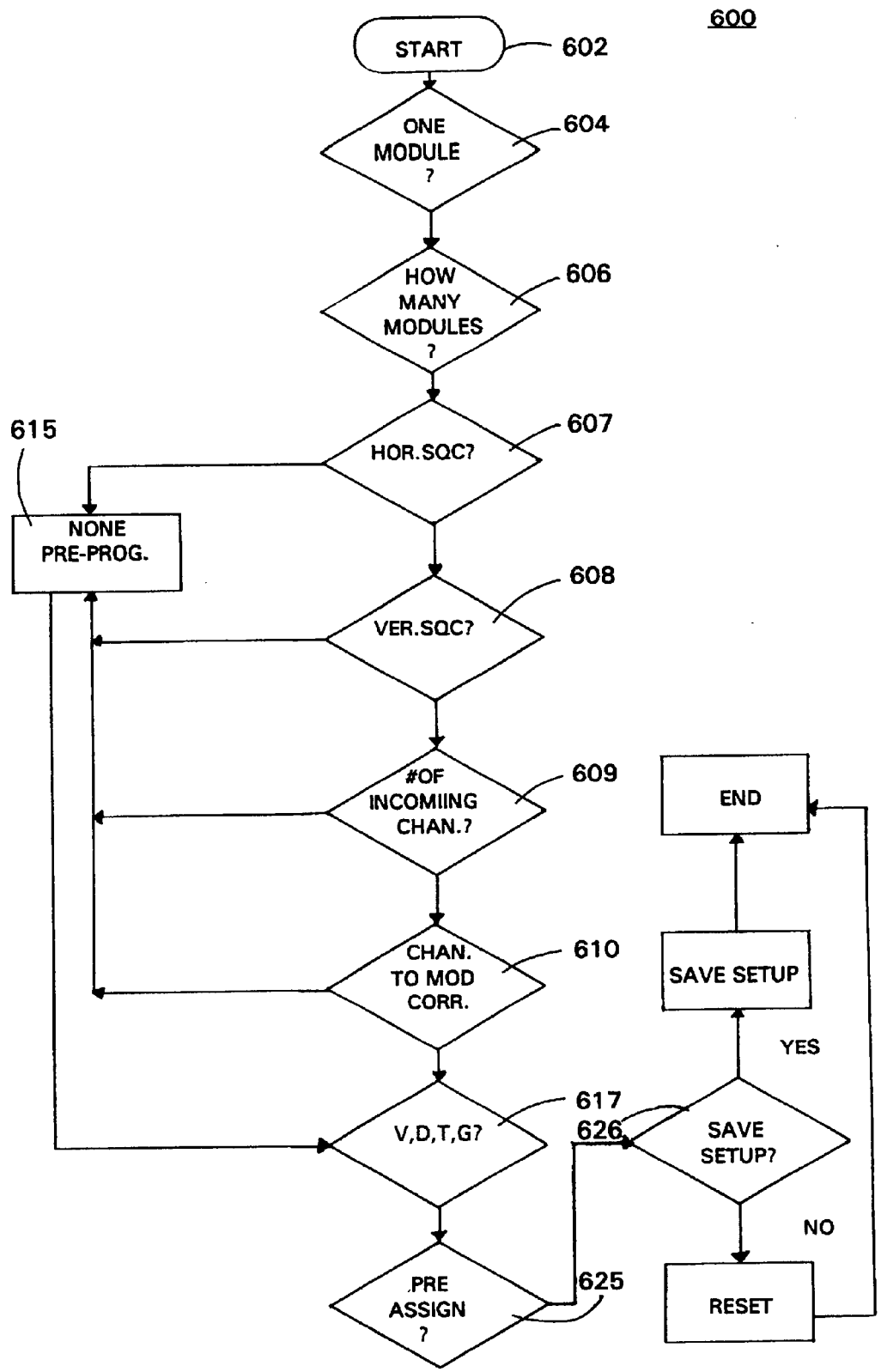
FIG. 23 is a flow chart illustrating the operation of the modular monitor of FIG. 21.

Turning now to FIGS. 21 and 23, the software program 600 is illustrated in the form of a simplified flow chart in FIG. 23, and the keyboard 750 of the user station 530 is illustrated in FIG. 21. When the user couples the screen 501 to the user station 530, the user presses a START button 752, and the software is initialized at 602. The software next automatically inquires at 604 whether there is only one module coupled to the user station 530, or desired to be activated.

If the answer is no, then the user presses the NO button 753, and the software displays the following question on a built-in screen 76: "HOW MANY MODULES?", as indicated at 606. In the alternative, the above question can be displayed on a dedicated module, such as the module 556. The user then enters the number of modules he or she wishes to activate, by using a keypad 754.

The software then displays the following question on the screen 76: "HORIZONTAL SEQUENCE OF MODULES?", as indicated by block 607. The user then enters the desired horizontal sequence of modules by using the keypad 754. In the above example, where the user wishes the following sequence of modules: 557-553-556 the user will enter the following sequence: (3, 2), (1, 2) and (2, 1), or the following sequence, as is desired: (6, 4, 2). Both sequences will relate the desired horizontal module sequence to the software. The pair sequence indicates the coordinates of the module, while the second triple sequence indicates the number of the modules, as illustrated in FIG. 22.

The software then displays the following question on the screen 76: "VERTICAL SEQUENCE OF MODULES?", as indicated by block 608. The user then enters the desired vertical sequence of modules by using the keypad 754. The user will enter either one of the following sequences: (1, 2), (2, 1) and (3, 2), or (4, 2, 6).

The following inquiry is then displayed on the screen 76: "NUMBER OF INCOMING CHANNELS?" as indicated at block 609. The user then enters the number of incoming channels using the keypad 754. The incoming channels refer for instance, to the channels that are being, or will be, transmitted by the central processing 404 of the teleconferencing system 400, illustrated in FIG. 16. Let us consider that the number of selected channels is three.

The software then asks the use to correlate the incoming channels to the selected modules at 610. The user then enters either one of the following sequences: (C1, 1, 2), (C2, 2, 1) and (C3, 3, 2), or (C1, 4; C2, 2; C3, 6). As such, incoming channels 1, 2 and 3 are assigned to modules 553, 556 and 558, respectively.

"If on the other hand, the user does not find it necessary to correlate the incoming channels to the modules, or if the user does not have a preference for the vertical or horizontal interconnection of the modules, then, as indicated at block 615, the software assigns the channels and the inter-modular interconnections in a pre-programmed, pre-selected way."

In the preferred embodiment for instance, the software will sequentially assign the incoming channels to the horizontal modules first in the first row, and then to the second horizontal row, starting with module 554, i.e. module 1. In the above example, incoming channels 1, 2 and 3 will be assigned to modules 554, 556 and 558 respectively, and the upper modules 553, 555 and 557 will not be activated, unless activated by the user at a later time.

The software then asks, the user, at 617, whether the incoming channel includes video (V), graphics (G), text (T) or data (D) information. The user then presses one of the corresponding buttons 762, 763, 764 and 767 to indicate the appropriate choice, by choosing the letter of his or her choice, and by entering the following sequence using the keypad 754: (C1,V); (C2,T); and (C3,V). This sequence will instruct the user station 530 to route channels 1 and 3 through a video mechanism to process the video images, and to route channel 2 to a computer for processing the text. Both the video mechanism and the computer are well known in the art. The present invention enables the simultaneous processing of video, text, graphics and data, and to display the same on a single modular screen.

The software then asks the user whether he or she wishes to reserve one or more dedicated modules, to another incoming channel, at 625. If an unexpected channel is transmitted to the monitor 700 while the some of the modules are activated, then the monitor 700 will automatically activate a CHANNEL WAITING feature, whereby the software automatically inquires whether the user wishes to be interrupted during the teleconferencing session. If the user does not wish to be disturbed, or if all the screen modules have been assigned to incoming channels, then the software automatically responds with a busy signal to the caller.

If on the other hand, the user expects a channel call during the conference session, then the user can pre-assign one or more modules to this expected channel call. As the call arrives, then the user station 530 automatically connects the call to the spare module, such as the module 555, and the software displays the following inquiry on the screen 760: "CONNECT TO TELECONFERENCE?". If the user wishes this incoming call to be part of the teleconference, then the user presses the YES button 755, and the software automatically reroutes the incoming call to the central processing system 404, where it is processed as one of the other incoming channels.

It should be understood that a sophisticated user can bypass the inquiries at 607, 608, 609, 610, 617 and 625, and can enter the following sequence instead: (C1,V, 4), (C2, T, 2), (C3, V, 6).

"The software then asks the user, at 626, whether he or she wishes to save the setup for future use? If the answer is yes, then the same setup will be used in future module assignments, until the setup is changed or reset. If the answer is no, then the assignment values will be reset at the end of the conference."

A REASSIGNMENT button 777 at the keyboard 750 enables the user to reassign the channels to different modules during the course of the conference session.

It should be understood to those skilled in the art, after reviewing the present specification, that more than one module can be assigned to a particular channel. If for example, the user wishes to use the user station 530 to preview a text or a video recording on the screen 501, the user can select all six or more modules for such preview, and the user is not limited to a single module.

In which case, the user can for instance, assign four modules, i.e. 553, 554, 555 and 556 to view a document, and assign modules 557 and 558 to perform selective tasks to manipulate or better preview the text displayed on the modules 553, 554, 555 and 556. For example, the user can identify the coordinates of the text he or she wishes to enlarge, using the coordinate system of FIG. 22, i.e. (Drain 0, 240; Gate 200, 300) and then ask the user station 530 to display the text on the modules 557 and 558, i.e. (Drain 480, 720; Gate 100, 400). The user station will copy the identified text and enlarge it to fit the new coordinates on modules 557 and 558.

IV. Paperless Network

The remote stations 512 and 514 generally represent a variety of companies or individuals. While only two remote stations 512 and 514 are illustrated, it should be understood that the network 500 includes a greater number of remote stations that are not shown. Therefore, only the two remote stations will be referred to hereinafter.

The network 500 further includes a host computer or switching central processing unit 516 which is connected to the remote stations 512 and 514 via communication links 518 and 520 respectively. The host computer 516 receives the information to be published and routes it to one or more local stations, such as the local stations 522 and 524, over communication links 565 and 566 respectively. It should however be understood that the remote stations 512 and 514 can, alternatively transmit or publish the information directly to the local stations 522 and 524, directly, without passing through the host computer 516.

The local stations 522 and 524 generally represent receiving stations for storing the information to be published. While only the local stations 522 and 524 are illustrated, it should be understood that the network 500 can include more than two local stations which are not shown. Therefore, only the local stations 522 and 524 will be referred to in the following specification.

Turning now to FIG. 18, the local stations 522 and 524 generally represent receiving stations for storing the information to be published. While only the two local stations 522 and 524 are illustrated, it should be understood that the network 500 can include note than two local stations. At the local stations 522 and 524, the information can be accessed by the users or subscribers through dedicated user stations, such as the user stations 526, 528, 530 and 532.

In operation, the publisher of the printed publications, such as a newspaper publishing company sends the information (publication) to be published over the remote station 512 via the host computer 516 to selected ones of the local stations 522 and 524, until subsequently updated by the published companies.

When the user wishes to retrieve the published information, he or she inserts a memory device, such as a floppy disc or a compact disc into the local station 522, and uplinks an interface software program from the disc to the local station. The interface software includes the user's identification number and the identification of the publications he or she is allowed to access.

In the alternative, the interface software can include credit information of the user, so that, if the user is not a subscriber, his or her address and other credit information are automatically downloaded to the local station 522 for future billing.

The user then interfaces with the local station 522 and downlinks the selected publications from the local statio 522 to the disc. The publication could then be previewed by inserting the disc into the drive 701 (FIG. 21) of the user station 530, and the user operates the monitor 700 as described above in relation to the modular screen 501.

Considering now the local station 522 in more detail, it is generally located at locations which are readily accessible to the users, such as at the outside of building structures. The local station 522 generally includes a memory drive for receiving the memory device, such as the floppy disc, and a central processing unit (not shown).

A plurality of function keys permit the user to control his or her own access to the selected publications. A series of light or visual indicators indicate the status of the local station during the transfer of information to the memory disc. A storage memory retains the published information for a predetermined period of time. Periodically, the published information is erased from the memory and updates.

Figure 24:
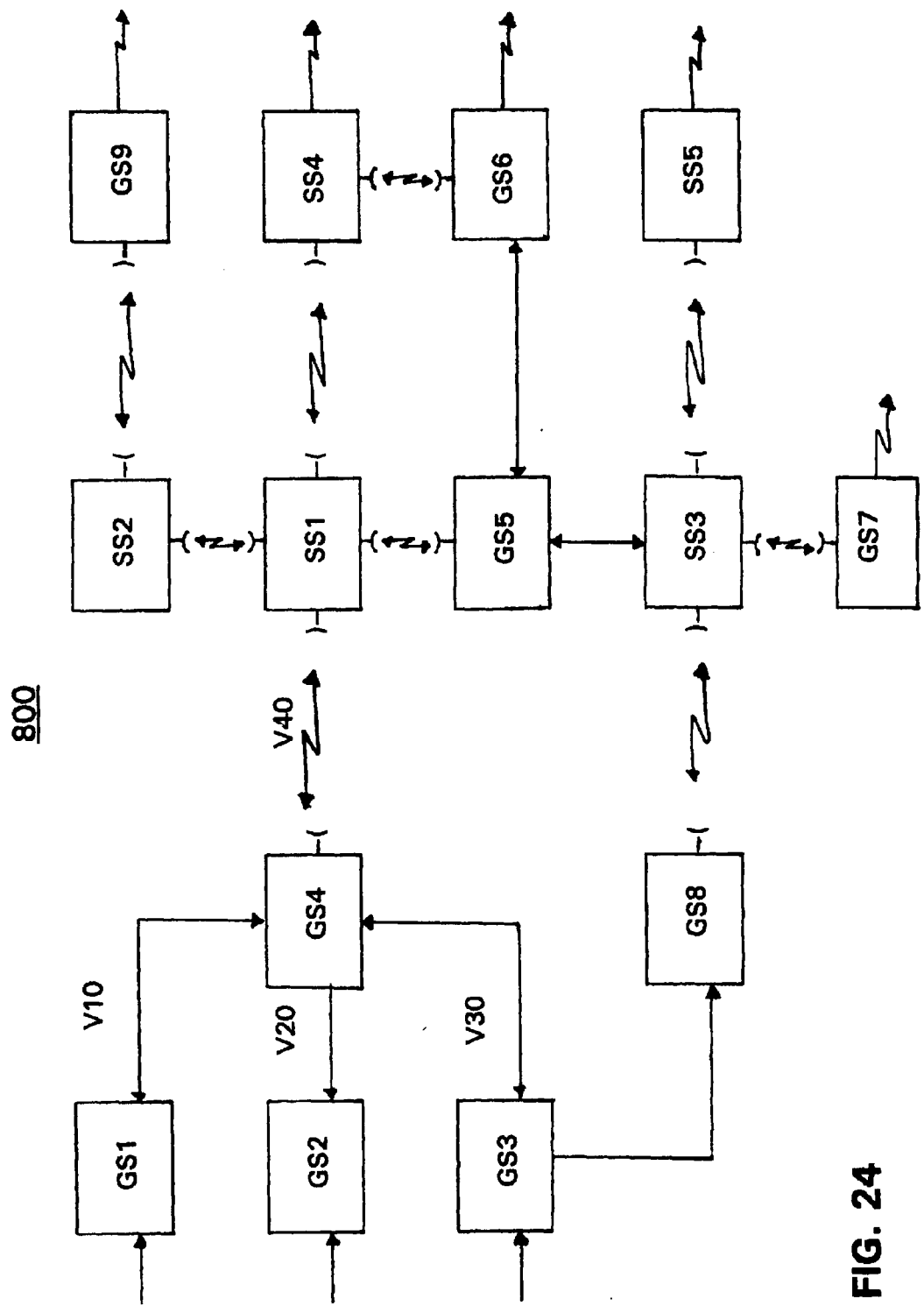
FIG. 24 is a block diagram representation of an architecture for a Program Delivery System (PDS) according to the present invention, showing a plurality of ground stations (GS) and a plurality of satellite stations (SS) interlinked according to the present inventive compression scheme.

V. Program Delivery System With Digital Compression and Encoding/Decoding Schemes Prior to describing the inventive Program Delivery System (PDS) 800 in detail, it would be beneficial to cover the corresponding drawings, in a cursory manner, to provide the reader with an overall understanding of the PDS 800. Referring now to FIG. 24, there is illustrated an architecture, in block diagram format, of the preferred embodiment of the program delivery system (PDS) 800 according to the present invention. The PDS 800 includes a plurality of ground stations indicated by the letters "GS", and a plurality of satellite or space stations indicated by the letters "SS". These ground and satellite stations are interconnected by conventional telecommunications links, such as by cable, satellite and/or microwave links.

A primary objective of the PDS 800 is to provide the capability to simultaneously transmit multiple channels of video, audio and data information at various degrees of compression through existing ground and satellite transponders, including existing cable and television plants. The PDS 800 will be compatible with existing C and Ku Band satellite transmission technologies, including but not limited to two degrees spacing.

Figure 25:
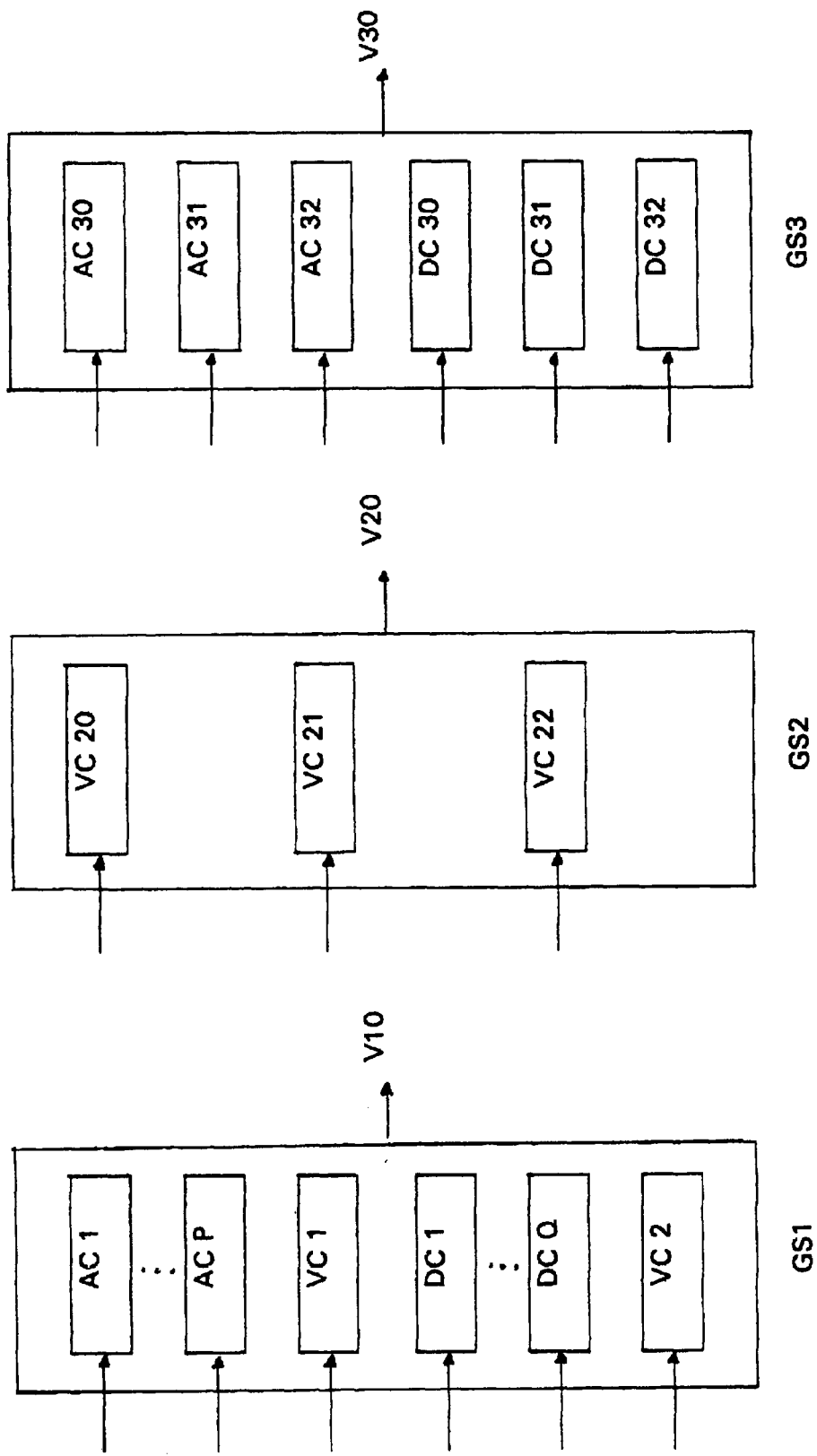
FIG. 25 is a block diagram representation of three exemplary ground stations $GS_1$, $GS_2$ and $GS_3$ which are part of the PDS of FIG. 24.

FIG. 25 provides illustrative details of three exemplary ground stations $GS_1$, $GS_2$ and $GS_3$ in a simplified block diagram form, where the letters "AC", "VC" and "DC" refer to audio channels, video channels and data channels respectively. According to a particular aspect of the present invention, each ground station or satellite station has the capability to receive and process a combination of multiple audio, video and data channels in any desired combination, and to a desired degree of compression. For instance, ground station $GS_1$, as illustrated in FIG. 25, receives and processes two video channels $VC_1$ and $VC_2$, several audio channels $AC_1$ through $AC_P$, and several data channels $DC_1$ through $DC_Q$. Ground station $GS_2$ receives and processes three video channels $VC_{20}$, $VC_{21}$, and $VC_{22}$, but no audio or data channels. Ground station $GS_3$ receives and processes three audio channels $AC_{30}$, $AC_{31}$, and $AC_{32}$, and three data channels $DC_{30}$, $DC_{31}$, and $DC_{32}$, but no video channels.

FIG. 26 further illustrates the composition of the audio channels $AC_1$, $AC_2$, and $AC_3$. Each audio channel, such as the audio channel $AC_1$, accommodates one or more incoming audio signals from independent sources, such as the audio signals $A_1$ through $A_4$. Audio channel $AC_2$ accommodates audio signals $A_5$ through $A_8$, and audio channel $AC_3$ accommodates audio signals $A_9$ through $A_{12}$. It will be understood to those skilled in the art after reviewing the present description that each audio channel can comprise a significantly greater number of incoming audio signals. The sources of the incoming audio signals $A_1$ through $A_{12}$ may be studio, off-air, or industry standard common carriers which are delivered or locally generated.

Figure 27:
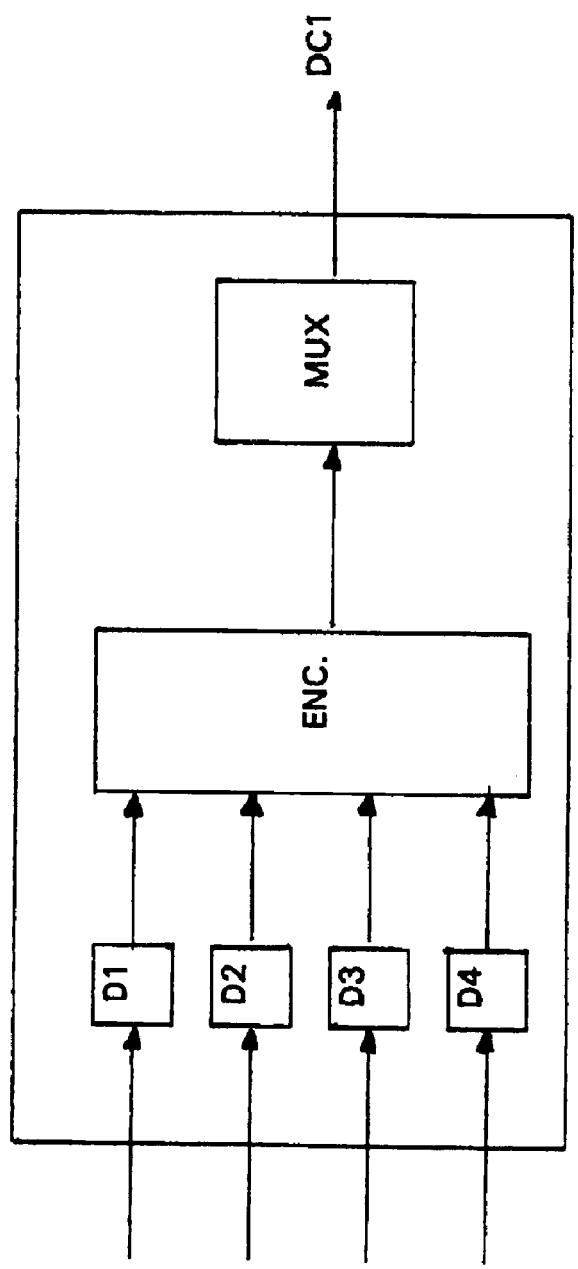
FIG. 27 provides details, in a block diagram form, a data channel $DC_1$ in the ground station $GS_1$ of FIG. 25.

Similarly, FIG. 27 shows the data channel $DC_1$ as accommodating four incoming data signals $D_1$ through $D_4$. It should however be understood that additional incoming data signals can be processed through data channel $DC_1$. The sources of the incoming data signals $D_1$ through $D_4$ may be industry standard asynchronous data transmission.

Figure 28:
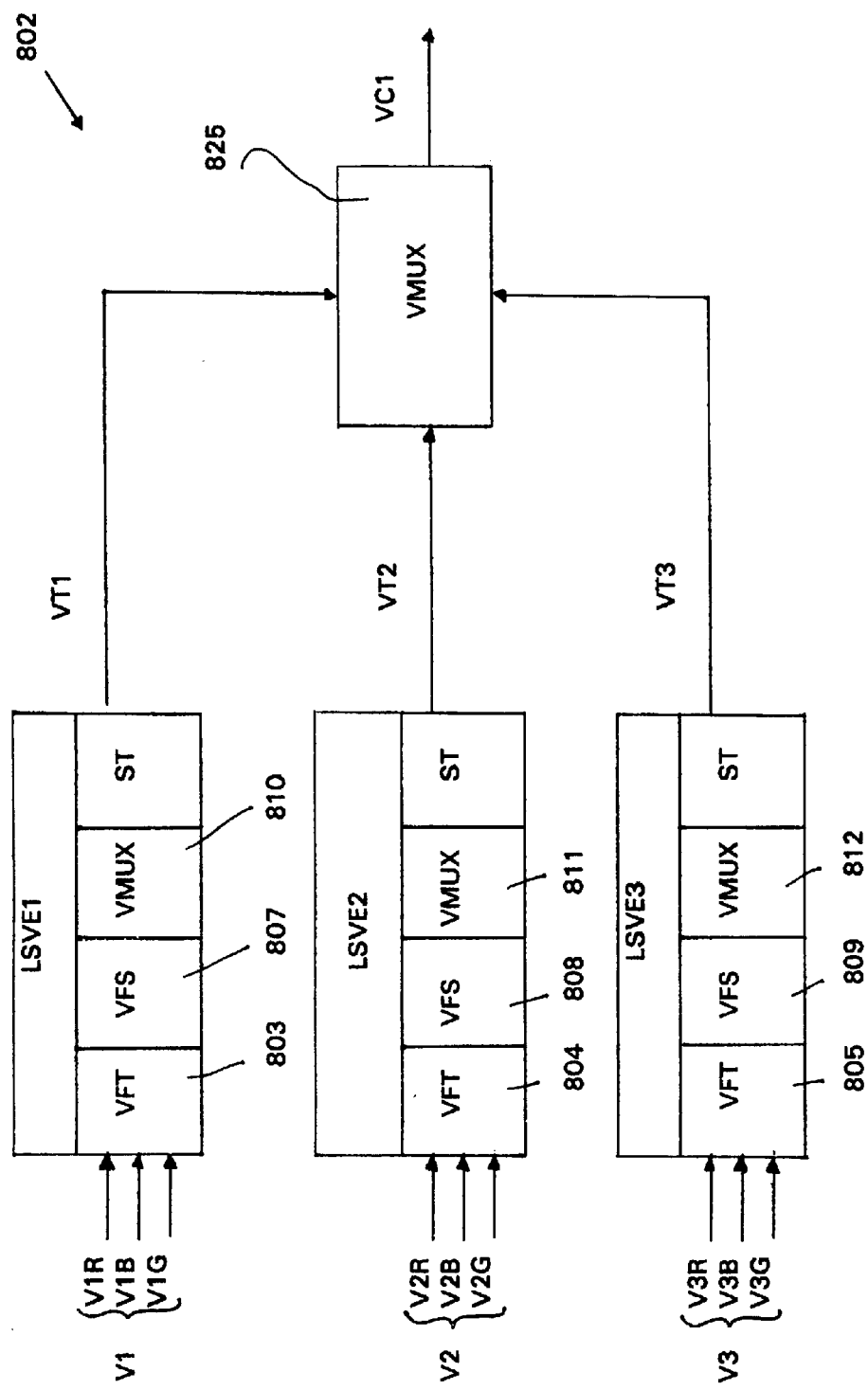
FIG. 28 provides details, in a block diagram form, of a video channel $VC_1$ in the ground station $GS_1$ of FIG. 25.

FIG. 28 illustrates the video channel $VC_1$ as accommodating three incoming video signals $V_1$ through $V_3$, but additional video signals may also be added according to the teachings of the present invention.

Figure 29:
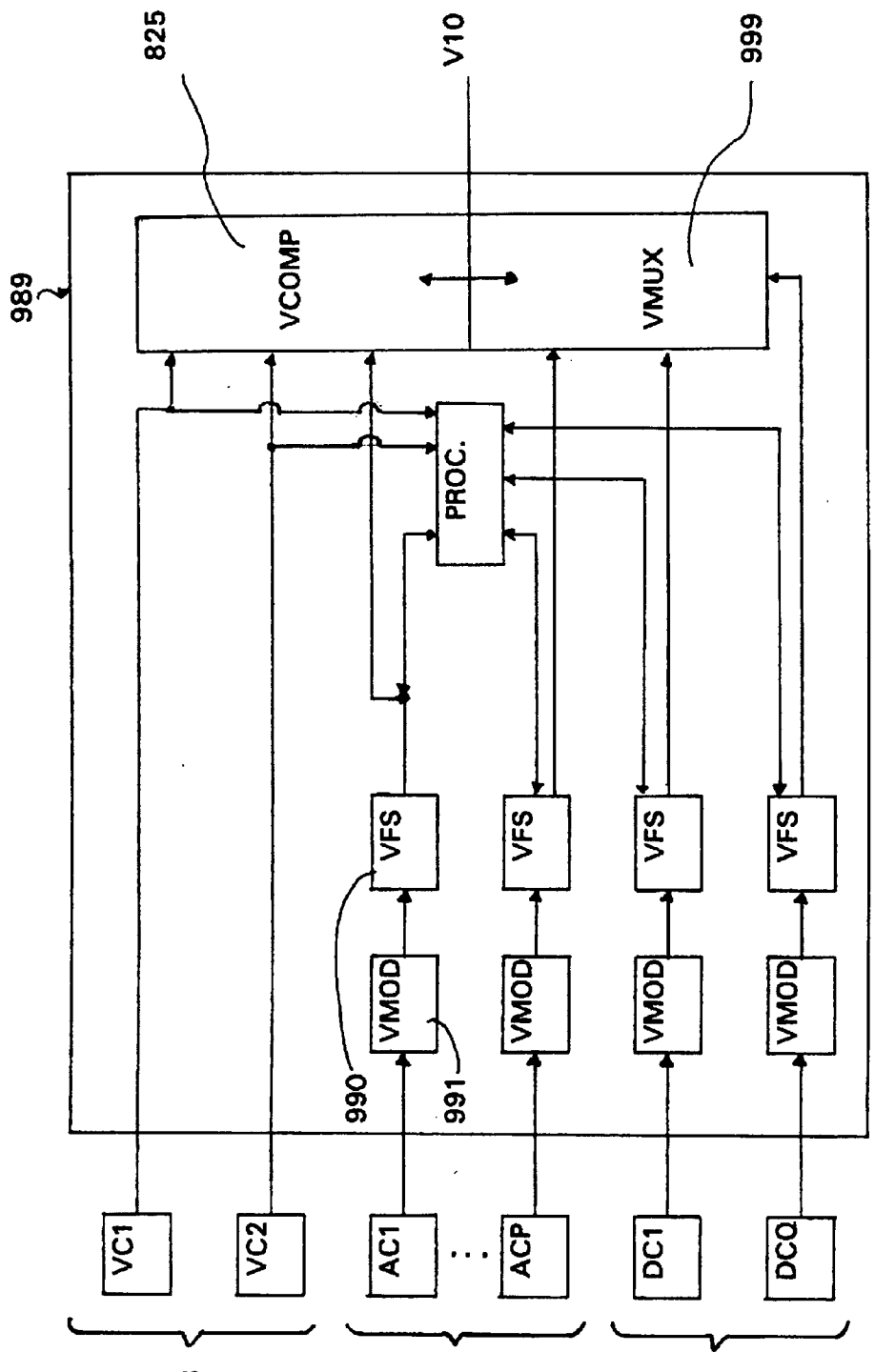
FIG. 29 is a partial block diagram architecture of ground station $GS_1$ of FIG. 25, showing a Central Video Switching Exchange (CVSE) constructed according to the present invention.
Figure 30:
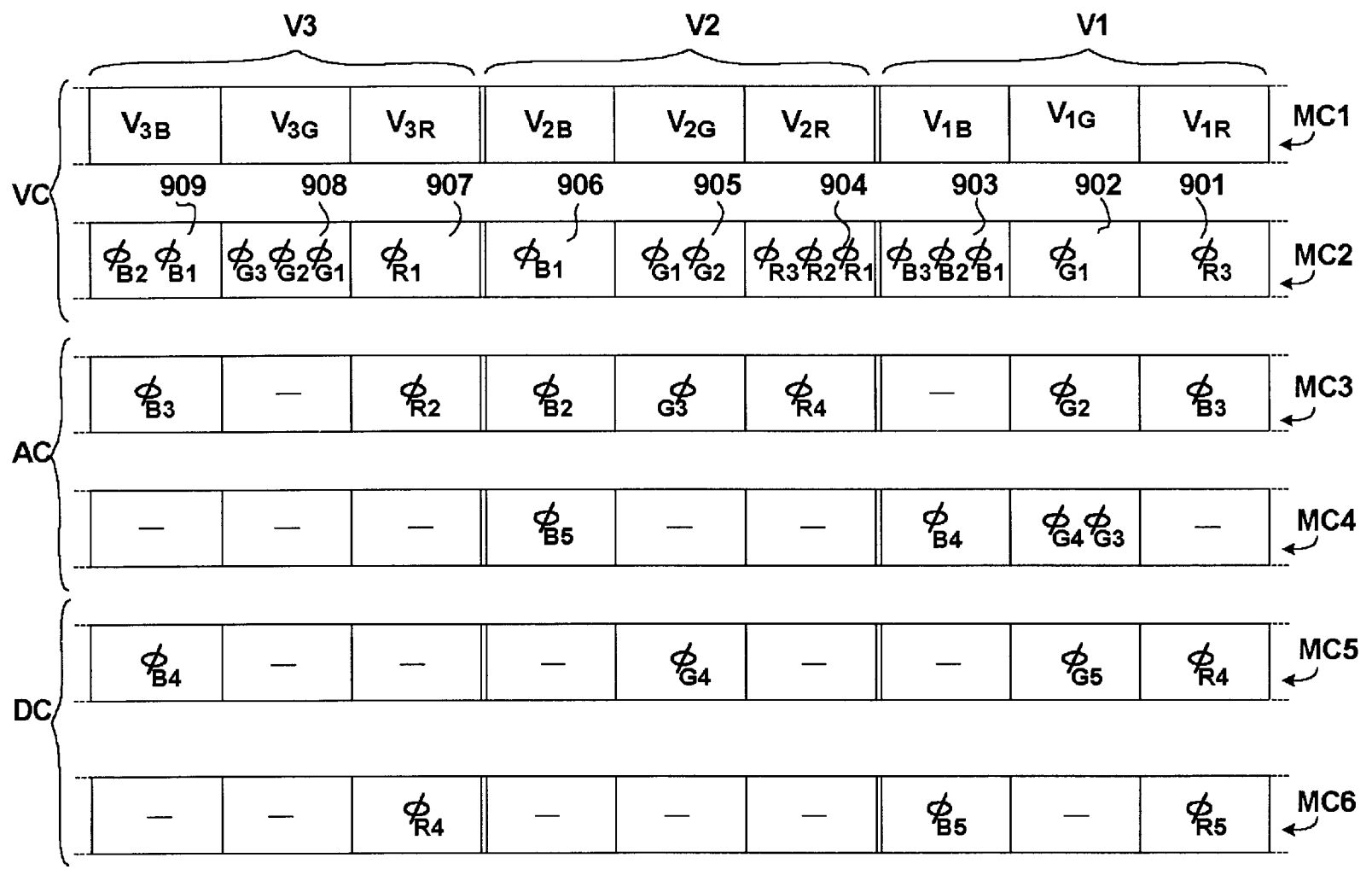

FIGS. 29 and 30 provide additional details of the ground station $GS_1$ of FIG. 25, and illustrate the inter-dependence of the video, audio and data channels $VC_1$, $VC_2$, $AC_1$ through $AC_P$, and $DC_1$ through $DC_Q$. These figures illustrate an important aspect of the present invention, namely that the video, audio and data signals are compressed through the selective allocation of video harmonic frequencies, and that the audio and data channels are modulated at video frequencies and treated as if they were video channels. The bandwidth of the video channels will enable high quality compression of a significant number of audio and data channels. FIG. 29 shows a central video switching exchange (CVSE) 989, which allows for the compression, modulation and multiplexing of the video, audio and data signals, as shown in the marker channels of FIG. 30.

The processing of the video, audio and data signals will now be described in detail.

Processing of Video Signals

Considering now the video channel $VC_1$ of the ground station $GS_1$ in FIG. 25 in greater detail with respect to FIG. 28, it includes three exemplary incoming video signals $V_1$, $V_2$, and $V_3$ of the RGB type. It should however be understood to those skilled in the art after reviewing the present specification, that other combinations of incoming video signals are contemplated within the scope of the present invention. While the present specification describes the modulation of the audio and data signals over R, G, B video (RF) frequencies, it should be understood that other frequencies in the video range can be alternatively selected. For illustration purposes only, and without limiting the scope of the invention, the following video input specifications can be used:

1. NTSC
   Impedance: 75 ohms
   Level: 1.0 V±0.3 $V_{p-p}$
   Sync: Negative
   Return Loss: Greater than 30 dB
   Level Adjust: ±3 Db
2. RGB
   Inputs: 1 for each R, G, B
   Impedance: 75 ohms
   Level:
     G 1.0 V+0.3 $V_{p-p}$
     R, B 0.7 V+0.2 $V_{p-p}$
   Sync: on G only, Negative
   Return Loss: Greater than 30 Db
   Level Adjust: ±3 Db

3. Y/R-Y/B-Y

Inputs: 1 for each Y, R-Y, B-Y

Impedance: 75 ohms

Level:
  Y 1.0 V±0.3 $V_{p-p}$
  R-Y,B-Y 0.7 V±0.2 $V_{p-p}$

Sync: on Y only, Negative

Return Loss: Greater than 30 dB

Level Adjust:±3 dB

More particularly, for cable television (CATV) applications, the CATV headend unit conforms to short haul specifications, and the consumer units conform to medium haul specifications. Additionally, the frequency response and other characteristics of the CATV headend units of two exemplary video types (NTSC and RGB) could conform to the following specifications:

1. NTSC

Frequency Response:
  ±0.25 dB to 4.2 MHz
  −3 Db at 5.0 Mhz
  −12 dB at 6.0 MHz Chrominance Bandwidth:
  −3 dB at 3.58 MHz+620 KHz (I,Q)
  −1.3 MHz (I), −620 KHz (Q)

Y Vertical Response: At least 20% response at 330 lines

Return Loss: Greater than 30 dB to 60 MHz.

2. RGB

Frequency Response:
  ±0.25 dB to 5.0 MHz
  −12 dB at 6.0 MHz

Signal Level G: 1.0 $V_{p-p}$ into 75 ohm
  R, B: 0.7 $V_{p-p}$ into 75 ohm

Negative Synch on Green

Vertical Resolution: At least 20% response at 330 lines

Return Loss: Greater than 30 dB to 60 MHz.

Each of the incoming video signals $V_1$, $V_2$, and $V_3$ is passed through a local video switching exchange (LVSE), such as LVSE 802 for imparting a desired degree of compression to the incoming video signals, and for multiplexing these signals into a single video channel $VC_1$. The incoming video signals $V_1$, $V_2$, and $V_3$ can be expressed in equation form, as follows:

$$V_1 = V_{1R} + V_{1G} + V_{1B} \tag{15}$$

$$V_2 = V_{2R} + V_{2G} + V_{2B} \tag{16}$$

$$V_3 = V_{3R} + V_{3G} + V_{3B}, \tag{17}$$

where $V_{1R}$, $V_{1G}$, $V_{1B}$, $V_{2R}$, $V_{2G}$, $V_{2B}$, $V_{3R}$, $V_{3G}$ and $V_{3B}$ are the R, G and B components of the incoming video signals $V_1$, $V_2$, and $V_3$ respectively.

FIG. 28 further illustrates three local video switching exchange $LVSE_1$, $LVSE_2$ and $LVSE_3$ which process the incoming video signals according to the foregoing teachings, via the video Fourier transformers VFT 803, 804 and 805; the video frequency selectors VFS 807, 808 and 809; and the video multiplexers VMUX 810, 811 and 812. Each one of these R, G and B components is passed through a Fourier transformer, such as the Fourier transformers 803, 804 and 805, for deriving the Fourier harmonics of these signals. For purposes of brevity, and since the incoming signals are basically processed in a generally similar manner, only the transformation of the incoming signal $V_1$ will be described hereafter in detail.

The Fourier transformation of the signal V, is carried out according to the following equations:

$$x(t) = a_0 + (a_n \cos nw_0 t + b_n \sin nw_0 t) \tag{18}$$

where x(t) is the video signal function, such as $V_{1R}$, $V_{1G}$, and $V_{1R}$, and $$a_0 = (1T).x(t).dt \tag{19}$$

$$a_n = (2T).x(t) \cos nw_0 t \, dt \tag{20}$$

$$b_n = (2T).x(t) \sin nw_0 t \, dt. \tag{21}$$

The application of the above equations to the video signals will be expressed in the following equations for better handling. For simplicity purposes, and for better focus on the gist of the invention, the $a_0$ coefficient will not be considered in the present illustration. However, this coefficient will be taken into account by those skilled in the art.

$$V_{1R} = V_{R1}[\phi_{R1}] + V_{R2}[\phi_{R2}] + V_{R3}[\phi R_3] + V_{R4}[\phi R_4] + V_{R5}[\phi_{R5}] + \tag{22}$$

$$V_{1G} = V_{G1}[\phi_{G1}] + V_{G2}[\phi_{G2}] + V_{G3}[\phi_{G3}] + V_{G4}[\phi G_4] + V_{G5}[\phi_{G5}] + \tag{23}$$

$$V_{1B} = V_{B1}[\phi_{B1}] + V_{B2}[\phi_{B2}] + V_{B3}[\phi_{B3}] + V_{B4}[\phi B_4] + V_{B5}[\phi_{B5}] + \tag{24}$$

In the above equations, [φ] represents the sinusoidal angular components of the Fourier sinusoidal harmonic signals, and V[φ] represents the Fourier transform.

The present invention allows for a various degree of video signal compression, by selecting only those Fourier components that are desirable for a later regeneration of the original signal. The selection process can be pre-programmed, or automatic, as it will be explained later in greater detail.

"The video channel $VC_1$ is illustrated by the two marker channels $MC_1$ and $MC_2$ of FIG. 30, as comprising three video bands $V_1$, $V_2$ and $V_3$. Each one of these bands includes several sub-bands, such as the sub-bands 901 through 909, corresponding to particular video frequencies such as R (i.e. sub-band 901), G (i.e. sub-band 902) or B (i.e. sub-band 903). For illustration purposes only the first and second transforms $V_{R1}$ [$NR_1$] and $V_{R2}[N_{R2}]$ respectively of the component signal $V_{1R}$ are selected to be processed by the Fourier selector 807, as shown in sub-band 901, thus reducing equation (22) to:

$$V_{1R} = V_{R1}[N_{R1}] + V_{R2}[N_{R2}]. \tag{25}"$$

Sub-band 903 in marker channel $MC_2$ illustrates that only the first transform $V_{G1}[\phi_{G1}]$ of the signal $V_{1G}$ has been selected, thus reducing equation (23) to:

$$V_{1G} = V_{G1}[\phi_{G1}]. \tag{26}$$

Similarly, as illustrated in the marker channel $MC_2$, the first, second and third transforms $V_{B1}[\phi_{B1}]$, $V_{B2}[\phi_{B2}]$, and $V_{B3}[\phi_{B3}]$ of the signal $V_{1B}$ are selected, in the sub-band 903, thus reducing equation (24) to:

$$V_{1B} = V_{B1}[\phi_{B1}] + V_{B2}[\phi B_2] + V_{B3}[\phi_{B3}]. \tag{27}$$

Consequently, by substituting the selected Fourier transforms of the signals $V_{1R}$, $V_{1G}$, and $V_{1B}$ of equations 25, 26 and 27 in equation 15, the signal $V_1$ becomes:

$$V_{1T} = V_{R1}[\phi_{R1}] + V_{R2}[\phi_{R2}] + V_{B1}[\phi_{B1}] + V_{B2}[\phi_{B2}] + V_{B3}[\phi_{B3}] + V_{G1}[\phi_{G1}]. \tag{28}$$

thus achieving the selective compression of the video signal $V_1$. $V_{1T}$ is the transformed signal of the signal $V_1$, after the selection process of the harmonic transforms has been carried out.

Considering now the signal $V_2$ in connection with sub-bands 904, 905 and 906, it is processed similarly to the signal $V_1$, and it could be expressed by the following equation:

$$V_{2T}=V_{R1}[\phi_{R1}]+V_{R2}[\phi_{R2}]+V_{G1}[\phi_{G1}]+V_{G2}[\phi_{G2}]+V_{R3}[\phi_{R3}]+V_{B1}[\phi_{B1}]. \quad (29)$$

thus achieving the selective compression of the video signal $V_2$.

In a similar way, the selective compression of the video signal $V_3$ is illustrated in sub-bands 907, 908 and 909, as follows:

$$V_{3T}=V_{R1}[\phi_{R1}]+V_{G1}[\phi_{G1}]+V_{G2}[\phi_{G2}]+V_{G3}[\phi_{G3}]+V_{B1}[\phi_{B1}]+V_{B2}[\phi_{B2}]. \quad (30)$$

The signal selection is carried out by the selectors 807, 808 and 809 of FIG. 28. The signals $V_{1T}$, $V_{2T}$ and $V_{3T}$ are then multiplexed by the multiplexer 810 to yield the signal $V_{T1}$, as follows:

$$V_{T1}=V_{1T}+V_{2T}+V_{3T}. \quad (31)$$

The signals $V_{T2}$ and $V_{T3}$ are derived in a similar manner as $V_{T1}$, and are multiplexed, by the multiplexer 825 in accordance with the teachings of the present invention or with other multiplexing teachings, to yield the $VC_1$ signals:

$$VC_1=V_{T1}+V_{T2}+V_{T3}. \quad (32)$$

It should however be understood that the video channel $VC_1$ can accommodate a much greater number than the three video signals $V_1$, $V_2$ and $V_3$.

While in general, it would be desirable to select the first or lower harmonics of the transformed video signals, it might be more desirable, in certain circumstances, to select the later or higher harmonics, and to reserve the lower harmonics to non-video signals, such as audio or data signals. This is desirable when the fidelity of reproduction of the video signal is not as important as that of the audio or data signals.

As it will be described in greater detail with respect to FIGS. 31 through 33, this feature is automatically selected to further enhance the compression of the video, audio and data signals on the same video channel. For instance, when the video picture is a still or background picture that has not changed or that has minimally changed, then higher harmonic signals are selected for the video signals, and lower harmonics are assigned to audio and/or data signals.

Figure 34:
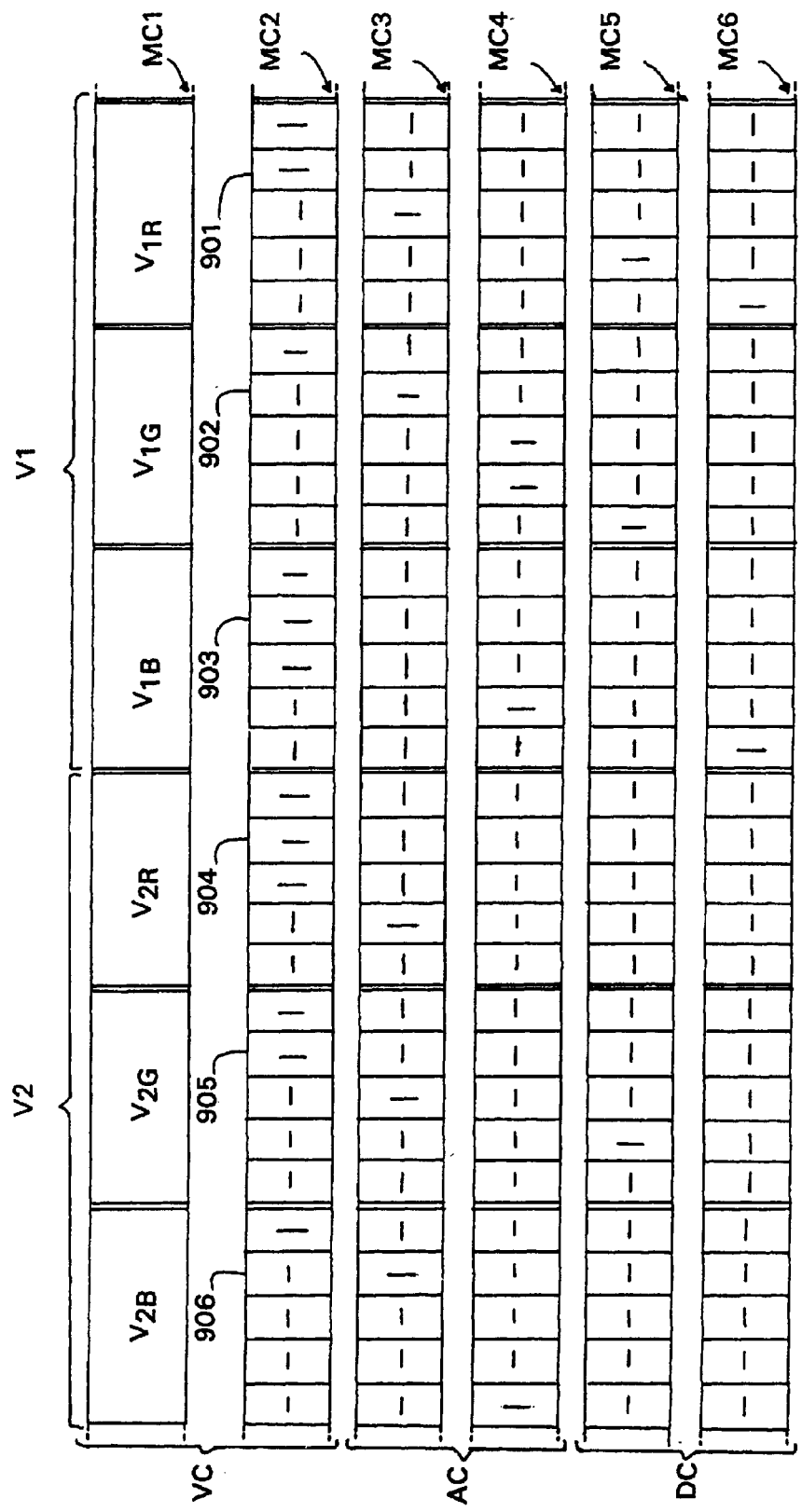
FIG. 34 represents markers channels or data encoding scheme for the marker channels in FIG. 30.

FIG. 34 shows the six illustrative VAD marker channels $MC_1$ through $MC_6$ of FIG. 30, with a further breakdown of the sub-bands 901 through 906. These marker channels are useful visual aid techniques to simplify the description of the various compression schemes according to the present invention, and to aid in the design of the PDS and its maintenance.

Each of the sub-bands, such as the sub-band 901, includes five consecutive intervals, which are illustrated as boxes in order to facilitate the understanding of the invention. Each of these intervals indicates the number or order of the harmonic component selected to be processed. In the present example, it is desired to process only the first five harmonic components, and therefore, only five intervals have been selected. It should however be understood that the number of intervals (five) is shown for illustrative purposes and is not intended to be limiting, and other numbers could be employed without departing from the spirit of the invention. In operation, the sub-bands may be programmed independently from each other, and the programming process could be continuously monitored and updated according to the signals being processed.

FIGS. 35 and 36 illustrate a compression scheme, whereby the signals in the sub-bands 901, 902 and 903 are serially multiplexed. The harmonic frequencies allocation is as follows:

$V_{1R}$: First and second harmonic of the R frequency.

$V_{1G}$: Third harmonic of the R frequency.

$V_{1B}$: Fourth and fifth harmonics of the R frequency, and first harmonic of the G frequency.

It should however be understood that the above reallocation of harmonic frequencies is given as an example only, and the compression scheme of the invention presents other flexible harmonic frequency reallocation alternatives. For example the following reallocation or frequency shifting scheme could be followed:

$V_{1R}$: First and second harmonics of the R frequency.

$V_{1G}$: Third harmonic of the R frequency.

$V_{1B}$: First, second and third harmonics of the B frequency.

With either the above exemplary compression schemes, harmonic frequencies and sub-bands are now freed to be allocated to other signals, possibly non video signals.

The magnitude or amplitude of the signals could be modified or amplified at either the transmitter or the receiver end. Thus, the compression scheme could be used in conventional video transmitters to transmit the video signals on a real-time basis. The receiver receives these signals and causes them to be viewed on a real time basis. The signals are labeled or coded so that at the receiver level the signals could be identified and decoded and thereafter separated or processed as desired.

Considering now the automatic selection of the harmonic frequencies in connection with FIGS. 31 and 32, there is illustrated two alternative compression methods, which could be used either separately or in combination with each other, as will be described later in relation to FIG. 33. FIG. 31 is a flow chart of a preferred embodiment for a "horizontal compression technique", and is illustrated by the program routine 950 which permits the automatic compression of video signals at various degrees, for selecting only those Fourier components that are desirable for a later regeneration of the original signals.

The routine 950 starts at step or block 951, and sets the value of a count integer n to zero, at 952. The value of n is indicative of the number of the Fourier harmonic components. For instance, if n=1, then the routine 950 will select the first Fourier component $V_1[\phi_1]$, and will keep selecting, storing and adding subsequent Fourier components until a predetermined component $V_A[\phi_A]$ is reached, or if the amplitude component $DV_n$ is less than or equal to a predetermined value x such as zero, where:

$$DV_n = \text{absolute value of } (V_n - V_{n+1}). \quad (33)$$

In effect, what is being accomplished by equation 33 is that each signal $V_n[\phi_n]$ is taken as a template for the next harmonic signal $V_{n+1}[\phi_{n+1}]$, and if the value of $DV_n$ is less than x, then it would be acceptable not to consider the harmonic component $V_{n+1}[\phi_{n+1}]$ or the following harmonics, and a flag will be set to that effect, for future use of this information for reconstructing the original signal. For example, if, when considering the third Fourier component $V_3[\phi_3]$ it is found that $[DV_2=(V_2-V_3)<x]$, then the third harmonic component $V_3[\phi_3]$ will not be considered, and only the first and second harmonic components $V_1[\phi_2]$ and $V_2[\phi_2]$ will be used, and a flag will be set to the effect that $DV_2<x$.

While the above compression technique is described with respect to two immediately succeeding Fourier components, it should be understood that other not immediately succeeding signals, could be compared, such as: $DV_n = V_n - V_{n+3}$. It should also be noted that the compression techniques described in this specification could be used with analog or digital signals.

A subroutine is started at block 953, by increasing the value of the count integer n to (n+1). The program then determines whether the count integer n has reached or exceeded a preselected value A, at 954. If it has not, then the program determines at block 955 whether $DV_n$ is less than or equal to x. If $DV_n$ is found to be greater than x, then the nth harmonic component $V_{n[\phi n]}$ is selected and stored at 957, and the program increases the n count by 1, at block 953, and inquires once again at 954 whether the count integer n has reached the preselected value A.

If the value A has not been reached, then the program repeats the comparative step at 955, and if it is determined that $DV_n$ is less than or equal to x, then a flag is set at 959, and the values of the stored harmonic components $V_n[\phi_n]$ for composing the video signal V at 960. If at 954 it is determined that n has reached the value A, then the software adds all the selected and stored harmonic components to form the video signal V. The subroutine relating to the audio and data compression will be explained later.

Figure 32:
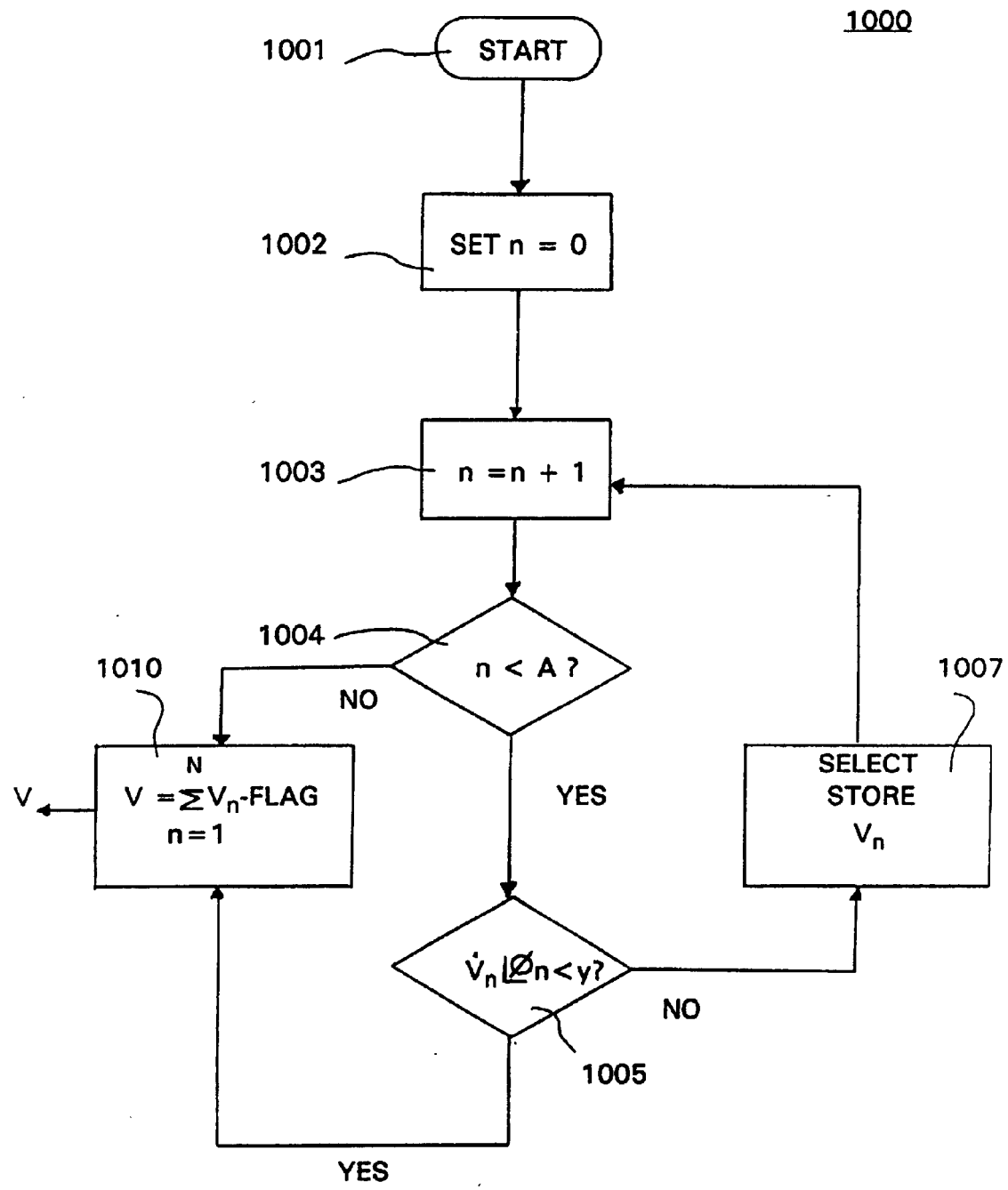
FIG. 32 is a flow chart representation of a "vertical compression" method according to the present invention.

Turning now to FIG. 32, it illustrates a program routine 1000 of an alternative embodiment for a "vertical compression technique", and permits the automatic compression of video signals at various degrees, for selecting only those Fourier components that are desirable for a later regeneration of the original signal. The routine 1000 starts at block 1001, and sets the value of a count integer n to zero, at 1002.

Similarly to the horizontal compression technique described above, the value of the integer n is indicative of the number or order of the Fourier harmonic components. For instance, if n=1, then the routine 1000 will select and the first Fourier component $V_1[\phi_1]$, and will keep selecting, storing and adding subsequent Fourier components until a predetermined component $V_A[\phi_A]$ is reached, or if the amplitude component $dV_n$ is less than or equal to a predetermined value y, such as zero, where $dV_n$ is the absolute value of the derivative of $V_n$, whether angular or with respect to time, of the nth harmonic component, that is of the difference between the present nth harmonic component and the (n−1)th harmonic component immediately preceding it, wherefore the designation "vertical compression".

What is being accomplished by this vertical compression technique is that if the value of $dV_n$ is less than y, then it would be acceptable not to consider the harmonic component $V_{n+1}[\phi_{n+1}]$ or following harmonics, and a flag is set to that effect, for future use of this information for reconstructing the original signal. While the above compression technique is described with respect to two immediately succeeding Fourier components of the nth order, it should be understood that other, not immediately succeeding components, could alternatively be compared, such that the second derivative $ddV_n$, rather than the first derivative $dV_n$, is compared to y, and the remaining process is similar, as described below.

A subroutine is started at block 1003, by increasing the value of the count integer n to (n+1). The program then determines whether the count integer n has reached or exceeded a preselected value A, at 1004. If it has not, then the program determines at block 1005 whether $dV_n$ is less than or equal to y. If $dV_n$ is found to be greater than y, then the nth harmonic component $V_n[\phi_n]$ is selected and stored at 1007, and the program increases the n count by 1, at block 1003, and inquires once again at 1004 whether the count integer n has reached the preselected value A.

"If the value A has not been reached, then the program repeats the comparative step at 1005, and if it is determined that $dV_n$ is less than or equal to y, then a flag is set, and the values of the stored harmonic components $V_n[N_n]$ for composing the video signal V at 960. If at 1004 it is determined that n has reached the value A, then the software adds all selected harmonic components to form the video signal V."

Figure 31:
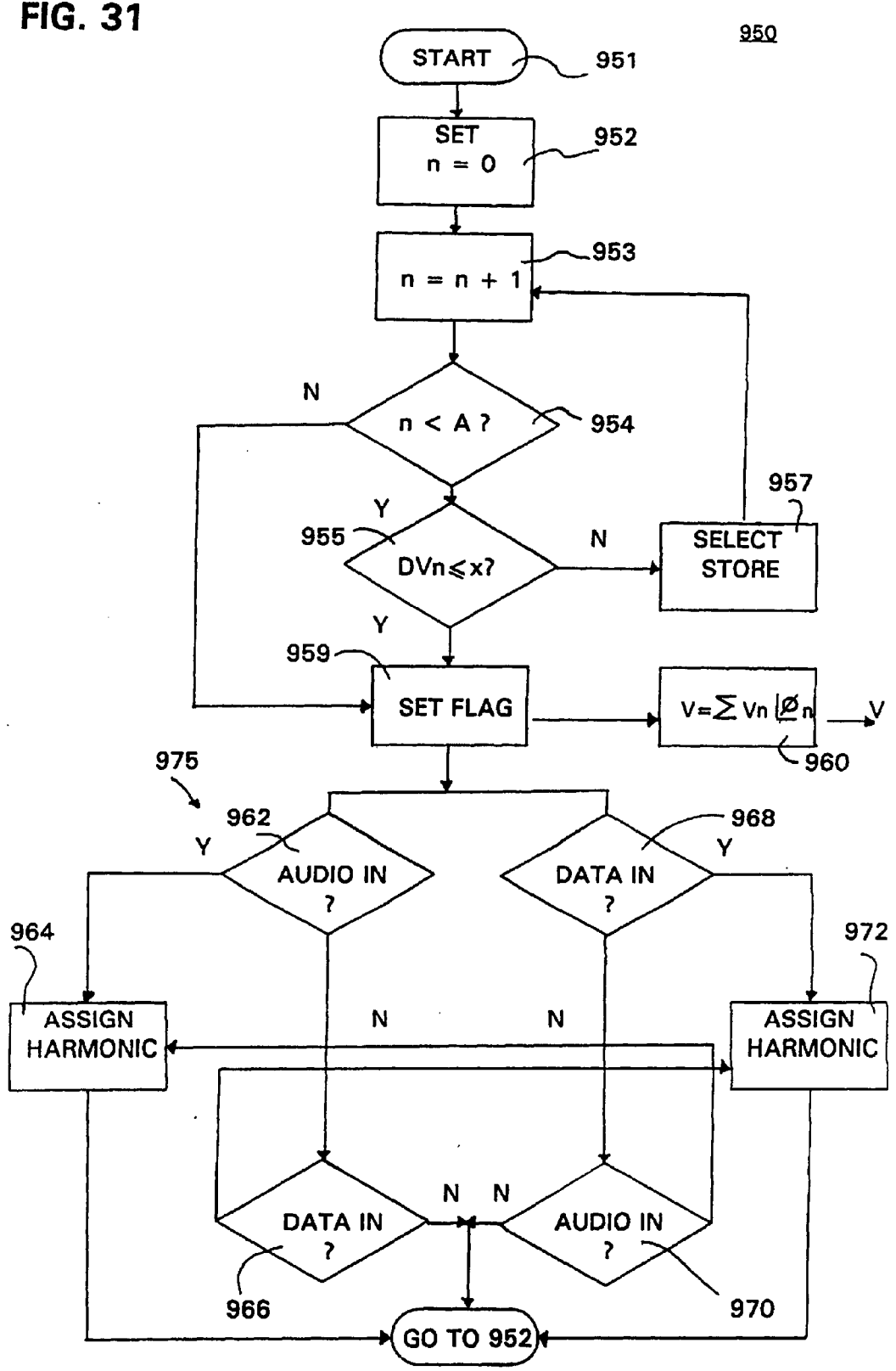
FIG. 31 is a flow chart representation of a "horizontal compression" method according to the present invention.
Figure 33:
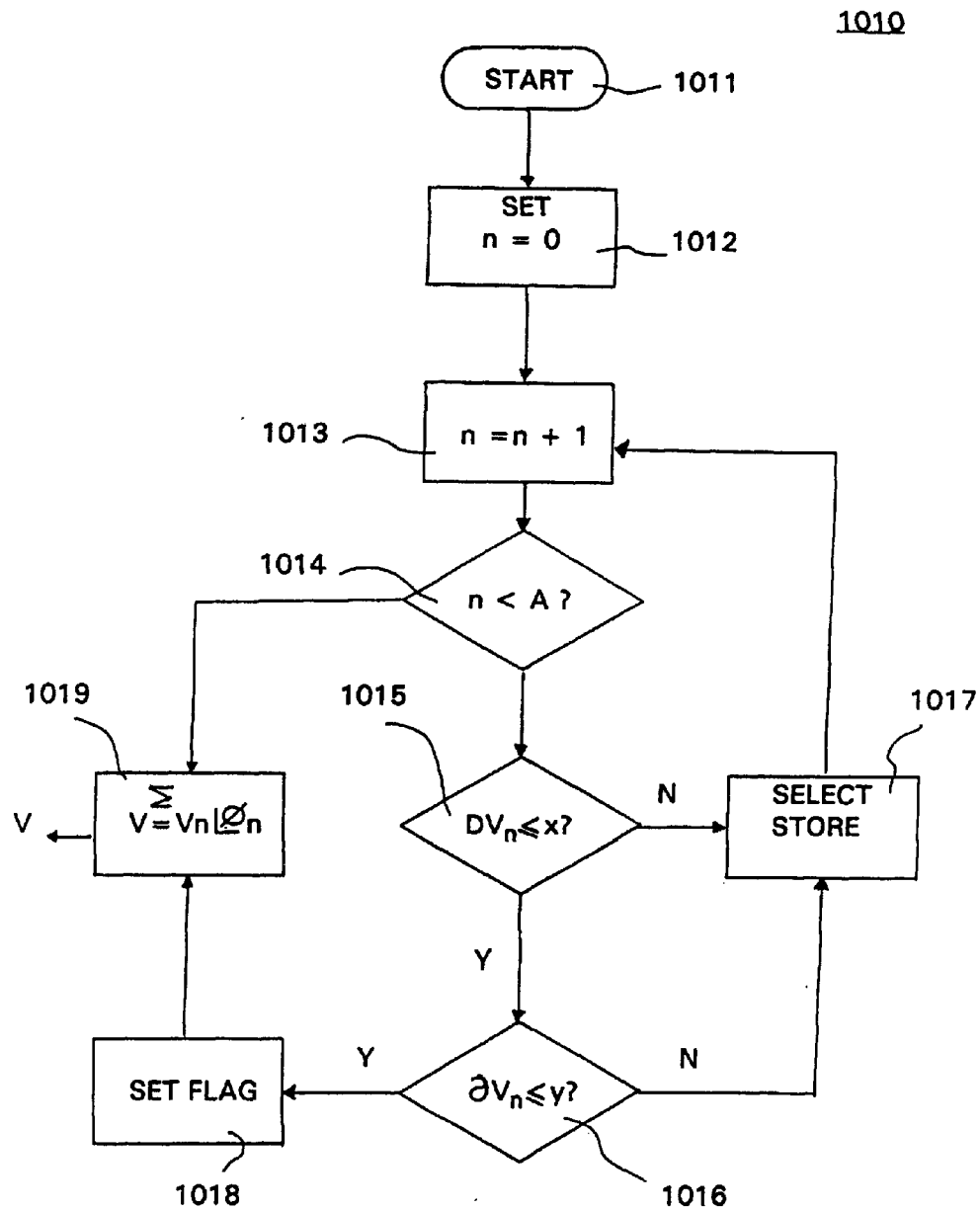
FIG. 33 is a flow chart representation of a combined "horizontal and vertical compression" method according to the present invention.

Turning now to FIG. 33 it represents a flow chart of a program routine 1010 which combines the foregoing vertical and horizontal compression techniques discussed in relation to FIGS. 31 and 32. While the routine 1010 represents one particular combination of these techniques, it should be understood that other combinations are possible. In the combination illustrated in FIG. 33, the program keeps selecting and storing successive Fourier components, at 1017, as long as either $DV_n$ is greater than x, or $dV_n$ is greater than y. It is only when the count integer n is equal to, or greater than A; or when both $DV_n$, and $dV_n$, are less than x and y respectively, that the program exits the iterative subroutine and adds all the stored signals $V_n$.

The video signals are multiplexed by the multiplexer 825 according to the foregoing, or according to conventional teachings.

Processing of Audio and Data Signals

The processing of the incoming audio signals will now be described in relation to FIGS. 25, 26, 29, 30 and 31. FIG. 25 shows the ground station GS, as accommodating several audio channels AC, through $AC_p$. For illustration purposes only, FIG. 26 illustrates three audio channels $AC_1$, $AC_2$ and $AC_3$, each of which accommodates four incoming audio signals, of which, only the audio channel $AC_1$ will be described hereafter in detail. The incoming audio signals $A_1$ through $A_4$ on the audio channel $AC_1$ are digitized, compressed and multiplexed by the audio compressor 975 and multiplexer 976, as is conventionally known in the art.

As illustrated in FIG. 29, the audio channel AC, is then transmitted to the CVSE 989, where the signals are selectively modulated over particular video frequencies, such as the R, B and G frequencies, by means of an audio to video modulator 991. The modulated signals are then fed through a Fourier transformer 990, for calculating the Fourier harmonics of the video modulated audio signals. One important aspect of the present invention is to treat these video modulated audio signals similarly to the incoming original video signals described above. These video-modulated audio signals are then multiplexed with the original incoming video signals, by the multiplexer 999, as further illustrated in FIG. 30. It should be understood that the incoming audio and data signals could alternatively be passed through the video frequency selectors VFS, i.e. VFS 990, and then passed through the video modulator, i.e. VMOD 991.

FIG. 30 illustrates two marker channels $MC_3$ and $MC_4$ relating to the modulation of the audio signals over video frequencies. The marker channel $MC_3$ is an exemplary marker channel for the audio channel $AC_1$, and the marker channel $MC_4$ is an exemplary marker channel for the audio channel $AC_p$. An important aspect of the present invention is to have the CVSE 989 assign a video harmonic frequency to the audio signals.

For this purpose, the CVSE 989 determines which video harmonic frequencies have not been allocated, and to modulate the audio signals over these frequencies. While in the preferred embodiment of the invention the video signals are assigned preferential harmonics, followed by the audio and then the data signals, it should be understood that a different prioritization scheme could be followed.

The marker channel MC$_3$, indicates that the CVSE 989 has assigned the harmonic component V$_{R3}$[ϕ$_{R3}$] in sub-band 901. The harmonic component V$_{G2}$[ϕ$_{G2}$] has been assigned in sub-band 902, but no harmonic components were assigned in the video sub-band 903. It should be re-emphasized at this point that there is no intention to limit the marker channel architecture to the R, G and B frequencies, and that other reference video frequencies could alternatively be selected. Furthermore, the selection and assignment of the sub-bands to the audio and data channels could be done automatically, by setting a hierarchical order for each audio channel. For instance, the third and fourth harmonic components V$_{G3}$[ϕ$_{G3}$] and V$_{G4[ϕG4]}$ in the sub-band 902 have been assigned to the audio channel AC$_p$, while the harmonic component V$_{G2}$[ϕ$_{G2}$] also in the sub-band 902 is assigned to the audio channel AC$_1$. By varying the assignment combination of the harmonic components, it is now possible to arrive to various combinations of audio, data and video signals.

The data channels DC$_1$ through DC$_Q$ are modulated over video frequencies in a similar manner as described above in connection with the audio channels, and sub-bands assignment is carried out based on priority and availability. The video signals, video-modulated audio signals and/or video-modulated data signals are then multiplexed as video signals V$_{10}$ (FIG. 29), and transmitted to the ground station GS$_4$.

In certain instances, it would be desirable to assign predetermined harmonic components to a signal, such as an audio or video signal. However, it is possible that a conflict or a frequency assignment competition may arise in that those harmonic components have already been pre-assigned in the sub-band in question. In anticipation of this situation, the CVSE 989 "slides" the signal and then reassigns another sub-band. It is also possible to leave unassigned certain sub-bands along the marker channels, such that these sub-bands will be reassigned at will, possibly automatically in the event of harmonic frequency competition. This feature is referred to as "sub-band re-assignment".

Another feature anticipated by the present invention is the "sub-band anti-competition", which allocates a predetermined priority to a signal which has been reassigned. For instance, as we mentioned above, audio signals takes precedence over data signals. However, a data signal could be programmed to take precedence over a reassigned audio signal.

Turning now to FIG. 31, a subroutine 975 assigns video harmonic components to the audio and/or data signals. The subroutine simultaneously asks at 962 and 968 whether any audio or data signals are incoming. If none is incoming, then the subroutine is exited and the program 950 is started at step 952. If on the other hand, audio and/or data signals are incoming, then video harmonic components are assigned for modulation at 964 and 972, as described above, and the subroutine 975 is exited.

VAD Mapping System

FIG. 37 is a block diagram representation of a video, audio and data (VAD) mapping system 1030 for processing the video, audio and data signals as described above. The VAD mapping system 1030 could be located at a ground or satellite station. However, for illustration purposes, and for the purpose of this example, the VAD mapping system will be considered as if it were located at ground station GS$_4$. The VAD mapping system 1030 includes a plurality of memory registers 1032 for registering the incoming signals, and for storing them for a predetermined period of time in a time-space matrix format. The memory registers 1032 are coupled to a logic module 1035, via bus lines, including an address bus 1037, in order to enable the selective and flexible processing, retrieval and reconstruction of the signals stored in the memory registers 1032.

The logic module 1035 includes a plurality of logic ports, and is connected to at least one additional memory register 1038. The logic module 1035 is capable of processing the signals stored in this memory register 1038 by themselves or in combination with the signals in the other memory registers such as the memory register 1032. The processing of the signals in the logic module 1035 is carried out according to conventional techniques and/or according to the video compression methods described above in the present specification. The processed signals are written in RAM memory registers 1039 and 1040, and are transmitted to either the end users directly or via other ground and/or satellite stations.

When the video, audio and/or data signals are selected for retrieval and decoding, these signals are demultiplexed into separate video channels, and then demultiplexed once again into different video bands. The demultiplexed video bands are separated into video sub-bands which contain the harmonic components.

FIG. 38 represents a data encoding/decoding scheme 1025 for the marker channels MC$_2$ through MC$_6$ illustrated in FIG. 30. This scheme 1025 represents the VAD signals which are transmitted, and is used to decode and demodulate these VAD signals, as well as to reconstruct and recombine them.

Considering for purposes of illustration marker channel MC$_3$, which is the marker channel for the audio channel AC$_1$, the digit "1" in the third box or register of sub-band 901 indicates that the audio signals have been modulated over the third Fourier harmonic (R) frequency. Consequently, when the VAD signals are to be reconstructed, the scheme 1025 is used to select only those harmonic frequencies that need to be processed, and to disregard the other harmonic frequencies.

This selection process of the harmonic frequencies is made clearer when further explained in conjunction with the VAD marker channel 1027 of FIG. 38. The VAD marker channel or data encoding and display channel 1027 combines the information in the marker channels of FIG. 30, and illustrates, in a visual manner, the information encoded in the sub-bands.

Considering for example the sub-band 901 of the VAD marker channel 1027, this sub-band has been allocated and divided into five registers, each of which is dedicated to a particular harmonic R video harmonic frequency. The first two registers indicate that the first two harmonic frequencies have been assigned to video signals from the video channel VC$_1$, and that video signals have actually been transmitted or received. The following register indicates that the third R video harmonic frequency has been assigned to an audio signal from the first audio channel AC$_1$. The last two registers show that the fourth and fifth R harmonic frequencies have been assigned to data signals from the data channel DC$_1$ and DC$_Q$ respectively. While only five registers have been selected for the marker channels illustrated and described in the present specification, it should be understood to those skilled in the art that other numbers of registers could be selected depending on the nature of the application.

FIG. 38 is a tabular representation of the VAD mapping system 1030 which registers and stores the data in the marker channels of FIG. 38. The table of FIG. 38 indicates that sub-band 901 is composed of video, audio and data signals; that the video signals have been assigned the first and second Fourier harmonic frequencies; that the audio signals have been modulated over the third Fourier harmonic frequency; and that the data signals have been modulated over the fourth and fifth Fourier harmonic frequencies. It would be possible to assign additional coordinates to the information in the registers of the VAD mapping system, which includes the magnitude or amplitude of the stored signal, as well as its source, such as the designation of the video, audio or data channel number.

For illustration purposes, it will be assumed that the final destination of the information processed by the logic module 1035 (FIG. 37) is the space station $SS_2$ and the ground station $GS_{35}$. The signals in the memory register 1032 are tabulated by the VAD mapping system 1030, according to FIG. 38. The signals in the memory registers 1038 are not shown but are processed in a similar manner to those in the memory registers 1032. The logic module 1035 then identifies the signals to be transmitted to the different destinations and routes them accordingly.

Program Insertion Systems

Cable television systems in the United States carry an average of 35 channels of diversified programming services. Higher capacity systems are currently being designed to 80 channels (550 MHz) on a single coaxial cable. Commercial program insertion systems, such as spot advertising, cross-channel promotional, barker insertions and network non-duplication have evolved somewhat independently in cable systems, and it would be desirable to integrate these program insertion systems within the cable television network.

Until recently, the cable operators have been generally using tape playback systems for most commercial program operations. However, these tape playback systems are limited in both their video storage capacity and their reliability. These machines are mechanical in nature, and therefore they require extensive maintenance to function.

By using the inventive concepts described in the present specification, it is now possible to dispense with the tape playback patching systems. More specifically, this objective would be accomplished by using the video, audio and data compression techniques described herein. Furthermore, the VAD mapping system could also be used to identify the location(s) at which the commercial/program needs to be inserted. Once these locations are identified, a flag or a series of flags is/are generated for insertion on a real time basis.

Another alternative approach is to multiplex the commercial/programs with the actual television or cable program, prior to transmitting the signals to the end users. The compression and multiplexing techniques are described in the present specification.

The VAD mapping system could also be used by the advertising agencies to reserve their spots, similarly to the reservation network used by travel agents.

Imaging Applications

The present invention has several applications in the imaging field, and in particular in the ultrasound technology for use in medical applications. One illustrative example of the conventional ultrasound diagnostic apparatus is generally described in the U.S. Pat. No. 4,612,937 issued to Miller and Assigned to Siemens Medical Laboratories, Inc., and which is incorporated herein by reference.

The patented apparatus displays two-dimensional blood flow information, superimposed over anatomical information. A transducer generates a series of ultrasound bursts which are directed towards the area of the body where blood flow and anatomical information are desired. The bursts are transmitted in several beam directions so as to form a sector scan. A detector circuit receives the reflected ultrasound signals and produces a frequency difference signal which corresponds to the difference in frequency between the transmitted and reflected ultrasound, such difference being attributable to the Doppler shift produced by moving blood cells. The apparatus uses higher frequencies to achieve greater resolution, and lower frequencies to achieve greater penetration. The apparatus uses ultrasound signals of about 3 MHz in frequency. The apparatus also uses a series of pattern array transducers or piezoelectric transducers, phased array pulsers and delay circuits in order to provide a standard sector scan image.

By using the prevent invention, it is now possible to achieve greater control over the penetration and resolution of the ultrasound signals. By controlling the harmonic frequencies of the signals, it is possible to better control the penetration and resolution of the signals. Furthermore, it is also possible to generate a three-dimensional picture of the region being diagnosed, and to generate an easily reproducible video picture.

According to the present invention it would be desirable to use two or more signals $S_1$ and $F_2$ of different frequencies and to be reflected and measured. The Doppler shifts generated in response to these two signals are measured and compared. For example, let us assume that the signal $S_1$ has a frequency $F_1$ which is lower than the frequency $F_2$ of the signal $S_2$, the signal $S_1$ will be used to control the resolution of the picture, while the signal $S_2$ will be used to control the penetration of the signal.

Each of the signals $S_1$ and $S_2$ are transmitted and received according to known conventional techniques. However, the simultaneous multiplexing of these two signals is performed according to the present invention, by alternately pulsating the two signals, either simultaneously or within a predetermined delay period from each other, and by allowing an intermittent delay period between two successive signals of the same frequency in order to allow for the processing of the reflected signals.

In the preferred embodiment of the imaging system, the signals $S_1$ and $S_2$ are simultaneously transmitted toward the body part to be imaged. While the present invention is described in relation to medical applications, it should be understood that the imaging system can be used for other applications. The Doppler shifts of the reflected signals $S_1$ and $S_2$ are compared, and each is weighted, according to the following equations 33, 34 and 35:

$$S_{RW} = S_{RR} + S_{RP} \tag{33}$$

$$S_{RR} = a.S_{1r} - b.S_{2r} \tag{34}$$

$$S_{RP} = p.S_{1r} - q.S_{2r} \tag{35}$$

$S_{RW}$ is the resulting Doppler shift being weighted for both signals $S_1$ and $S_2$. $S_{RR}$ is the resulting Doppler shift being weighted for resolution. $S_{RP}$ is the resulting Doppler shift being weighted for penetration. The signal $S_1$ having a lower frequency than the signal $S_2$, its Doppler shift $S_{1r}$ is assigned a heavier resolution weighing coefficient "a" than the resolution weighing coefficient "b" of the Doppler shift $S_{2r}$, see equation (34). By the same logic, the Doppler shift $S_{1r}$ is assigned a lower penetration weighing coefficient "p" than the penetration weighing coefficient "q" of $S_{2r}$, see equation (35).

Thus, according to equation (35), if the resulting Doppler shift $S_{RW}$ is equal to zero, then it is determined that Doppler shifts $S_{1r}$ and $S_{2r}$ are acceptable and could be used. If, on the other hand, $S_{RW}$ is different than the tolerance value, then the weighting coefficients a, b, p and q will require adjustment, and the next step would be to determine whether the Doppler shifts $S_{RR}$ or $S_{RP}$ are different than predetermined tolerance values, then the corresponding weighting coefficients are varied so that the Doppler shifts $S_{RR}$ or $S_{RP}$ are within their corresponding preassigned tolerance values. The above comparative test is done periodically, either on a line by line basis, or on a sector scan basis.

According to the present invention, it would be desirable to use RF video frequency. For illustration purposes only, and without any intent to limit the scope of the invention, three video signals will be used, at the R, G and B frequencies. The signals, such as the SR signal (R frequency) are coupled with other signals having frequencies that are an integer multiple of the frequencies of the original signals. For example, the SR signal is coupled with two signals having 2 R and R/2 frequencies respectively. In this manner, these three video signals can be processed and considered to be harmonic frequencies and combined to form a single signal. This process is referred to as the reverse Fourier transformation. These three signals are processed to better control penetration and resolution as described above in connection with the ultrasound signals. The G and B signals are treated similarly to the R signals. The reflected R, G and B signals are then processed and an image is formed. It might be desirable in some applications to control the amplitudes of the harmonic signals, in which event, the amplitudes of these signals are either increased or decreased to the desired value for better processing.

In other applications, the video signals could be processed alongside audio, data, infra-red, ultrasound or other signals, as described above in connection with the program delivery system.

Other Applications

The present invention also relates to various recording and storage media, such as optical discs, floppy discs, compact discs; cassettes of different sizes, i.e. micro or mini cassettes; etc. which utilize the foregoing compression and multiplexing methods. Basically, the audio and/or data signals are modulated over video frequencies, modulated and stored as video signals. The video signals could be generated by television monitors, ultrasound scanners, scanners, printers, faximile machines or other devices capable of producing a raster scan.

The present invention can also be used in video-audio-data mail applications, where a sender of information can leave encoded video, audio and/or data (VAD) messages, on a recorder, such as a conventional video recorder. When these VAD messages are to be retrieved, they are demultiplexed, demodulated and decoded according to the above teachings. The present video modulation system has several military and intelligence applications in that it allows the encoding of video, audio and data signals in a non-decodable format by unauthorized users.

While the foregoing compression methods and apparatus have been described in relation to Fourier Transformation, it should be understood to those skilled in the art that other known transformations may alternatively be used in the present invention, without departing from the inventive concept.

While particular embodiments of the present invention have been disclosed, it is to be understood that various different modifications are possible and are contemplated within the scope of the specification, drawings, abstract and appended claims.

What is claimed is:

1. A multi-point video conference system including a plurality of terminals connected to each other via a network, the terminal comprising:
    a compressor for packetizing video data and outputting packetized data to said network;
    a decompressor for receiving in a time sharing manner a plurality of packets transmitted from other terminals via said network, decompressing received packets in an order of reception thereof, and outputting decompressed video information;
    a plurality of storage elements for storing therein said decompressed video information in a frame unit;
    a display for displaying thereon contents stored in said storage elements;
    a switch for changing over the contents of said storage elements to supply said display; and
    a mapping system for mopping the packetized data that comprises:
        a table for tabulating the packetized data into a plurality of rows and columns;
        wherein the columns identify types of the packetized data;
        wherein the rows identify sub-bonds; and
        wherein the table enables a dynamic allocation of each packetized data into a cell identified by a row and a column.

2. The multi-point video conference system of claim 1, wherein the packetized data types comprise a video signal.

3. The multi-point video conference system of claim 1, wherein the packetized data types comprise an audio signal.

4. The multi-point video conference system of claim 1, wherein the packetized data types comprise a data signal.

5. The multi-point video conference system of claim 4, wherein the data signal comprises text.

6. The multi-point video conference system of claim 1, wherein the sub-bands comprise a carrier frequency.

7. The multi-point video conference system of claim 6, wherein carrier frequency comprises a radio frequency.

8. The multi-point video conference system of claim 6, wherein each cell is assignable a harmonic frequency for modulating said each digital packetized data.

9. The multi-point video conference system of claim 8, wherein the harmonic frequency comprises a Fourier transform.

10. The multi-point video conference system of claim 1, further comprising selectively and separately combining the digital packetized data assigned to each sub-bond.

11. The multi-point video conference system of claim 9, further comprising transmitting the digital packetized data assigned to each sub-band.

12. A multi-point video conference method using a plurality of terminals connected to each other via a network, the multi-point video conference method comprising, for at least one of the terminals:
    compressing video data and outputting packetized data to the network;
    receiving in a time sharing manner a plurality of pockets transmitted from other terminals via the network;
    selectively demultiplexing the received plurality of packets and selectively separating the received packets into time_sequential channel_discrete pockets;
    wherein demultiplexing includes selectively decompressing at least some of the received plurality of packets in an order of reception thereof, and outputting decompressed video information;

storing the decompressed video information in a frame unit;

displaying contents stored in the storage elements;

changing over the contents of the storage elements to supply the display; and mapping the packetized data, comprising:
tabulating the packetized data into a plurality of rows and columns;
wherein the rows identify packetized data types;
wherein the column identify sub-bands; and
enabling a dynamic allocation of each packetized data into a cell identified by a row and column.

13. The method of claim 12, wherein the packetized data types comprise any one or more of a video signal; an audio signal; and a data signal.

14. The method of claim 13, wherein the packetized data comprises text.

15. The method of claim 12, wherein the sub-bonds comprise a carrier frequency.

16. The method of claim 15, wherein carrier frequency comprises a radio frequency.

17. The method of claim 15, wherein each cell is assignable a harmonic frequency for modulating said each digital signal.

18. The method of claim 12, further comprising selectively and separately combining the packetized data assigned to each sub-bond.

19. The method of claim 18, further comprising transmitting the packetized data assigned to each sub-bond.

\* \* \* \* \*